United States Patent [19]

Augart et al.

[11] Patent Number: 4,677,199
[45] Date of Patent: Jun. 30, 1987

[54] REACTIVE DYES CONTAINING SUBSTITUTED 4-FLUOROPYRIDAZ-6-ONE RADICALS

[75] Inventors: Dietmar Augart, Hessheim; Heinz Eilingsfeld, Frankenthal; Heinz Krueger, Ludwigshafen; Hartmut Lardon, Ludwigshafen; Ortwin Schaffer, Ludwigshafen; Guenther Seybold, Neuhofen, all of Fed. Rep. of Germany

[73] Assignee: BASF Aktiengesellschaft, Fed. Rep. of Germany

[21] Appl. No.: 777,571

[22] Filed: Sep. 19, 1985

Related U.S. Application Data

[63] Continuation of Ser. No. 579,355, Feb. 13, 1984, abandoned.

[30] Foreign Application Priority Data

Feb. 19, 1983 [DE] Fed. Rep. of Germany ....... 3305881

[51] Int. Cl.$^4$ .................. C09B 62/004; C09B 62/006; C09B 62/016; C09B 62/018
[52] U.S. Cl. ..................................... 534/618; 534/617; 534/622; 534/624; 534/626; 534/627; 534/628; 534/632; 534/634; 534/635; 534/666; 534/637; 534/638; 544/99; 544/188; 544/189; 544/225; 544/238; 544/241
[58] Field of Search ............... 534/622, 632, 637, 638, 534/618, 635, 636, 634, 617, 628, 626, 624, 627; 544/241, 238, 187, 189

[56] References Cited

U.S. PATENT DOCUMENTS

| | | | |
|---|---|---|---|
| 3,126,367 | 3/1964 | Hensel et al. | 260/146 D |
| 3,126,369 | 3/1964 | Hensel et al. | 260/154 |
| 3,126,370 | 3/1964 | Henzel et al. | 260/154 |
| 3,127,389 | 3/1964 | Seitz et al. | 260/146 D |
| 3,256,275 | 6/1966 | Tartter et al. | 260/154 X |
| 3,256,282 | 6/1966 | Reichenender et al. | 260/154 X |
| 3,347,843 | 10/1967 | Bender et al. | 260/154 |
| 3,374,220 | 3/1968 | Kremel et al. | 260/154 |
| 3,822,263 | 7/1974 | Bien et al. | 260/154 X |
| 3,910,758 | 10/1974 | Bien et al. | 260/154 X |
| 4,001,203 | 1/1977 | Back et al. | 260/146 R |

FOREIGN PATENT DOCUMENTS

| | | | |
|---|---|---|---|
| 0102510 | 3/1984 | European Pat. Off. | 534/632 |
| 1193623 | 8/1960 | Fed. Rep. of Germany | 534/632 |
| 1135115 | 8/1962 | Fed. Rep. of Germany | 260/154 |
| 1180470 | 10/1964 | Fed. Rep. of Germany | 250/154 |
| 1203402 | 10/1965 | Fed. Rep. of Germany | 260/154 |
| 1239037 | 4/1967 | Fed. Rep. of Germany | 260/154 |
| 1239038 | 4/1967 | Fed. Rep. of Germany | 534/632 |
| 1911304 | 9/1970 | Fed. Rep. of Germany | 260/154 |
| 2552364 | 5/1976 | Fed. Rep. of Germany | 260/154 |
| 2644485 | 7/1978 | Fed. Rep. of Germany | 260/154 |
| 1499615 | 9/1967 | France | 260/154 |
| 43-8954 | 4/1968 | Japan | 260/154 |
| 47-42122 | 10/1972 | Japan | 260/154 |
| 1069008 | 5/1967 | United Kingdom | 534/632 |

*Primary Examiner*—Floyd D. Higel
*Attorney, Agent, or Firm*—Keil & Weinkauf

[57] ABSTRACT

Compounds of the general formula I

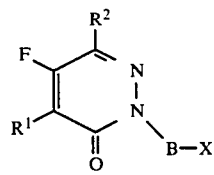

wherein $R^1$ is hydrogen, fluorine, chlorine or bromine, $R^2$ is hydrogen, fluorine, chlorine, bromine, or nitro, B is aliphatic or a sulfo-substituted phenylene radical, and X is a dye radical, are useful for dyeing hydroxyl-containing textile material, in particular cotton.

3 Claims, No Drawings

REACTIVE DYES CONTAINING SUBSTITUTED 4-FLUOROPYRIDAZ-6-ONE RADICALS

This application is a continuation of application Ser. No. 579,355, filed on Feb. 13, 1984 abandoned.

The present invention relates to compounds of the general formula I

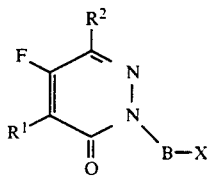

where $R^1$ and $R^2$ independently of one another are each a radical, B is a direct bond or a bridge member and X is a dye radical.

$R^1$ and $R^2$ independently of one another can each be hydrogen, halogen, nitro, cyano, acylamino, hydroxyl, alkoxy, aryloxy, mercapto, alkylthio, arylthio, hydroxycarbonyl, alkoxycarbonyl, aryloxycarbonyl, aminocarbonyl, hydroxysulfonyl, alkylsulfonyl, arylsulfonyl, aminosulfonyl or an unsubstituted or substituted aliphatic, araliphatic, aromatic or heterocyclic radical.

$R^1$ and $R^2$ can each be, in particular, hydrogen, fluorine, chlorine, bromine, nitro, $C_1-C_4$-alkyl, alkoxy, alkoxycarbonyl or alkylsulfonyl, or unsubstituted or substituted phenyl.

Specific examples of radicals $R^1$ and $R^2$, in addition to those mentioned above, are acetylamino, propionylamino, methyl, ethyl, n- and i-propyl, n-, i-, s- and t-butyl, cyclopentyl, cyclohexyl, phenyl, 2-naphthyl, benzyl, methoxy, ethoxy, n- and i-propyloxy, n-, i- s- and t-butoxy, phenoxy, 1- and 2-naphthyloxy, benzyloxy, methylthio, ethylthio, n- and i-propylthio, phenylthio, methoxycarbonyl, ethoxycarbonyl, n- and i-propoxycarbonyl, n-, i- s-, and t-butoxycarbonyl, phenoxycarbonyl, benzyloxycarbonyl, 1- and 2-naphthyloxycarbonyl, methylsulfonyl, ethylsulfonyl, phenylsulfonyl, 2-, 3- and 4-methylphenyl, 2-, 3- and 4-nitrophenyl, 2-, 3- and 4-chlorophenyl, 2-, 3- and 4-hydroxycarbonylphenyl, 2-, 3- and 4-hydroxysulfonylphenyl, 1-pyrrolyl, 1-methyl-2- and -3-pyrrolyl, 2- and 3-thiophenyl, 2- and 3-furanyl, 2- and 3-tetrahydrofuranyl, 2-, 3- and 4-pyridyl, 1,4-dioxan-2- and -3-yl, 1-imidazolyl, 1-methyl-2-, -4- and -5-imidazolyl, 1-pyrazolyl, 1-methyl-2- and -3-pyrazolyl, 2-, 4- and 5-thiazolyl, 3-, 4- and 5-isothiazolyl, 2-, 4- and 5-oxazolyl, 3-, 4- and 5-isoxazolyl, 3- and 4-pyridazinyl, 2-, 4- and 5-pyrimidinyl, 2- and 3-pyrazinyl, 1-indolyl, 1-propyl-2-, -3-, -4-, -5-, -6- and -7-indolyl, 2-, 3-, 4-, 5-, 6- and 7-benzothiophenyl, 2-, 3-, 4-, 5-, 6- and 7-benzofuranyl, 2-, 3-, 4-, 5-, 6-, 7- and 8-quinolyl, 1-, 3-, 4-, 5-, 6-, 7- and 8-isoquinolyl, 1-benzimidazolyl, 1-methyl-2-, -4-, -5-, -6- and -7-benzimidazolyl, 1-benzopyrazolyl, 1-ethyl-3-, -4-, -5-, -6- and -7-benzopyrazolyl, 2-, 4-, 5-, 6- and 7-benzothiazolyl, 3-, 4-, 5-, 6- and 7-benzisothiazolyl, 2-, 4-, 5-, 6- and 7-benzoxazolyl, 3-, 4-, 5-, 6- and 7-benzisoxazolyl, 3-, 4-, 5-, 6-, 7- and 8-cinnolinyl, 1-, 4-, 5-, 6-, 7- and 8-phthalazinyl, 2-, 4-, 5-, 6-, 7- and 8-quinazolinyl and 2-, 3-, 5-, 6-, 7- and 8-quinoxalinyl.

Preferred radicals $R^1$ and $R^2$ are hydrogen, fluorine, chlorine, bromine, amino, acetylamino, hydroxyl, methoxy and phenyl, H, Cl and Br being particularly preferred.

Bridge members B can be aliphatic, aromatic, araliphatic or heterocyclic radicals, the two first-mentioned being preferred. The bridge members B each carry groups which are suitable for bonding to the dye radical X, and can furthermore be substituted by substituents stated for $R^1$ and $R^2$.

Aliphatic bridge members are, in particular, alkylene radicals of not more than 10 carbon atoms which can futhermore be interrupted by oxygen, sulfur or $C_1-C_4$-alkylimino and substituted by fluorine, chlorine, bromine, nitro, $C_1-C_4$-alkyl, aryl, cyano, hydroxycarbonyl or $C_1-C_4$-alkoxycarbonyl, and, for bonding to X, carry an imino, carbonyl or sulfonyl group.

Specific examples of aliphatic bridge members are methyleneimine, methylmethyleneimine, ethyleneimine, 1- and 2-methyléthyleneimine, 1- and 2-phenylethyleneimine, 1- and 2-cyanoethyleneimine, 1- and 2-hydroxycarbonylethyleneimine, 1- and 2-methoxycarbonylethyleneimine, propyleneimine, butyleneimine, 1- and 2-fluoroethyleneimine, 1- and 2-chloroethyleneimine, 1- and 2-nitroethyleneimine, methylenecarbonyl, ethylenecarbonyl, 1- and 2-methylethylenecarbonyl, 2,2-dimethylethylenecarbonyl, 1- and 2-fluoroethylenecarbonyl, 1- and 2-nitroethylenecarbonyl, ethylenesulfonyl, 1- and 2-methylethylenesulfonyl and 1- and 2-fluoroethylenesulfonyl.

Preferred aliphatic bridge members are ethyleneimine and ethylenecarbonyl bridges, which can be substituted by methyl, phenyl, hydroxycarbonyl or methoxycarbonyl, as well as the corresponding propyleneimine radicals.

Aromatic bridge members B are, in particular, phenylene and naphthylene radicals which in turn carry an imino, carbonyl or sulfonyl group and can be substituted by, for example, fluorine, chlorine, bromine, $C_1-C_4$-alkyl, $C_1-C_4$-alkoxy, $C_1-C_4$-alkylthio, nitro, hydroxyl, hydroxycarbonyl, hydroxysulfonyl or polyfluoroalkyl.

Specific examples of aromatic bridge members B are:

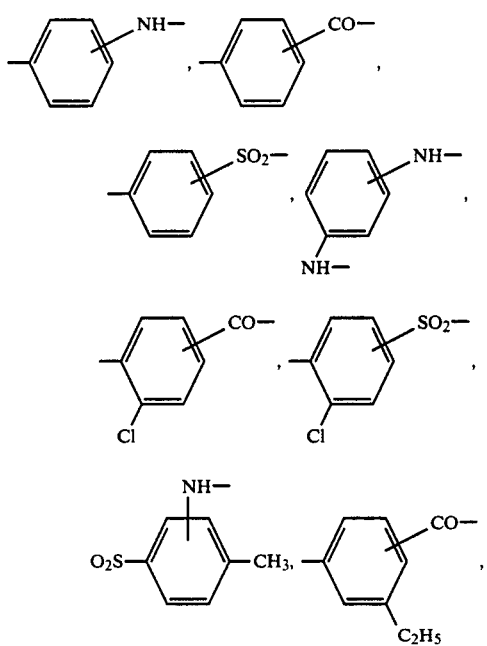

-continued
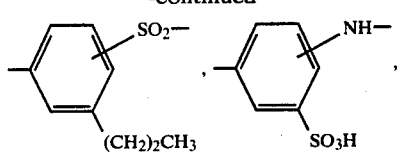
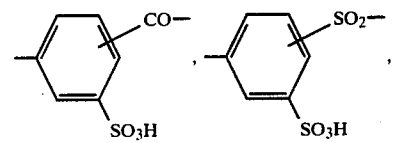
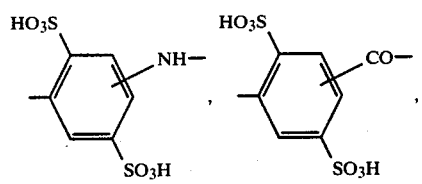
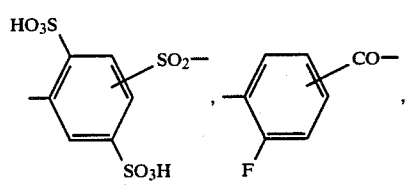
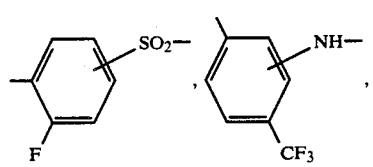
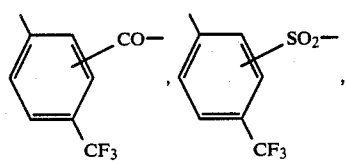
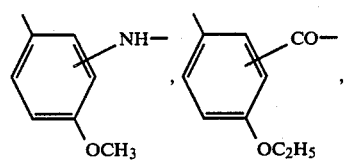
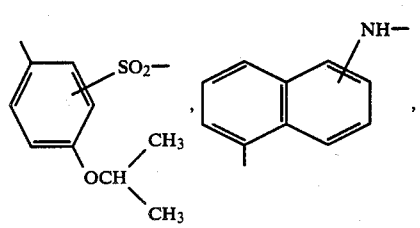
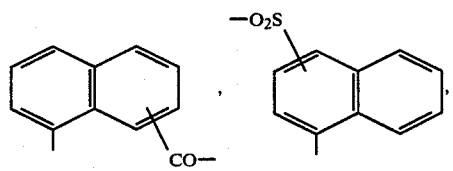
-continued
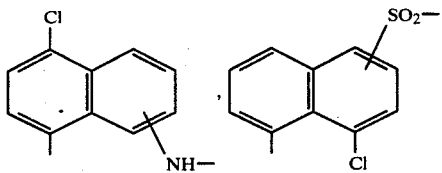
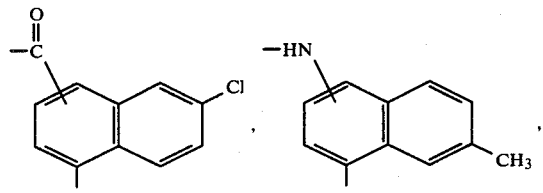
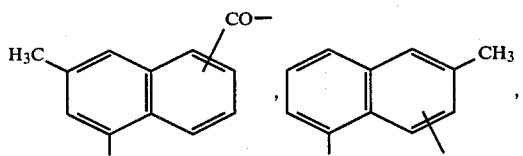
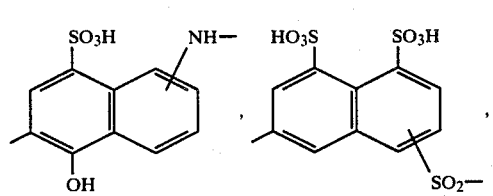
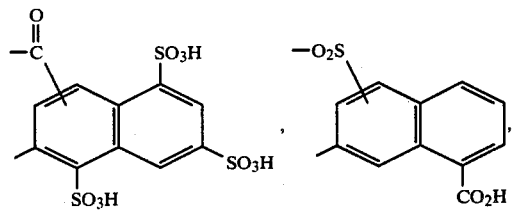
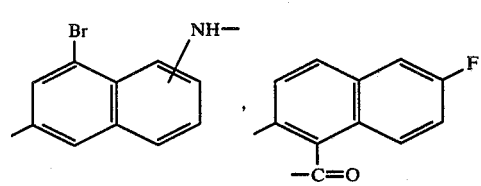
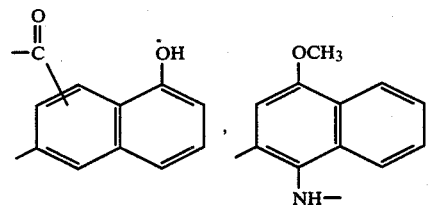
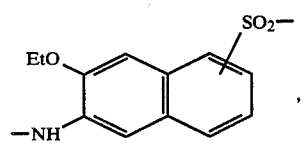
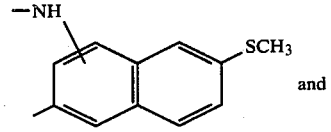
and -continued

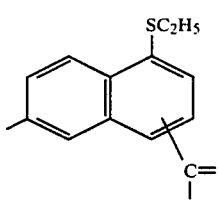

Preferred aromatic bridge members B are phenylene and naphthylene radicals which carry imino, carbonyl or sulfonyl groups and can be substituted by chlorine, amino, hydroxyl or hydroxysulfonyl.

Examples of araliphatic bridge members B are:

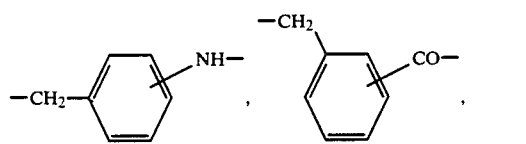

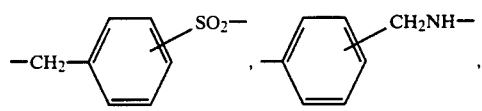

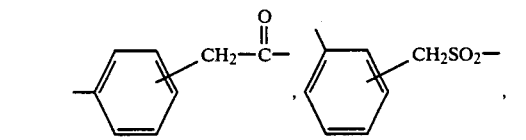

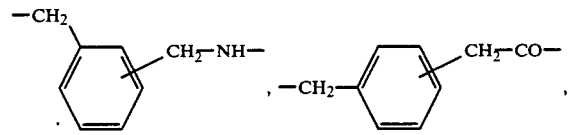

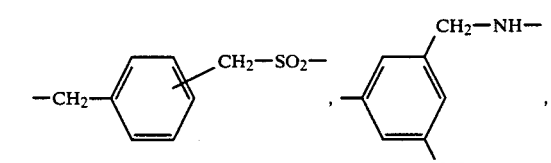

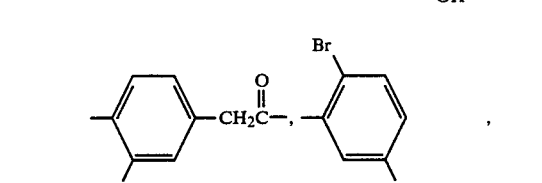

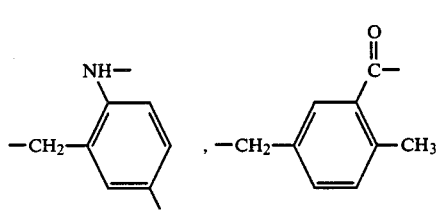

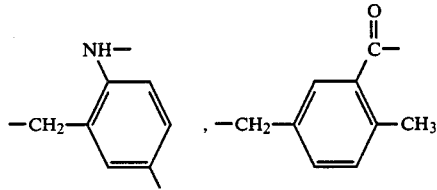

-continued

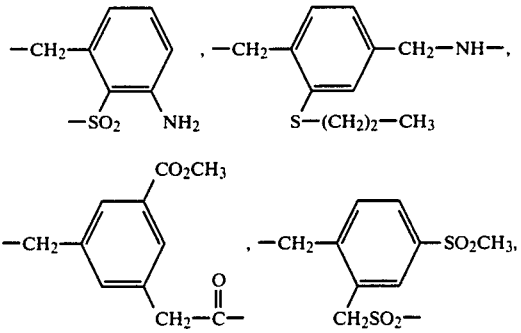

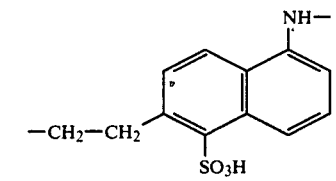

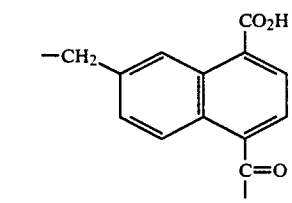

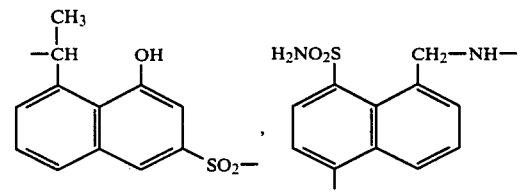

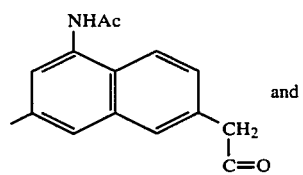

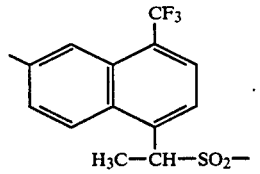

Preferred araliphatic bridge members are benzylene radicals which carry an imino, carbonyl or sulfonyl group and can be substituted by chlorine, amino, hydroxyl or hydroxysulfonyl.

Examples of heterocyclic bridge members B are:

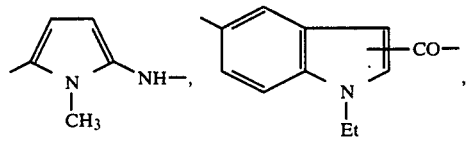

-continued

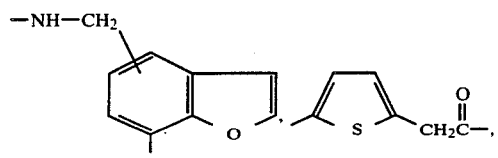

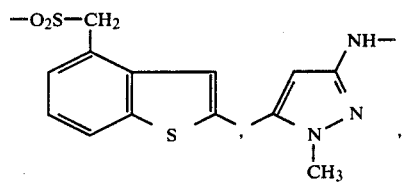

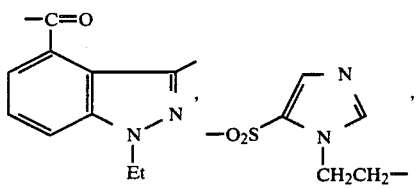

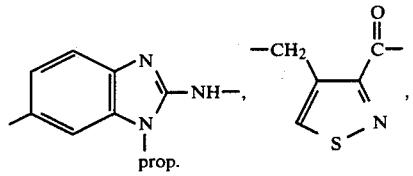

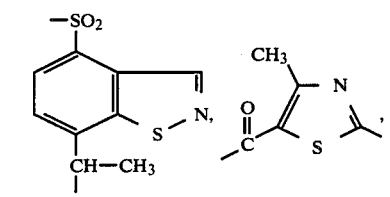

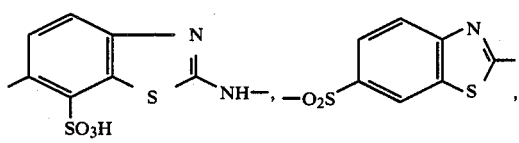

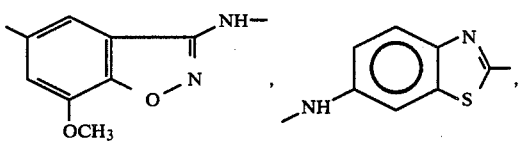

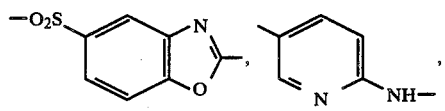

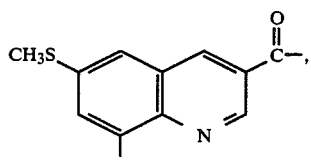

-continued

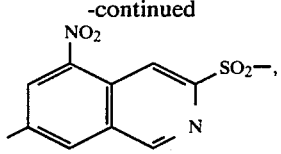

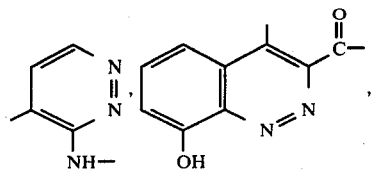

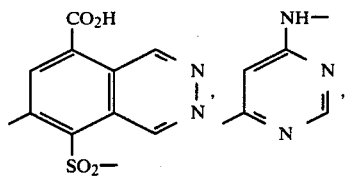

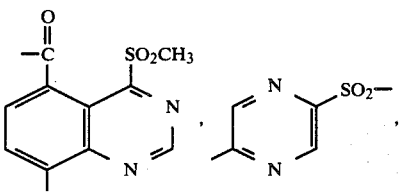

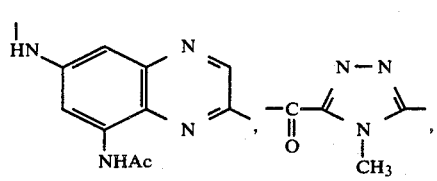

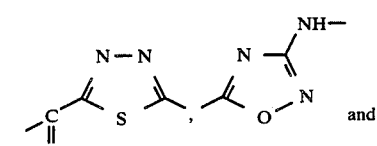

Preferred heterocyclic bridge members B are derived from thiazole, benzothiazole, imidazole or 1,3,4-thiadiazole radicals which carry an imino, carbonyl or sulfonyl group.

Azo dye radicals X are derived from, for example, the mono- or polyazo series, and can also contain fiber-reactive radicals; they correspond to the general formula II

[D—N=N—K]— where D is a radical of an aromatic or heterocyclic diazo component which may or may not contain azo groups, and K is a radical of a coupling component which may or may not contain azo groups.

The other fiber-reactive radicals can be bonded to D and/or K; preferably, one further fiber-reactive radical is present, but it is also possible for 2 or 3 such radicals to be present. The further radicals can be identical or different, and also include the radical of the formula

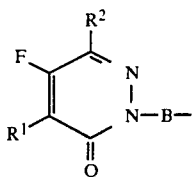

In particular, X corresponds to the general formula

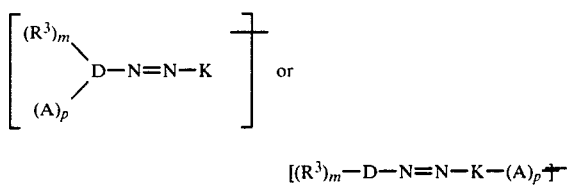

where K has the above meanings, D is a radical of the aniline or aminonaphthalene series, m is an integer from 0 to 3, p is an integer from 0 to 2, A is a fiber-reactive radical which is bonded directly or via a bridge member, and $R^3$ is a substituent, the individual radicals $R^3$ being identical or different.

Examples of bridge members via which the radical A can be bonded are —NH—, —N(CH$_3$)—, —CH$_2$—NH—, —N(CH$_3$)—CH$_2$—, —C$_n$H$_{2n}$—NH—CO—, —C$_n$H$_{2n}$—CO—NH—, —C$_n$H$_{2n}$—SO$_2$—NH—, —C$_n$H$_{2n}$—NH—SO$_2$—, —Ar—CO—NH—, —Ar—NH—CO—, —Ar—SO$_2$—NH—, —Ar—NH—SO$_2$— and —Ar—N=N—, where n is an integer from 0 to 4 and Ar is aryl.

Examples of preferred aliphatic radicals are —C$_2$H$_4$— and —C$_3$H$_6$—.

Examples of Ar are

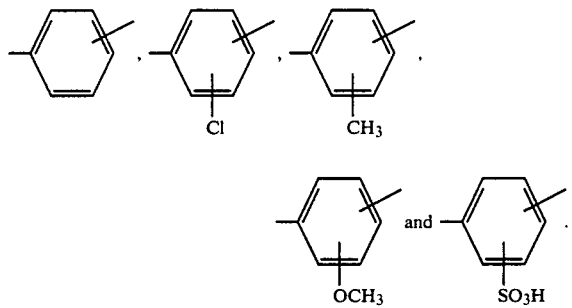

The fiber-reactive radical A may also correspond to the formula

—A'—Z where A' is a chloro- or fluorotriazinyl or pyrimidinyl radical bonded via an imino, methylimino, iminomethylene or methyliminomethylene bridge, and Z is a reactive radical from the vinyl sulfone, allyl sulfone, halopyridazinone or β-chloroethylamino sulfone series.

$R^3$ is a substituent from the group comprising, for example, C$_1$-C$_4$-alkyl, trifluoromethyl, acetyl, C$_1$-C$_4$-alkoxy, fluorine, chlorine, bromine, hydroxysulfonyl, C$_1$-C$_4$-alkylsulfonyl, hydroxycarbonyl, C$_1$-C$_4$-alkoxycarbonyl, amino, C$_1$-C$_4$-alkylamino, nitro, cyano, acetylamino, benzoylamino, phenylamino, hydroxyl, aminocarbonyl, C$_1$-C$_4$-monoalkylaminocarbonyl, C$_1$-C$_4$-dialkylaminocarbonyl, aminosulfonyl, C$_1$-C$_4$-monoalkylaminosulfonyl, C$_1$-C$_4$-dialkylaminosulfonyl, N-phenylaminocarbonyl, N-phenylaminosulfonyl, phenyl, styryl, phenylsulfonyl, phenylazo and naphthylazo, and benzene rings in the above-mentioned substituents can be further substituted by hydroxysulfonyl, hydroxycarbonyl, methyl, methoxy, chlorine, nitro, amino, acetylamino or hydroxyl.

Preferred radicals $R^3$ are methyl, methoxy, chlorine, hydroxysulfonyl, hydroxycarbonyl, nitro, amino, acetylamino and hydroxyl.

Specific examples of fiber-reactive radicals A are derived from the following compounds (in the text which follows, pyridazinonyl is pyridazin-6-on-1-yl): Acryloyl chloride, β-chloro- or β-bromopropionyl chloride, chloroacetyl chloride, α,β-dichloro- or α,β-dibromopropionyl chloride, 2,3-dichloroquinoxaline-5-carbonyl chloride, 2,3-dichloroquinoxaline-6-carbonyl chloride, 2,3-dichloroquinazoline-5- or -6-sulfonyl chloride, 2,4-dichloroquinazoline-6- or -7-sulfonyl chloride, 2,4,6-trichloroquinazoline-7- or -8-sulfonyl chloride, 2,4,7- or 2,4,8-trichloroquinazoline-6-sulfonyl chloride, 2,4-dichloroquinazoline-6-carbonyl chloride, 3- or 4-allylsulfonylaniline, 3- or 4-vinylsulfonylaniline, 3- or 4-(chlorovinylsulfonyl)-aniline, 4-(2'-chloroethylsulfonyl)-aniline, 4-(β-hydroxyethylsulfonyl)-aniline, 3- or 4-(β-sulfatoethylsulfonyl)-aniline, 3- or 4-(β-sulfatoethylsulfonamido)-aniline, 2,6-dichloropyrimidine-4- or -5-carbonyl chloride, N-(β-sulfatoethylsulfonyl)-piperazine, 2,6-dichloropyrimidine-5-sulfonyl chloride, 2,4,6-trichloropyrimidine, 2,4,6-trichloro-5-methylpyrimidine, 2,4,6-tribromo-5-cyanopyrimidine, 2,4,5,6-tetrachloropyrimidine, 2,4,6-trifluoropyrimidine, 2,4,6-trifluoro-5-chloropyrimidine, 4,6-difluoro-5-chloropyrimidine, 2-methylsulfonyl-4-chloro-6-methylpyrimidine, 2-methylsulfonyl-4,5-dichloro-6-methylpyrimidine, 2-methylsulfonyl-4-chloropyrimidine-5-carbonyl chloride, 2,4,6-trichloro-5-methylsulfonylpyrimidine, 2,4,6-trifluoro-5-methylsulfonylpyrimidine, 2-methyl-4,6-dichloro-5-methylsulfonylpyrimidine, 2,4,5-trichloro-6-methylsulfonylpyrimidine, 2,4,6-trichloropyrimidine-5-carbonyl chloride, tetrachloropyridazine, tetrafluoropyridazine, 3,6-dichloropyridazine-4-carbonyl chloride, 1-(4'-aminophenyl)-4,5-dichloropyridazin-6-one, p-(4,5-dichloropyridazinonyl)-benzoyl chloride, β-(4,5-dichloropyridazinonyl)-propionyl chloride, p-(4,5-dichloropyridazinonyl)-benzenesulfonyl chloride, β-(4,5-dichloropyridazinonyl)-propylamine, 1-(3'- or 4'-aminophenyl)-4-fluoro-5-chloropyridazin-6-one, p-(4-fluoro-5-chloropyridazinonyl)-benzoyl chloride, p-(4-fluoro-5-chloropyridazinonyl)-benzenesulfonyl chloride, β-(4-fluoro-5-chloropyridazinonyl)-propionyl chloride, β-(4-fluoro-5-chloropyridazinonyl)-propylamine, 3- or 4-chloroethylaminosulfonylaniline, 2,2,3,3-tetrafluorocyclobutylcarbonyl chloride, 2,3,3-trifluorocyclobutenylcarbonyl chloride, 2,2,3,3-tetrafluorocyclobutylacryloyl chloride or 1,4-dichlorophthalazine-6-carbonyl chloride.

Particular examples are cyanuric fluoride, cyanuric chloride, cyanuric bromide, 2,4-dichloro-6-methyltriazine, 2,4-dichloro-6-phenyltriazine and the primary condensates of cyanuric fluoride, chloride and bromide with ammonia, amines, organic hydroxy and mercapto compounds, eg. methanol, ethanol, isopropanol, phenol, α-naphthol, β-naphthol, chlorophenols, cresols, sulfonated phenols, thiophenol, thioglycolic acid, methylmercaptan, dimethyldithiocarbamic acid, 2-mercaptobenzothiazole, thioacetamide, methylamine, ethylamine, n-propylamine, dimethylamine, diethylamine, β-hydroxyethylamine, di-(-hydroxyethyl)-amine, piperidine, morpholine, β-methoxyethylamine, β-(4-sulfophenyl)-ethylamine, aminoacetic acid, N-methylaminoacetic acid, taurine, N-methyltaurine, aniline, N-methylaniline, toluidine, anisidine, aniline-2,5-, -2,4- and -3,5-disulfonic acid, o-, m- and p-anilinesulfonic acid, o-, m- and p-N-methylanilinesulfonic acid, o-, m- and p-aminobenzoic acid, 4- and 5-sulfo-2-aminobenzoic acid, 2-aminotoluene-4-sulfonic acid, 5-amino-2-hydroxybenzoic acid, β-aminoethanesulfonic acid, N-methylaminoethanesulfonic acid and mono- and disulfonic acids of 1-amino- and 2-aminonaphthalene.

Reactive radicals Z are preferably bonded to the radical A' via nitrogen in the form of —NH— or —N-H—NH—, specific examples of Z being derived from the following compounds: 4-(β-sulfatoethylsulfonyl)-phenylhydrazine, 4-allylsulfonylaniline, 3-allylsulfonylaniline, 4-(propen-1'-ylsulfonyl)-aniline, 4-vinylsulfonylaniline, 3-(β-sulfatoethylsulfonyl)-aniline, 4-(-sulfatoethylsulfonyl)-aniline, 4-(β-chloroethylsulfonyl)-aniline, 1-(3'- or 4'-aminophenyl)-4,5-dichloropyridazin-6-one, 1-(3'- or 4'-aminophenyl)-4-fluoro-5-chloropyridazin-6-one, β-(4,5-dichloropyridazinonyl)-propylamine, β-(4-fluoro-5-chloropyridazinonyl)-propylamine, 3-(-chloroethylaminosulfonyl)-aniline, or 4-(β-chloroethylaminosulfonyl)-aniline.

A' is preferably a triazinyl radical.

Aromatic radicals D of the diazo components of the aniline and aminonaphthalene series, which do not carry any fiber-reactive groups, are derived from, for example, amines of the formulae IVa-f:

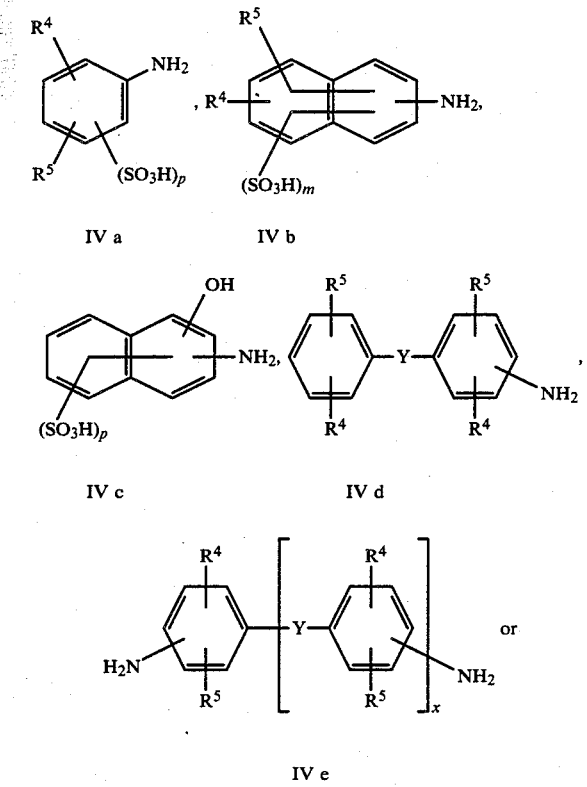

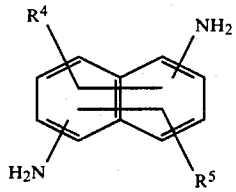

IV f where m and p have the above meanings, $R^4$ is hydrogen, methyl, ethyl, methoxy, ethoxy, acetyl, cyano, hydroxycarbonyl, hydroxysulfonyl, $C_1$–$C_4$-alkoxycarbonyl, hydroxyl, aminocarbonyl, $C_1$–$C_4$-alkylaminocarbonyl, fluorine, chlorine, bromine or trifluoromethyl, $R^5$ is hydrogen, methyl, ethyl, methoxy, ethoxy, cyano, hydroxycarbonyl, hydroxysulfonyl, acetylamino, $C_1$–$C_4$-alkoxycarbonyl, aminocarbonyl, $C_1$–$C_4$-alkylaminocarbonyl, fluorine, chlorine, nitro, aminosulfonyl, $C_1$–$C_4$-alkylaminosulfonyl, $C_1$–$C_4$-alkylsulfonyl, phenylsulfonyl or phenoxy, X is 0 or 1 and Y is a direct bond or one of the groups —NHCO—, —CONH—, —CO—, —NHSO$_2$—, —SO$_2$NH—, —SO$_2$—, —CH═CH—, —CH$_2$—CH$_2$—, —CH$_2$— —NH—, —O—, —S— and —N═N—.

$R^4$ is preferably H, CH$_3$, CH$_3$O, Cl, COOH, SO$_3$H or OH, $R^5$ is preferably H, CH$_3$, CH$_3$O, Cl, COOH, SO$_3$H or NHCOCH$_3$—, and Y is preferably —SO$_2$—, —CO—, —CH═CH—, —N═N—, —CH$_2$—CH$_2$ or —CH$_2$—.

Specific examples of aromatic amines which do not possess a fiber-reactive group, can be used as diazo components for the preparation of the novel dyes and correspond to, for example, the general formula (IVa), (IVb), (IVc) or (IVd) are aniline, 2-methoxyaniline, 2-ethoxyaniline, 2-methylaniline, 4-nitro-2-aminoanisole, 4-chloro-2-aminoanisole, 4-methylaniline, 4-methoxyaniline, 2-nitro-4-aminoanisole, 2-methoxy-5-methylaniline, 4-nitroaniline, 2-chloro-4-nitroaniline, 2,6-dichloro-4-nitroaniline, 2-nitro-4-methylaniline, 2,5-dimethoxyaniline, 2,5-dimethylaniline, 2,4-dimethylaniline, 4-butylaniline, 2-nitro-4-nitroaniline, 2,5-diethoxyaniline, 4-cyanoaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-(p-tolylsulfonyl)-aniline, 2-ethoxy-1-naphthylamine, 1-naphthylamine, 2-naphthylamine, 4-benzoylamino-2-ethoxyaniline, 3-amino-4-methylbenzonitrile, 4-methylsulfonylaniline, 2-trifluoromethylaniline, 1-trifluoromethyl-3-chloroaniline, 2,4-dichloroaniline-5-carboxylic acid, 2-aminobenzoic acid, 4-aminobenzoic acid, 3-aminobenzoic acid, 3-chloroaniline-6-carboxylic acid, aniline-2- or -3- or -4-sulfonic acid, 2,5-disulfoaniline, 2,4-disulfoaniline, 3,5-disulfoaniline, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 3- acetylamino-6-sulfoaniline, 4-acetylamino-2-sulfoaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 4- or 5-nitro-2-aminophenol, 4-nitro-6-sulfo-2-aminophenol, 1-hydroxy-2-aminonaphthalene-6,8- or -4,6-disulfonic acid, 6-nitro-2-hydroxy-4-sulfoaminonaphthalene, 6-nitro-2-aminonaphthalene-4,8-disulfonic acid, 4-aminodiphenylene, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4-(6'-sulfonaphthylazo)-1-aminonaphthalene, 4-(2',5'-disulfophenylazo)-1-aminonaphthalene, 4'-amino-3'-methyl-3-nitrobenzophenone, 4-amino-2-methylbenzophenone, 2-amino-4'-methoxybenzophenone, 4-aminobenzophenone, 4-(4'-aminophenylazo)-benzenesulfonic acid, 4-(4'-amino-3'-methoxyphenylazo)-benzenesulfonic acid and 2-ethoxy-1-aminonaphthalene-6-sulfonic acid.

Specific examples of aromatic diamines which do not possess a fiber-reactive group, can be used as tetrazo components of the preparation of the novel dyes and correspond to, for example, the general formula (IV e) or (IV f) are 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-2-methylbenzene, 1,3-diaminobenzene-5-sulfonic acid, 1,3-diamino-5-methylbenzene, 1,6-diaminonaphthalene-4-sulfonic acid, 2,6-diamino-4,8-disulfonaphthalene, 3,3'-diaminodiphenyl sulfone, 4,4'-diaminodiphenyl sulfone, 3,3'-diaminodisulfodiphenyl sulfone, 4,4'-diaminostilbene-2,2'-disulfonic acid, 2,7'-diaminodiphenyl sulfone, 2,7'-diamino-4,5'-disulfodiphenyl sulfone, 4,4'-diaminobenzophenone, 4,4'-diamino-3,3'-dinitrobenzophenone, 3,3'-diamino-4,4'-dichlorobenzophenone, 4,4'- or 3,3'-diaminodiphenyl, 4,4'-diamino-3,3'-dichlorodiphenyl, 4,4'-diamino-3,3'-dimethoxy- or -3,3'-dimethyl- or -2,2'-dimethyl- or -2,2'-dichloro- or -3,3'-diethoxydiphenyl, 4,4'-diamino-3,3'-dimethyl-6,6'-dinitrodiphenyl, 4,4'-diamino-2,2'- or -3,3'-disulfodiphenyl, 4,4'-diamino-3,3'-dimethyl- or 3,3'-dimethoxy- or -2,2'-dimethoxy-6,6'-disulfodiphenyl, 4,4'-diamino-2,2',',5,5'-tetrachlorodiphenyl, 4,4'-diamino-3,3'-dinitrodiphenyl, 4,4'-diamino-2,2'-dichloro-5,5'-dimethoxydiphenyl, 4,4'-diamino-2,2'- or -3,3'-dicarboxylic acid, 4,4'-diamino-3,3'-dimethyldiphenyl-5,5'-disulfonic acid, 4,4'-diamino-2-nitrodiphenyl, 4,4'-diamino-3-ethoxy- or -3-sulfodiphenyl, 4,4'-diamino-3,3'-dimethyl-5-sulfodiphenyl, 4,4'-diaminodiphenylmethane, 4,4'-diamino-3,3'-dimethyldiphenylmethane, 4,4'-diamino-2,2',3,3'-tetramethyldiphenylmethane, 4,4'-diaminodiphenylethane, 4,4'-diaminostilbene or 4,4'-diaminodiphenylmethane-3,3'-dicarboxylic acid.

Aromatic radicals D of the diazo component of the aniline and aminonaphthalene series, which can carry a fiber-reactive radical, are derived from, for example, amines of the formulae V a-c

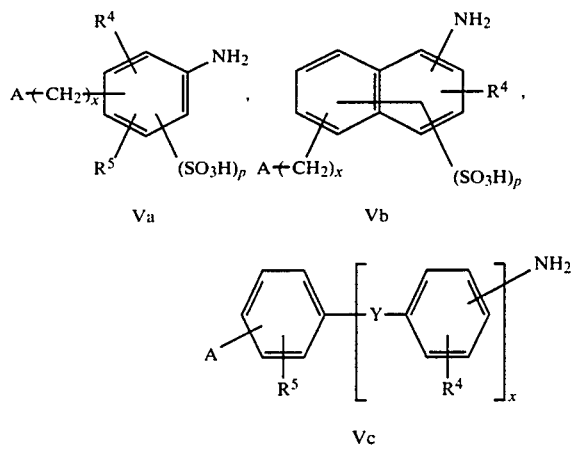

where $R^4$, $R^5$, p, x, Y and A have the above meanings.

Specific examples of aromatic compounds which carry a fiber-reactive radical A and correspond to the formulae V a-c are derived from the following diamines: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diamino-2-naphthol-4-sulfonic acid, 1,6-diaminonaphthalene-4-sulfonic acid, 2,6-diamino-4,8-disulfonaphthalene, 2,6-diamino-1-naphthol-4,8-disulfonic acid, 1,3-diaminobenzene-5-sulfonic acid, 1,3-diamino-5-methylbenzene, 2,6-diaminophenol-4-sulfonic acid, 5-(ω-aminomethyl)-2-aminonaphthalene-1-sulfonic acid, 5-(ω-N-methylaminomethyl)-2-aminonaphthalene-1-sulfonic acid, 4,4'-diaminostilbene-3,3'-dicarboxylic acid, 4-(ω-N-methylaminomethyl)-aniline-2-sulfonic acid or 3-(ω-N-methylaminomethyl)-aniline-6-sulfonic acid.

Preferred amines carrying fiber-reactive radicals A are the condensates of 1,3- or 1,4-diaminobenzene, 1,3-diaminobenzene-4-sulfonic acid, 1,4-diaminobenzene-2-sulfonic acid, 1,3-diaminobenzene-4,6-disulfonic acid, 2,6-diamino-4,8-disulfonaphthalene, 5-(ω-aminomethyl)-2-aminonaphthalene-1-sulfonic acid or 4-(ω-N-methylaminomethyl)aniline-2-sulfonic acid and, for example, cyanuric chloride or fluoride, as well as their condensates with ammonia, primary or secondary aliphatic or aromatic amines, methanol, ethanol, isopropanol or phenol; furthermore, for example, acryloyl chloride, β-chloropropionyl chloride, β-bromopropionyl chloride, chloroacetyl chloride, α,β-dichloropropionyl chloride, 2,3-dichloroquinoxaline-5-carbonyl chloride, 2,3-dichloroquinoxaline-6-carbonyl chloride, 2,3-dichloroquinazoline-5- or -6-sulfonyl chloride, 2,4-dichloroquinazoline-6- or -8-sulfonyl chloride, 2,4,7- or 2,4,8-trichloroquinazoline-6-sulfonyl chloride, 2,4-dichloroquinazoline-6-carbonyl chloride, 2,6-dichloropyrimidine-4- or -5-carbonyl chloride, 2,6-dichloropyrimidine-5-sulfonyl chloride, 2,4,6-trichloropyrimidine, 2,4,6-trichloro-5-methylpyrimidine, 2,4,6-tribromo-5-cyanopyrimidine, 2,4,5,6-tetrachloropyrimidine, 2,4,6-trifluoropyrimidine, 2,4,6-trifluoro-5-chloropyrimidine, 4,6-difluoro-5-chloropyrimidine, 2-methylsulfonyl-4-chloro-6-methylpyrimidine, 2-methylsulfonyl-4,5-dichloro-6-methylpyrimidine, 2-methylsulfonyl-4-chloropyrimidine-5-carbonyl chloride, 2,4,6-trichloro-5-methylsulfonylpyrimidine, 2,4,6-trifluoro-5-methylsulfonylpyrimidine, 2-methyl-4,6-dichloro-5-methylsulfonylpyrimidine, 2,4,5-trichloro-6-methylsulfonylpyrimidine, 2,4,6-trichloropyrimidine-5-carbonyl chloride, tetrachloropyridazine, tetrafluoropyridazine, 3,6-dichloropyridazine-4-carbonyl chloride, p-(4,5-dichloropyridazinonyl)-benzoyl chloride, β-(4,5-dichloropyridazinonyl)-propionyl chloride, p-(4,5-dichloropyridazinonyl)-benzenesulfonyl chloride, p-(4,5-dichloropyridazinonyl)-benzenesulfonyl chloride, p-(4-fluoro-5-chloropyridazinonyl)-benzoyl chloride, p-(4-fluoro-5-chloropyridazinonyl)-benzenesulfonyl chloride, β-(4-fluoro-5-chloropyridazinonyl)-propionyl chloride and 1,4-dichlorophthalazine-6-carbonyl chloride (pyridazinonyl=pyridazin-6-on-1-yl).

The radicals K of the coupling component are preferably derived from the aniline, naphthalene, pyrazole, pyridine, pyrimidine, indole, acylacetarylide or barbituric acid series, and may also carry fiber-reactive groups. They can therefore correspond to the formula —K(A)$_p$ where A, K and p have the above meanings.

Examples of coupling components of the aniline and naphthalene series are anilines, N-monosubstituted anilines, m-phenylenediamine derivatives, naphtholsulfonic acids, aminonaphthalenes, naphthols, hydroxynaphthoic acid derivatives, aminonaphthalenesulfonic acids and aminonaphtholsulfonic acids.

Coupling components which are derived from the aniline and naphthalene series and do not contain fiber-reactive groups are, for example, compounds of the formulae VI a-g

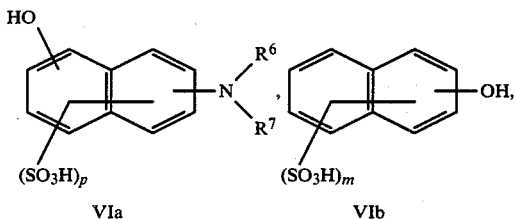

VIa     VIb

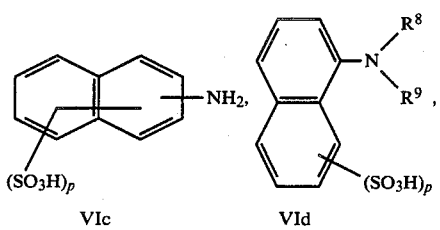

VIc     VId

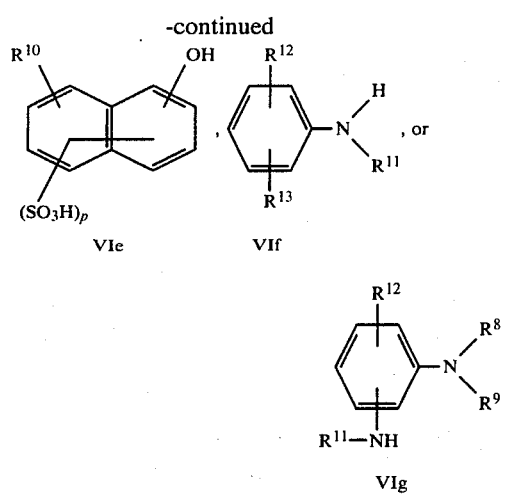

VIe     VIf

VIg where $R^6$ is hydrogen or $C_1$–$C_4$-alkyl, $R^7$ is hydrogen or $C_1$–$C_4$-alkyl or is phenyl which can be substituted by 1 or 2 substituents from the group comprising $C_1$–$C_4$-alkyl, $C_1$–$C_4$-alkoxy, chlorine, bromine and hydroxysulfonyl, $R^8$ is hydrogen, or $C_1$–$C_4$-alkyl which can be substituted by hydroxyl, cyano, hydroxycarbonyl, hydroxysulfonyl, hydroxysulfonyloxy, methoxycarbonyl, ethoxycarbonyl or acetoxy, $R^9$ is hydrogen or $C_1$–$C_4$-alkyl which can be substituted by hydroxyl, cyano, hydroxycarbonyl, hydroxysulfonyl, hydroxysulfonyloxy, methoxycarbonyl, ethoxycarbonyl or acetoxy, or is benzyl or is phenyl which can be substituted by $C_1$–$C_4$-alkyl, $C_1$–$C_4$-alkoxy, chlorine and/or hydroxysulfonyl, $R^{10}$ is a $C_1$–$C_6$-alkylureido or phenylureido group which can be substituted by chlorine, methyl, methoxy, nitro, hydroxysulfonyl and/or hydroxycarbonyl, or is a $C_1$–$C_6$-alkylanoylamino, eg. acetylamino, propionylamino or cyclohexanoylamino, or a benzoylamino group which can be substituted by chlorine, methyl, methoxy, nitro, hydroxysulfonyl and/or hydroxycarbonyl, or is hydroxyl, $R^{11}$ is hydrogen or $C_1$–$C_6$-alkyl, in particular $C_1$–$C_4$-alkyl, which can be substituted by aryl, eg. phenyl, or by $C_1$–$C_4$-alkoxy, hydroxyl, phenoxy or $C_1$–$C_4$-alkanoyloxy, or is cycloalkyl, eg. cyclohexyl, or aryl, eg. phenyl, which can contain a hydroxysulfonyl group, $R^{12}$ is hydrogen, methyl, ethyl, methoxy, ethoxy, chlorine, bromine, acetylamino, amino, ureido, methylsulfonylamino, ethylsulfonylamino, dimethylaminosulfonylamino, methylamino, ethylamino, dimethylamino or diethylamino, $R^{13}$ is hydrogen, methyl, ethyl, methoxy, ethoxy, chlorine or bromine, and p and m have the above meanings.

Specific examples are aniline-N-ω-methanesulfonic acid, o- and m-toluidine, o- and m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, N-β-hydroxyethylamine and N-β-hydroxy-m-toluidine.

Examples of naphtholsulfonic acids are 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxynaphthalene-3,6-disulfonic acid, 2,6-dihydroxynaphthalene-8-sulfonic acid and 2,8-dihydroxynaphthalene-6-sulfonic acid.

Examples of further compounds are α-naphthylamine, N-phenyl-α-naphthylamine, N-ethyl-α-naphthylamine, N-phenyl-β-naphthylamine, 1,5-naphthylenediamine, 1,8-naphthylenediamine, α-naphthol, β-naphthol, 1,5-dihydroxynaphthalene, 1,6-dihydroxynaphthalene, 1,7-dihydroxynaphthalene, 2,7-dihydroxynaphthalene, 2-hydroxynaphthalene-3-carboxylic acid N-phenylamide, 2-hydroxynaphthalene-3-carboxylic acid N-(2'-methoxyphenyl)-amide and 2-hydroxynaphthalene-3-carboxylic acid N-(2',5'-dimethoxyphenyl)amide.

Examples of aminonaphthalenesulfonic acids are 1-naphthylamine-6-sulfonic acid, 1-naphthylamine-6/7-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid and 2-naphthylamine-6,8-disulfonic acid.

Examples of aminonaphtholsulfonic acids are 1-amino-5-hydroxynaphthalene-7-sulfonic acid, 1-amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-acetylamino-8-hydroxynapthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid, 2-methylamino-8-hydroxynaphthalene-6-sulfonic acid and 2-(3'- and 4'-sulfophenylamino)-8-hydroxynaphthalene-6-sulfonic acid. Of particular importance are sulfo-containing and/or carboxyl-containing coupling components which may or may not carry azo groups and which couple in the o- or p-position to a hydroxyl group and/or an amino group.

Examples of such coupling components are 2-acetylamino-5-hydroxynaphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynapthalene-3,6-disulfonic acid, 1-acetylamino-8-hydroxynaphthalene-4,6-disulfonic acid or 1-benzoylamino-8-hydroxynaphthalene-4,6-disulfonic acid.

Further examples of coupling components are, in particular, 1-amino-8-hydroxynaphthalene-3,6- and -4,6-disulfonic acid and their arylazo coupling products obtained by acidic coupling, of the formula

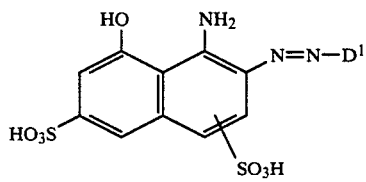

where $D^1$ can be a radical of a diazo component, for example a radical of the formula

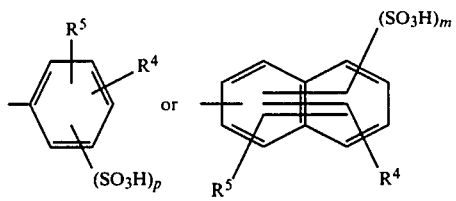

where $R^4$, $R^5$, p and m have the above meanings.

Specific radicals $D^1$ are derived from, for example, the following amines: aniline, aniline-2-, -3- or -4-sulfonic acid, aniline-2,4-, -2,5- or -3,5-disulfonic acid, 2-naphthylamine-1,5- or -4,8-disulfonic acid, 2-naphthylamine-3,6,8- or -4,6,8-trisulfonic acid, 1-naphthylamine-3,6,8- or -4,6,8-trisulfonic acid, 1-naphthylamine-4-sulfonic acid, 2-naphthylamine-1-sulfonic acid, 3- or 4-aminoacetanilide, 4- or 5-acetylamino-2-sulfoaniline, 4-nitroaniline, 4-nitroaniline-2-sulfonic acid or 2-amino-6-acetylaminonaphthalene-4,8-disulfonic acid.

Examples of coupling components of other series are pyrazolones and aminopyrazoles, 2,6-diaminopyridines, pyridones, hydroxy- and aminopyrimidines, indoles, barbituric acid derivatives and acetoacetarylides.

Coupling components of these series which do not contain fiber-reactive groups correspond to, for example, the formulae VII a-f

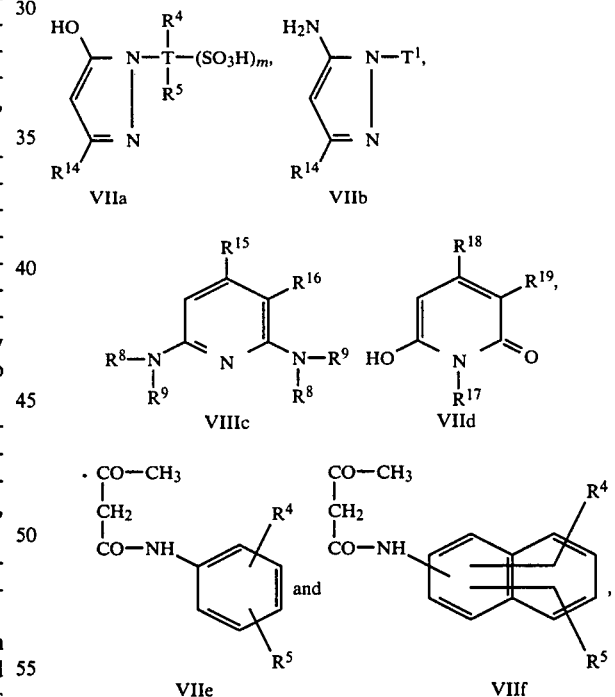

where T is a benzene or naphthalene nucleus, $T^1$ is $C_1$-$C_4$-alkyl, cyclohexyl or benzyl or is phenyl which is monosubstituted or polysubstituted by fluorine, chlorine, bromine, methyl, methoxy, nitro, hydroxysulfonyl, hydroxycarbonyl, acetyl, acetylamino, methylsulfonyl, aminosulfonyl or aminocarbonyl, R14 is methyl, hydroxycarbonyl, methoxycarbonyl, ethoxycarbonyl or phenyl, $R^{15}$ is hydrogen, methyl or ethyl or is $C_1$-$C_4$-alkyl which is substituted by methoxy, ethoxy or cyano, $R^{16}$ is hydrogen, methyl, sulfomethylene, hydroxysulfonyl, cyano or aminocarbonyl, $R^{17}$ is hydrogen or $C_1$–$C_4$-alkyl which can be substituted by phenyl or by sulfophenyl, or is $C_1$–$C_4$-alkyl which is substituted by hydroxyl, amino, methoxy, ethoxy, hydroxycarbonyl, hydroxysulfonyl, acetylamino, benzoylamino or cyano, or is cyclohexyl or phenyl or is phenyl which is substituted by hydroxycarbonyl, hydroxysulfonyl, benzoylamino, acetylamino, methyl, methoxy, cyano or chlorine or is amino which is substituted by phenyl, $C_1$–$C_4$-alkyl, acetyl or benzoyl, $R^{18}$ is $C_1$–$C_4$-alkyl, phenyl, hydroxyl, cyano, acetyl, benzoyl, hydroxycarbonyl, methoxycarbonyl, aminocarbonyl or sulfomethylene, $R^{19}$ is hydrogen, chlorine, bromine, acetylamino, amino, nitro, hydroxysulfonyl, aminosulfonyl, methylsulfonyl, phenylsulfonyl, hydroxycarbonyl, methoxycarbonyl, acetyl, benzoyl, aminocarbonyl, cyano or sulfomethylene, and $R^4$, $R^5$, $R^8$, $R^9$ and m have the above meanings.

Examples of pyrazolone coupling components are 3-methyl-, 3-carboxy- and 3-alkoxycarbonyl-5-pyrazolones which can carry in the 1-position hydrogen or phenyl which is unsubstituted or substituted by methyl, ethyl, fluorine, chlorine, bromine, trifluoromethyl, methoxy, ethoxy, cyano, phenoxy, phenylsulfonyl, methylsulfonyl, hydroxysulfonyl, benzoyl, acetyl, acetylamino, nitro, hydroxyl, carboxyl, carbamyl or sulfamyl, or can carry hydroxysulfonyl-substituted α- or β-naphthyl, eg. 1-phenyl-, 1-(2'-chlorophenyl)-, 1-(2'-methoxyphenyl)-, 1-(2'-methylphenyl)-, 1-(2',5'-dichlorophenyl)-, 1-(2',6'-dichlorophenyl)-, 1-(2'-methyl-6'-chlorophenyl)-, 1-(2'-methoxy-5'-methylphenyl)-, 1-(2'-chloro-5'-sulfophenyl)- 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)- or 1-(3'-sulfamylphenyl)-3-carboxy-5-pyrazolone or 1-(3'- or 4'-sulfophenyl)-, 1-(2'-chlorophenyl)-, 1-(2'-chloro-4'- or -5'-sulfophenyl)-, 1-(2'-methyl-4'-sulfophenyl)-, 1-(2',5'-dichlorophenyl)-, 1-(4',8'-disulfo-β-naphthyl)- or 1-(6'-sulfo-α-naphthyl)-3-methyl-5-pyrazolone, ethyl 1-phenyl-5-pyrazolone-3-carboxylate, ethyl 5-pyrazolone-3-carboxylate or 5-pyrazolone-3-carboxylic acid.

Examples of other coupling components derived from the pyrazole series are 1-methyl-, 1-ethyl-, 1-propyl-, 1-butyl-, 1-cyclohexyl-, 1-benzyl- and 1-phenyl-5-aminopyrazole, 1-(4'-chlorophenyl)- and 1-(4'-methylphenyl)-5-aminopyrazole and 1-phenyl-3-methyl-5-aminopyrazole.

Acetoacetanilides are, in particular, acetoacetanilide and its derivatives which are monosubstituted or polysubstituted in the phenyl nucleus by chlorine, methyl, ethyl, methoxy, ethoxy, acetylamino, hydroxylsulfonyl, hydroxycarbonyl, aminocarbonyl or aminosulfonyl.

Examples of coupling components derived from pyridine are the derivatives described in German Laid-Open Application DOS No. 2,260,827.

Examples of suitable pyrimidine coupling components are the compounds listed in German Laid-Open Applications DOS NO. 2,202,820, DOS No. 2,308,663 and DOS No. 3,119,349. Barbituric acid and its N-substitution products may also be mentioned. N-Substituents are, in particular, $C_1$–$C_4$-alkyl and unsubstituted or substituted phenyl.

Examples of indole coupling components are 2-methylindole, 2-phenylindole, 2-phenylindole-5-sulfonic acid, 1-methyl-2-phenylindole and 1-(2'-hydroxyethyl)-, 1-(2'-carboxyethyl)- and 1-(2'-carbamylethyl)-2-methylindole and -2-phenylindole.

Examples of pyridone coupling components are 1-ethyl-2-hydroxy-4-methyl-5-carboxamidopyrid-6-one, 1-(2'-hydroxyethyl)-2-hydroxy-4-methyl-5-carboxamidopyrid-6-one, 1-phenyl-2-hydroxy-4-methyl-5-carboxamidopyrid-6-one, 1-ethyl-2-hydroxy-4-methyl-5-cyanopyrid-6-one, 1-ethyl-2-hydroxy-4-sulfomethyl-5-carboxamidopyrid-6-one, 1-ethyl-2-hydroxy-4-methyl-5-sulfomethylpyrid-6-one, 1-methyl-2-hydroxy-4-methyl-5-cyanopyrid-6-one, 1-methylhydroxy-5-acetylpyrid-6-one, 1,4-dimethyl-2-hydroxy-5-cyanopyrid-6-one, 1,4-dimethylhydroxy-5-carboxamidopyrid-6-one, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethylpyrid-6-one, 1-methyl-2-hydroxy-4-methyl-5-methylsulfonylpyrid-6-one and 1-carboxymethyl-2-hydroxy-4-ethyl-5-phenylsulfonylpyrid-6-one.

Examples of coupling components which are derived from the aniline and naphthalene series and contain fiber-reactive groups are compounds of the formulae VIII a-e

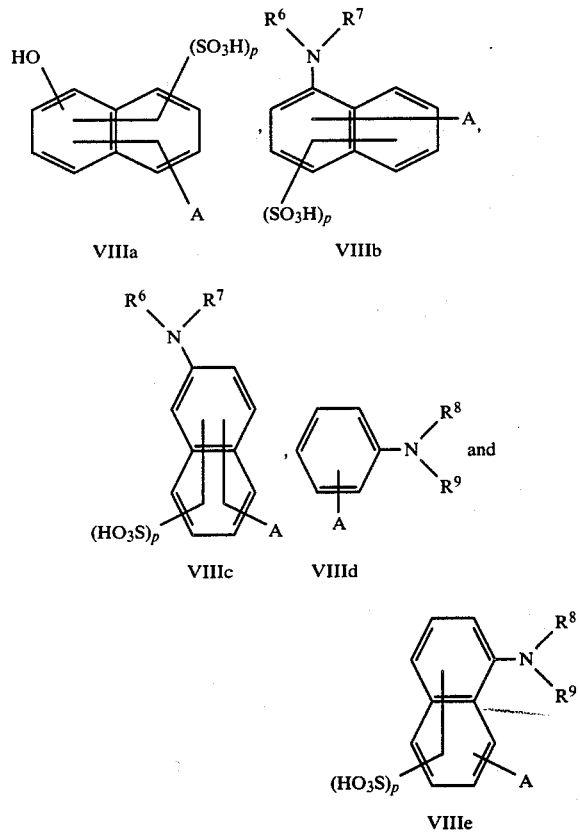

VIIIa, VIIIb, VIIIc, VIIId, VIIIe where $R^6$, $R^7$, $R^8$, $R^9$, A and p have the above meanings.

Particularly important compounds among these are sulfo-containing and/or carboxyl-containing coupling components which may or may not carry azo groups, which couple in the o- or p-position to a hydroxyl group and/or an amino group and which carry a fiber-reactive radical A, eg. 2-(5'-hydroxy-7'-sulfonaphth-2'-ylamino)-4,6-dichlorotriazine, 2-(5'-hydroxy-7'-sulfonaphth-2-ylmethylamino)-4,6-dichlorotriazine, 2-(8'-hydroxy-6'-sulfonaphth-2'-ylamino)-4,6-dichlorotriazine, 2-(8'-hydroxy-6'-sulfonaphth-2'-yl-methylamino)-

4,6-dichlorotriazine, 2-(8'-hydroxy-3',6'-disulfonaphth-1'-ylamino)-4,6-dichlorotriazine or 2-(8'-hydroxy-4',6'-disulfonaphth-1'-ylamino)-4,6-dichlorotriazine, or their monocondensates with primary and secondary, aliphatic and aromatic amines, such as ammonia, methylamine, ethylamine, taurine, glycine, sarcosine, β-hydroxyethylamine, dihydroxyethylamine, hydrazine, aniline, N-methylaniline, N-ethylaniline, morpholine, toluidine, anisidine, cresidine, o-, m- or p-anilinesulfonic acid, aniline-2,4- or -2,5-disulfonic acid, o-, m- or p-aminobenzoic acid, m- or p-vinylsulfonylaniline, m- or p-sulfatoethylsulfonylaniline, N-methylanthranilic acid or m- or p-allylsulfonylaniline.

Further examples are the secondary condensates of 1-amino-8-hydroxynaphthalene-3,6- or -4,6-disulfonic acid, 2-amino-8-hydroxynaphthalene-6-sulfonic acid, 2-amino-5-hydroxynaphthalene-7-sulfonic acid, 2-methylamino-8-hydroxynaphthalene-6-sulfonic acid or 2-methylamino-5-hydroxynaphthalene-7-sulfonic acid with cyanuric fluoride or a primary or secondary aliphatic or aromatic amine.

Other examples are the monocondensates of 1-amino-8-hydroxynaphthalene-3,6- or -4,6-disulfonic acid, 2-amino-8-hydroxynaphthalene-6-sulfonic acid, 2-amino-5-hydroxynaphthalene-7-sulfonic acid, 2-methylamino-8-hydroxynaphthalene-6-sulfonic acid or 2-methylamino-5-hydroxynaphthalene-7-sulfonic acid with, for example, acryloyl chloride, β-chloropropionyl chloride, β-bromopropionyl chloride, chloroacetyl chloride, α,β-dichloropropionyl chloride, 2,3-dichloroquinoxaline-5-carbonyl chloride, 2,3-dichloroquinoxaline-6-carbonyl chloride, 2,3-dichloroquinazoline-5- or -6-sulfonyl chloride, 2,4-dichloroquinazoline-6- or -7-sulfonyl chloride, 2,4,6-trichloroquinoazoline-7- or -8-sulfonyl chloride, 2,4,7- or 2,4,8-trichloroquinazoline-6-sulfonyl chloride, 2,4-dichloroquinazoline-6-carbonyl chloride, 2,6-dichloropyrimidine-4- or -5-carbonyl chloride, 2,6-dichloropyrimidine-5-sulfonyl chloride, 2,4,6-trichloropyrimidine, 2,4,6-trichloro-5-methylpyrimidine, 2,4,6-tribromo-5-cyanopyrimidine, 2,4,5,6-tetrachloropyrimidine, 2,4,6-trifluoropyrimidine, 2,4,6-trifluoro-5-chloropyrimidine, 4,6-difluoro-5-chloropyrimidine, 2-methylsulfonyl-4-chloro-6-methylpyrimidine, 2-methylsulfonyl-4,5-dichloro-6-methylpyrimidine, 2-methylsulfonyl-4-chloropyrimidine-5-carbonyl chloride, 2,4,6-trichloro-5-methylsulfonylpyrimidine, 2,4,6-trifluoro-5-methylsulfonylpyrmidine, 2-methyl-4,6-dichloro-5-methylsulfonylpyrimidine, 2,4,5-trichloro-6-methylsulfonylpyrimidine, 2,4,6-trichloropyrimidine-5-carbonyl chloride, tetrachloropyridazine, tetrafluoropyridazine, 3,6-dichloropyridazine-4-carbonyl chloride, p-(4,5-dichloropyridazinonyl)-benzoyl chloride, β-(4,5-dichloropyridazinonyl)-propionyl chloride, p-(4,5-dichloropyridazinonyl)-benzenesulfonyl chloride, p-(4-fluoro-5-chloropyridazinonyl)-benzoyl chloride, p-(4-fluoro-5-chloropyridazinonyl)-benzenesulfonyl chloride, β-(4-fluoro-5-chloropyridazinonyl)-propionyl chloride and 1,4-dichloro-phthalazine-6-carbonyl chloride (pyridazinonyl=pyridazin-6-on-1-yl).

Other examples are, in particular, the arylazo coupling products, obtained by acidic coupling, of the 1-amino-8-hydroxynaphthalene-3,6- or -4,6-disulfonic acid of the formula

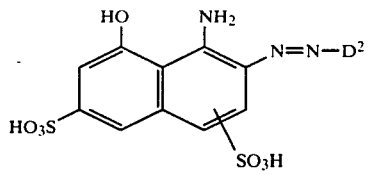

where $D^2$ can be a diazo component radical which contains reactive groups, for example a radical of the formula

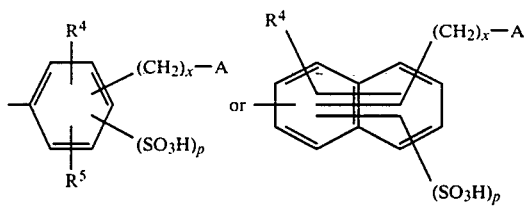

where $R^4$, $R^5$, x, p and A have the above meanings.

Specific examples of aromatic amines from which the diazo component radicals $D^2$ which carry fiber-reactive radicals A are derived are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,6-diaminonaphthalene-4-sulfonic acid, 2,6-diamino-4,8-disulfonaphthalene, 1,3-diaminobenzene-5-sulfonic acid, 1,3-diamino-5-methylbenzene, 5-(ω-aminomethyl)-2-aminonaphthalene-1-sulfonic acid, 5-(ω-N-methylaminomethyl)-2-aminonaphthalene-1-sulfonic acid, 4,4'-diaminostilbene-3,3'-dicarboxylic acid, 4-(ω-N-methylaminomethyl)-aniline-2-sulfonic acid and 3-(ω-N-methylaminomethyl)-aniline-6-sulfonic acid, and in all these amino compounds the single primary or secondary amino group is substituted by a fiber-reactive acyl radical A.

Specific examples of the diazo component radicals $D^2$ which carry fiber-reactive groups are

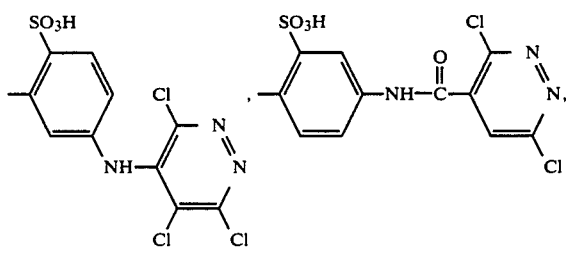

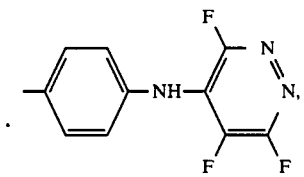

-continued
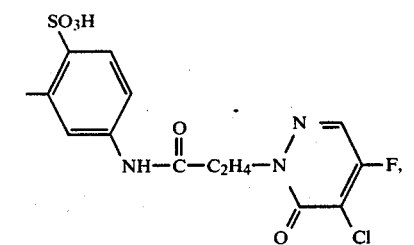
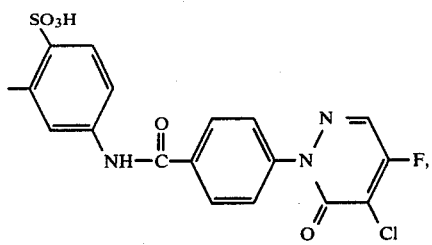
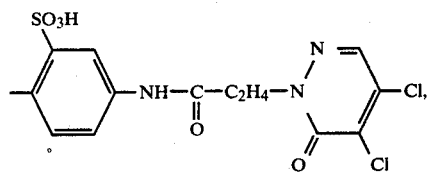
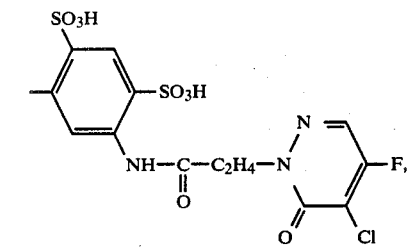
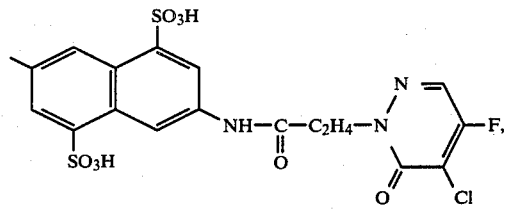
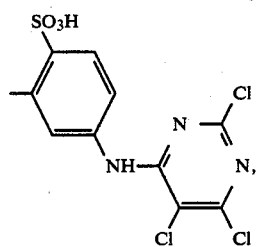
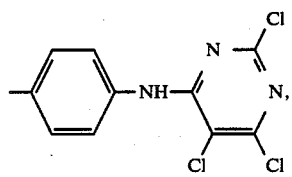
-continued
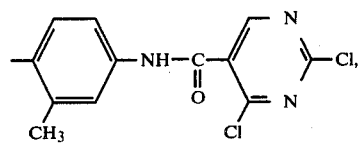
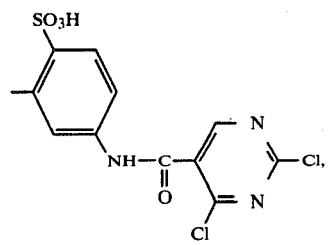
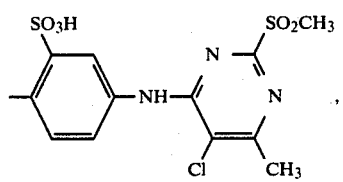
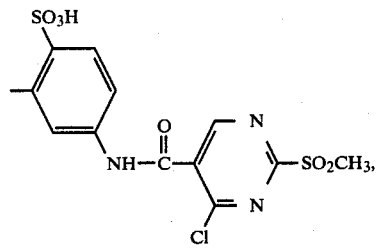
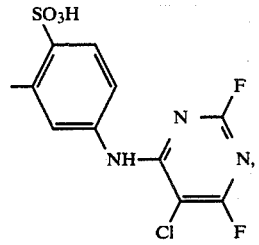
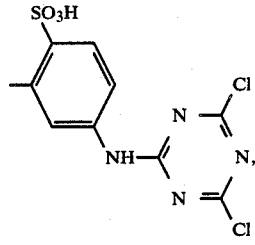
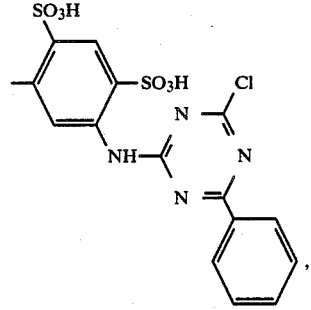

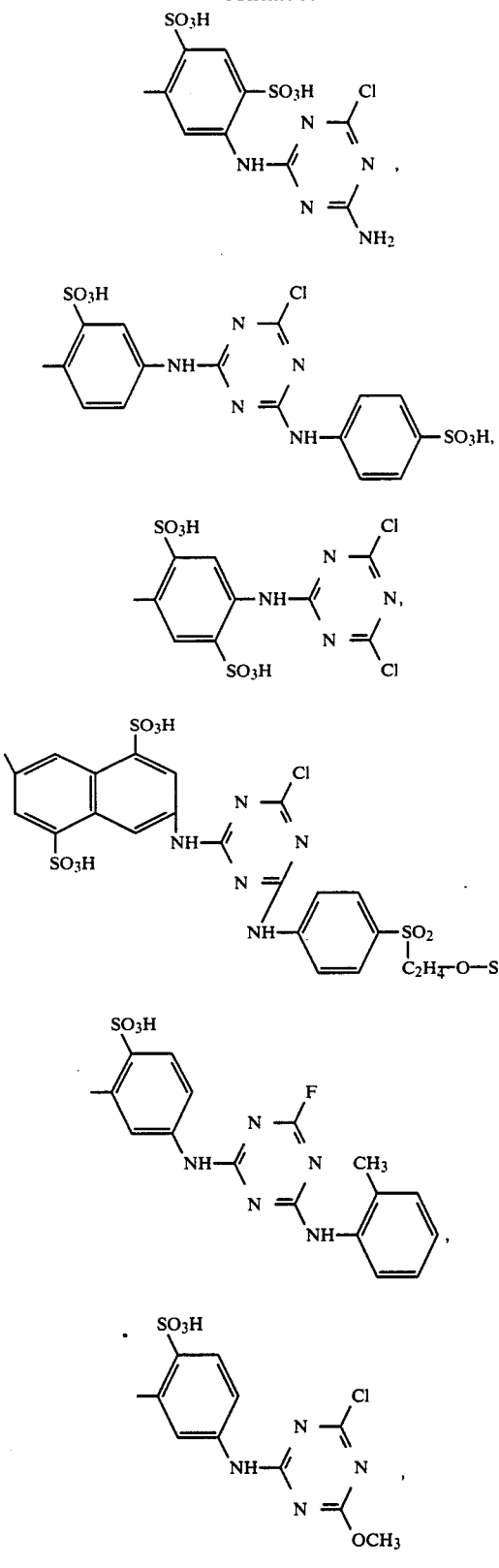
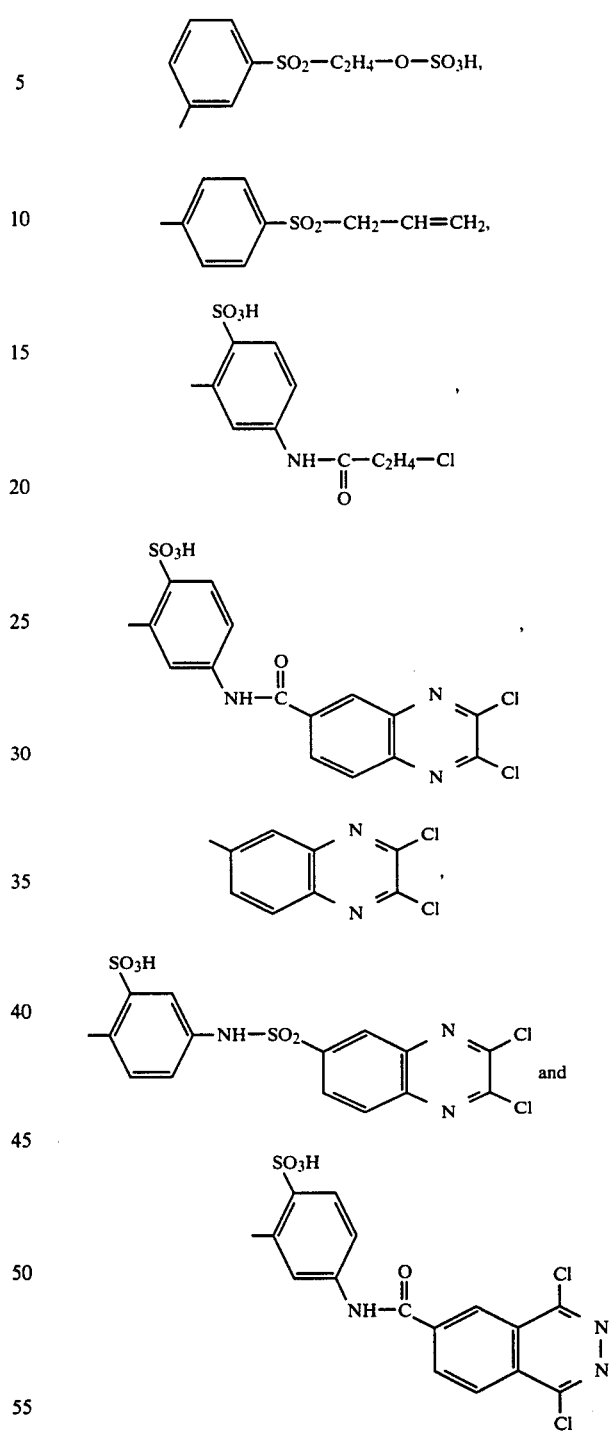
Coupling components which are derived from the pyrazolone, aminopyrazole, 2,6-diaminopyridine, pyridone, hydroxypyrimidine, aminopyrimidine, indole, barbituric acid or acetoacetarylide series and contain fiber-reactive groups correspond to, for example, the formulae IX a-f

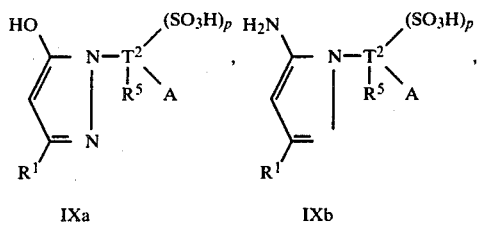

IXa , IXb ,

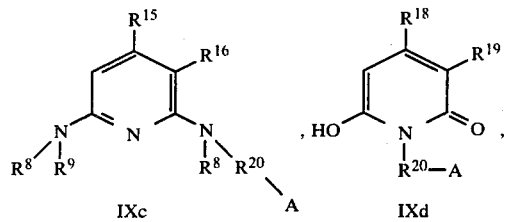

IXc , IXd ,

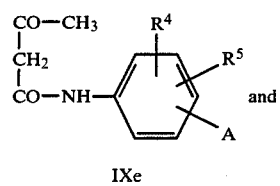

IXe and

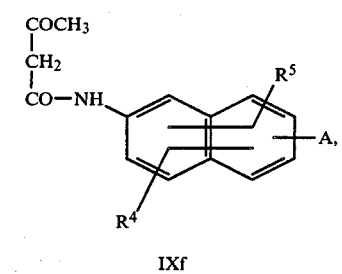

IXf where $T^2$ is a benzene or naphthalene nucleus, $R^{20}$ is $C_1$–$C_4$-alkyl, benzyl, phenylethyl or phenyl, and the phenyl nuclei can be further substituted by fluorine, chlorine, bromine, methyl, methoxy, cyano, hydroxysulfonyl, hydroxycarbonyl, acetyl, nitro, aminocarbonyl or aminosulfonyl, and $R^1$, $R^4$, $R^5$, $R^8$, $R^9$, $R^{15}$, $R^{16}$, $R^{18}$, $R^{19}$, p an A have the above meanings.

Pyrazolone coupling components which carry fiber-reactive radicals A are derived from, for example, one of the following pyrazolones: 1-(3'- or 4'-aminophenyl)-, 1-(2'-sulfo-5'-aminophenyl)- or 1-(2'-methoxy-5'-aminophenyl)-3-carboxypyrazol-5-one, 1-(3'- or 4'-aminophenyl)- or 1-(3'- or 4'-nitrophenyl)-3-methylpyrazol-5-one or 1-(3'- or 4'-nitrophenyl)-, 1-(6'-nitro-4',8'-disulfonaphth-2'-yl)- or 1-(6'-amino-4',8'-disulfonaphth-2'-yl)-3-carboxypyrazol-5-one.

Specific examples of pyrazolones which carry fiber-reactive radicals A are:

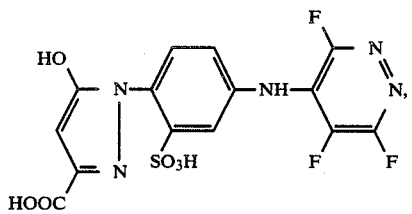

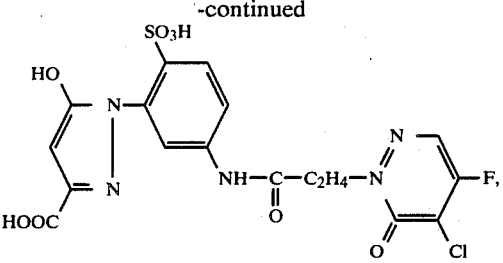

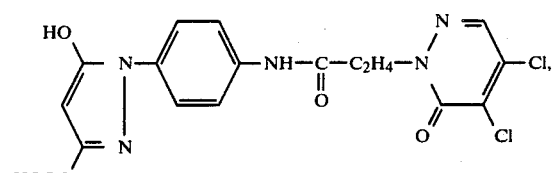

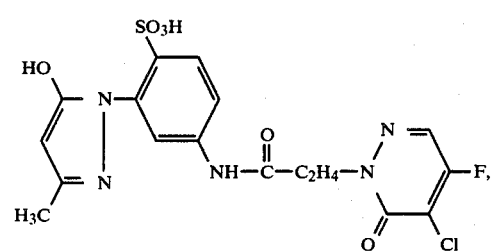

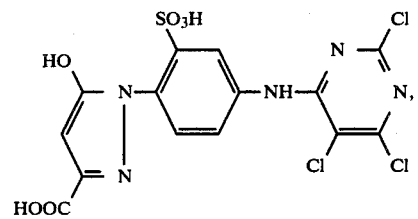

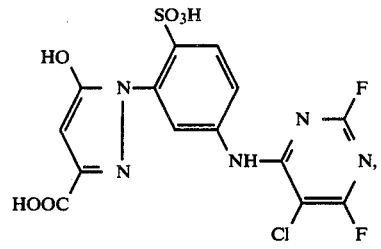

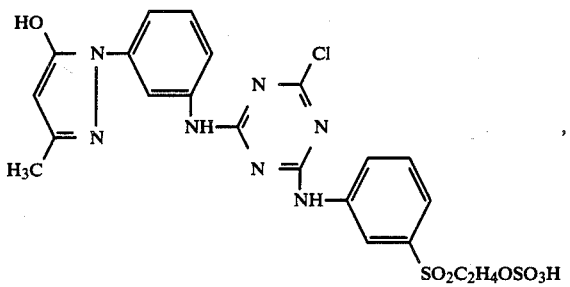

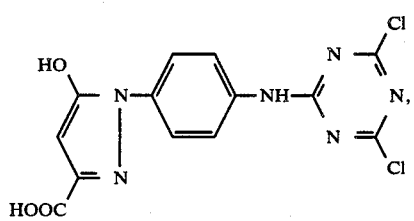

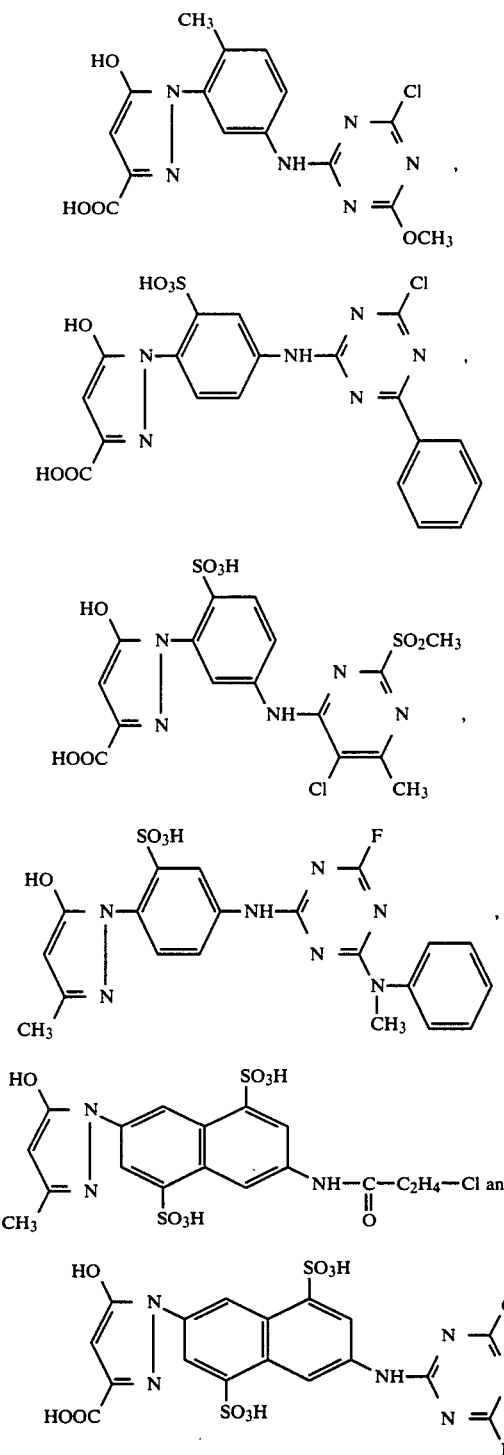
Further examples are:
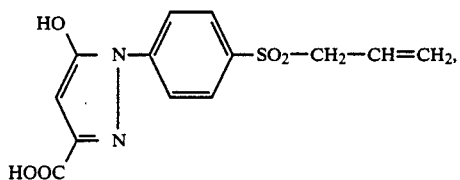
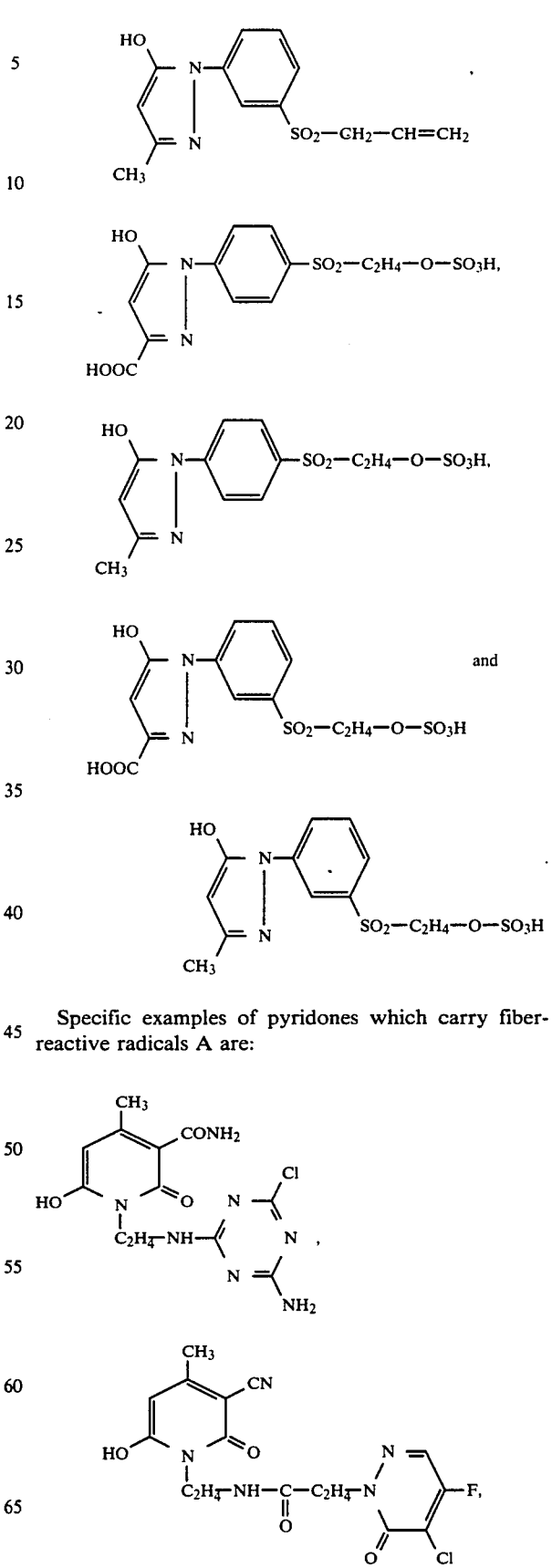
Specific examples of pyridones which carry fiber-reactive radicals A are:

-continued

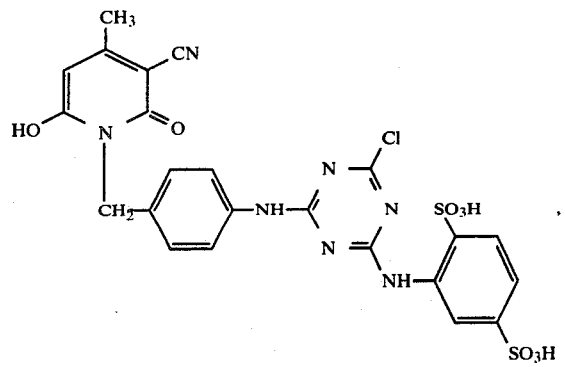

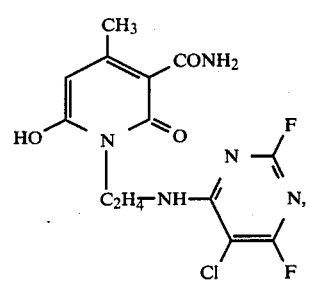

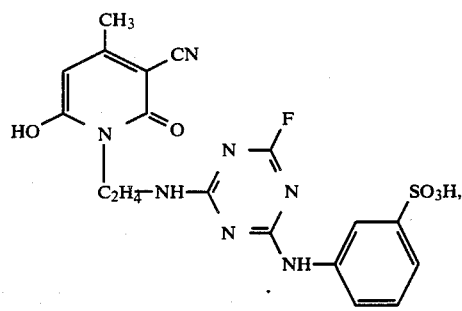

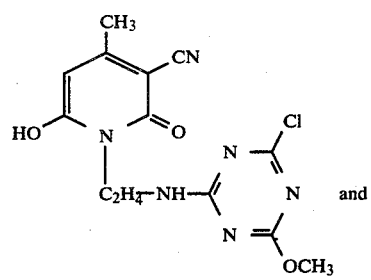

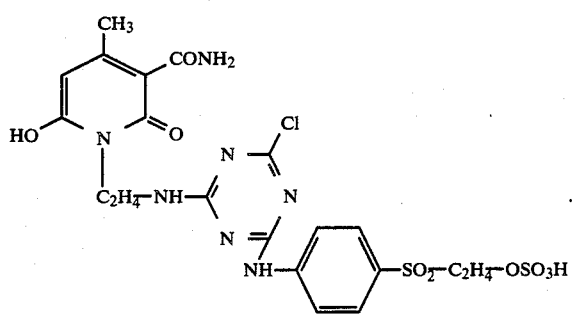

Radicals of the formula

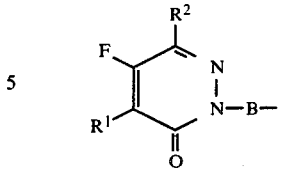

and their preparation are described in Patent Application P No. 32 29 325.9. For bonding the dye radicals X, any method conventionally used in the chemistry of reactive dyes can be employed. A representative selection of preparation methods for the dyes of the formula I is described in the Examples, in which parts and percentages are by weight, unless stated otherwise.

Of particular industrial importance are compounds of the general formula

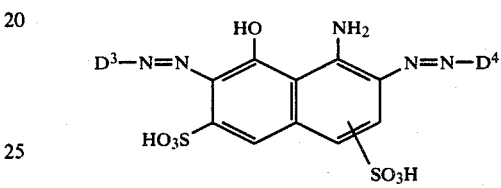

where $D^3$ and $D^4$ are identical or different radicals of diazo components, one or both of these carrying a radical of the formula

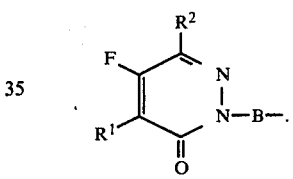

Other useful compounds are those of the formula

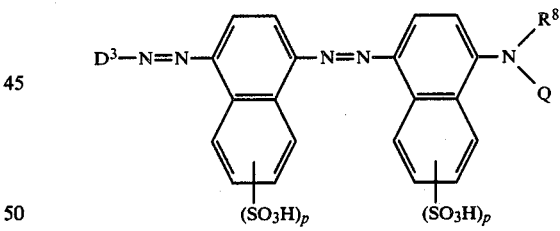

where Q is an acyl radical which may or may not contain a reactive radical, and $D^3$, p and $R^8$ have the above meanings.

Dye radicals X of the dioxazine series correspond to the general formula

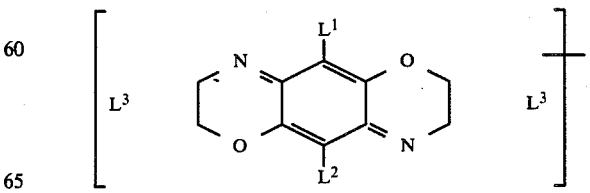

where $L^1$ and $L^2$ independently of one another are each hydrogen, chlorine, bromine, cyano, unsubstituted or substituted alkyl, aryl, hetaryl, alkoxy, aryloxy or acylamino, and the groups $L^3$ independently of one another are each a radical of the formula

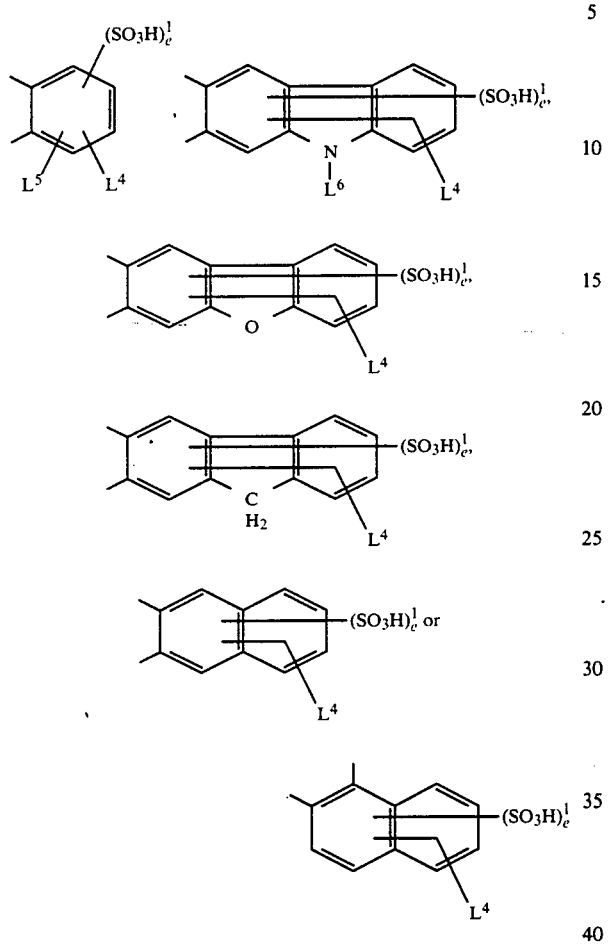

where $e^1$ is 0, 1 or 2, $L^4$ is a bridge member, $L^5$ is hydrogen, alkoxy or acylamino, and $L^6$ is hydrogen or $C_1$-$C_4$-alkyl.

Specific examples of radicals $L^1$ and $L^2$, in addition to those stated above, are $CH_3$, $C_2H_5$, $C_3H_7$, $C_4H_9$, $C_6H_5$, $C_6H_4Cl$, $C_6H_3Cl_2$, $C_6H_4CH_3$, $C_6H_4OCH_3$, $C_6H_4NO_2$, $C_6H_3ClCH_3$, 2-thienyl, $OCH_3$, $OC_2H_5$, $OC_3H_7$, $OC_4H_9$, $OC_6H_5$, $OC_6H_4Cl$, $OC_6H_4CH_3$, $NHCOCH_3$, $NHCOC_2H_5$ and $NHCOC_3H_7$.

$L^1$ and $L^2$ are each preferably hydrogen or, in particular, Cl.

Specific examples of radicals $L^5$ are hydrogen, methoxy, ethoxy, propoxy, butoxy, acetylamino, propionylamino and butyrylamino.

$L^5$ is preferably hydrogen, methoxy or acetylamino.

Examples of bridge members $L^4$ are sulfonyl, —NH—(alkylene)—NH—, —SO₂—NH—(alkylene)—NH—, —NH—(arylene)—NH—, —SO₂—NH—(arylene)—NH—, —NH—(alkylene)—O—(alkylene)—NH—, —SO₂—(alkylene)—O—(alkylene)—NH—, —O—(alkylene)—O—(arylene)—NH—, —NH—(alkylene)—NH—(arylene)—NH—, —NH—(aralkylene)—NH—, —SO₂—NH—(aralkylene)—NH—, —CH₂—NH— and —CH₂—NHCO—(alkylene)—NH—, and the hydrogen in the NH groups can be replaced by unsubstituted or substituted alkyl, cycloalkyl or aryl groups, which may furthermore be bonded to one another to form a heterocyclic ring.

Specific examples of radicals $L^4$ are

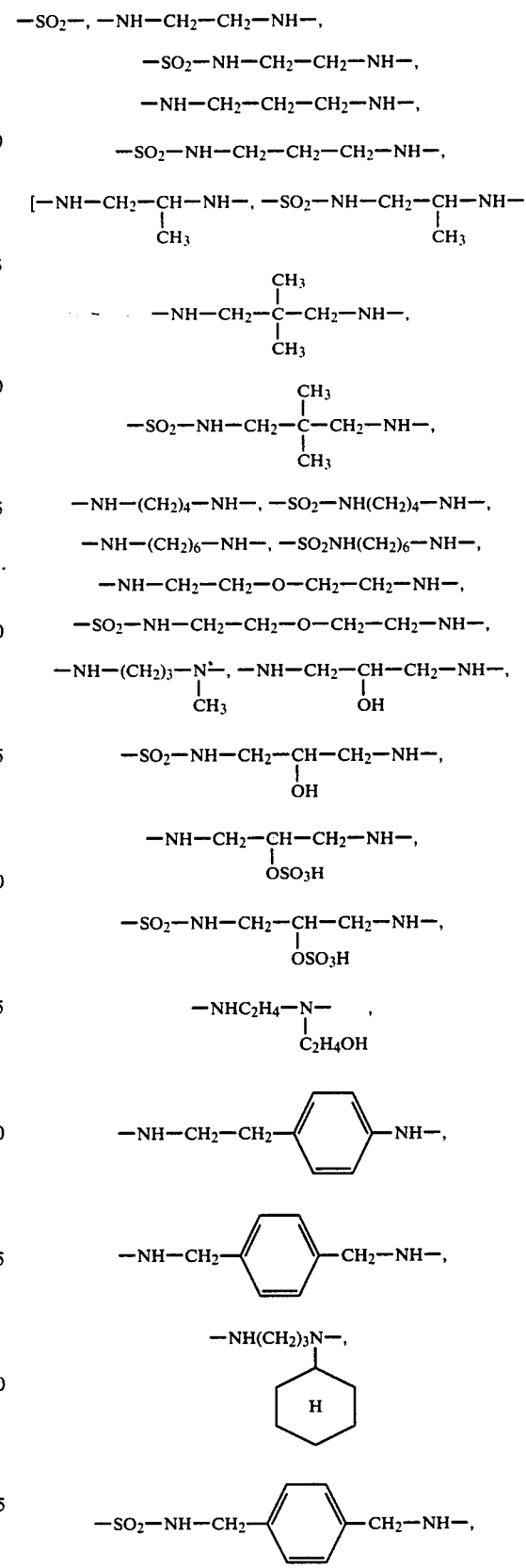

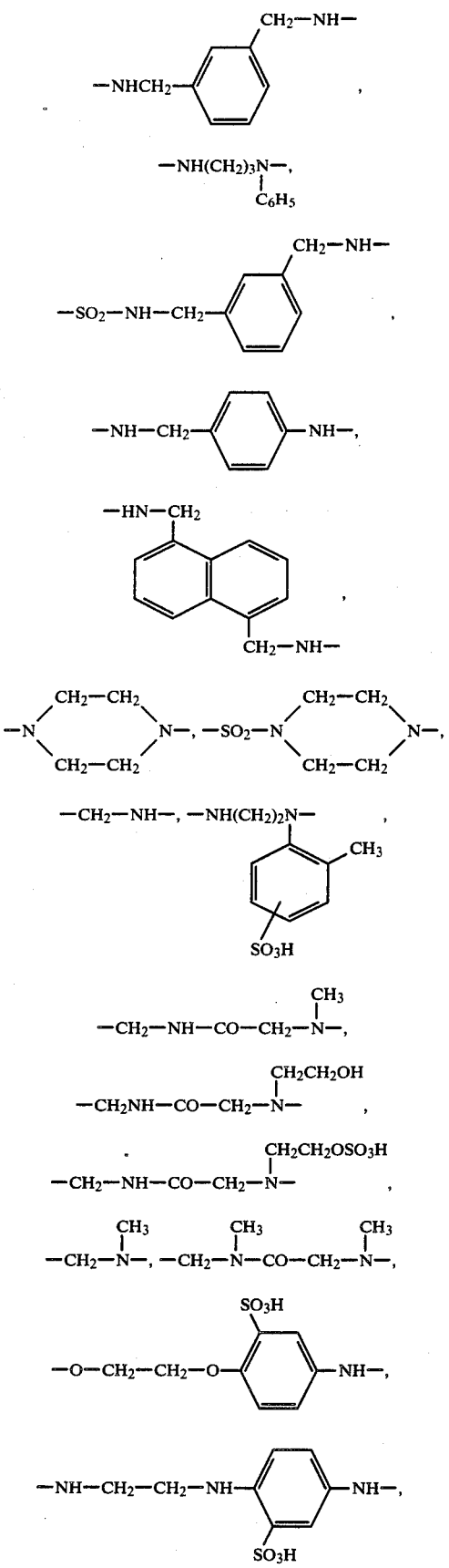
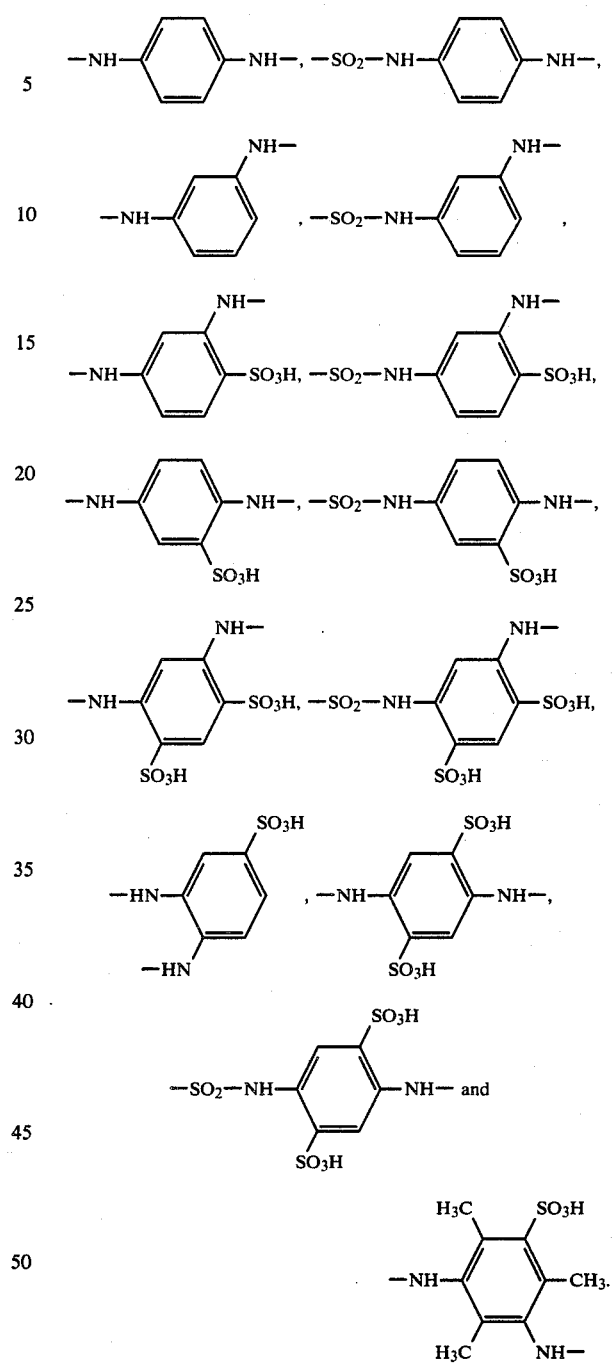
Examples of preferred radicals $L^4$ are:
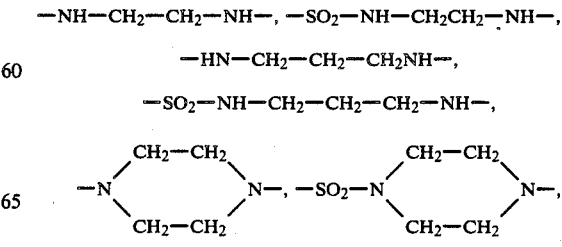

-continued

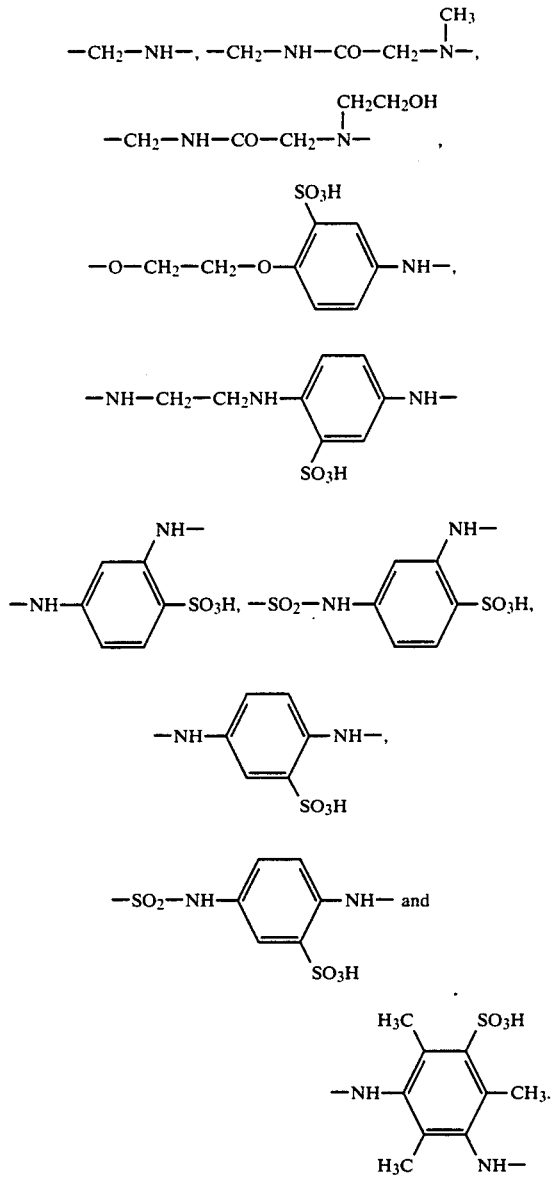

Anthraquinone radicals X are of, for example, the formula

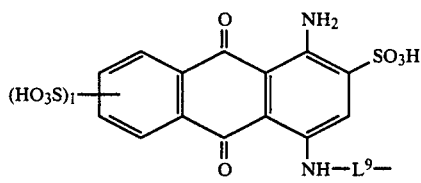

where 1 is 0 or 1 and $L^9$ is a direct bond or a bridge member.

Examples of bridge members are iminophenylene, iminoalkylene, iminocycloalkylene and iminoheteroarylene which are unsubstituted or monosubstituted or polysubstituted by $CH_3$, $SO_3H$, $SO_2NH_2$, Cl, Br or $OCH_3$, or polynuclear radicals which contain a further reactive group.

Specific examples of bridge members $L^9$ are:

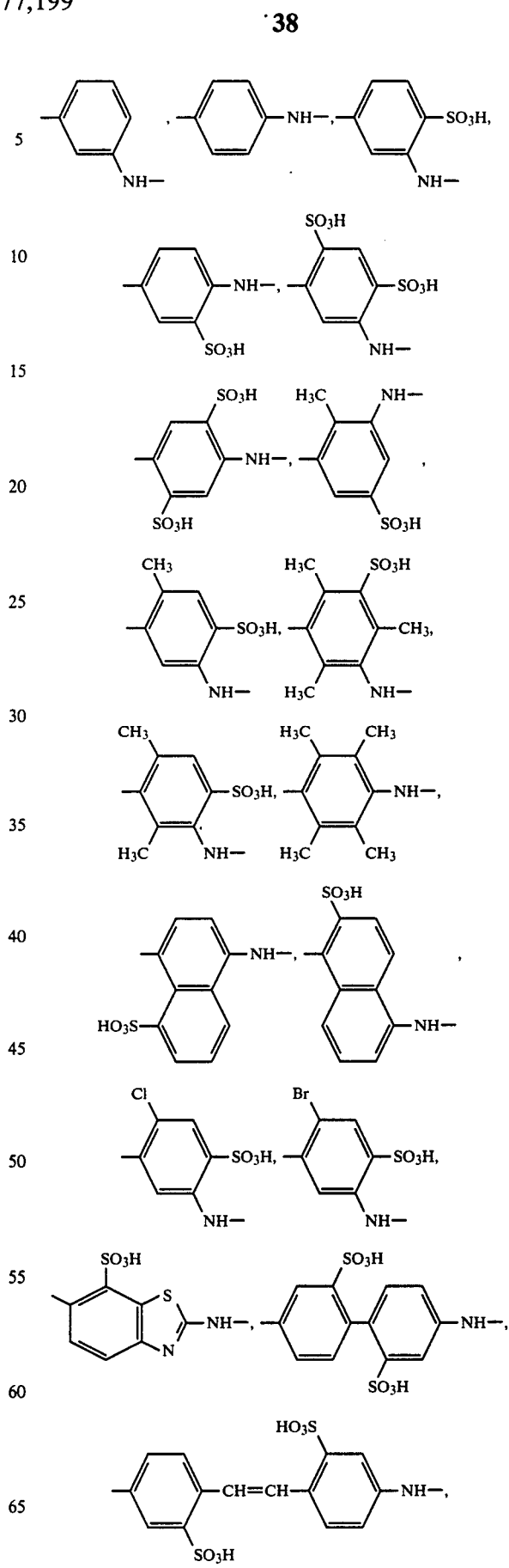

-continued
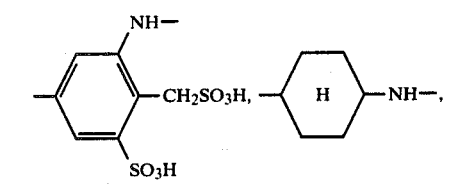
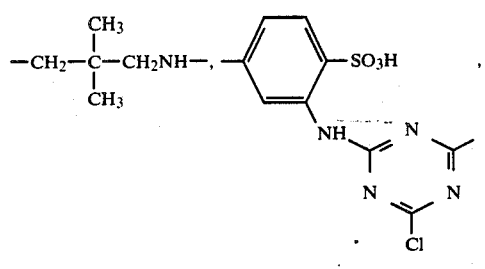
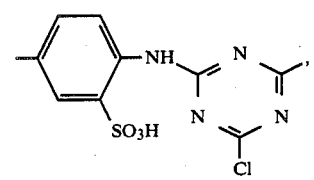
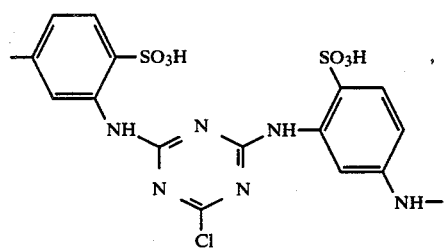
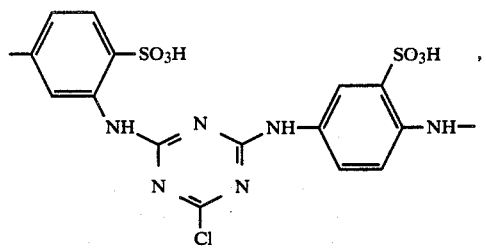
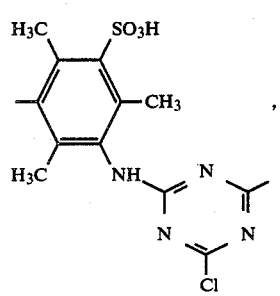
-continued
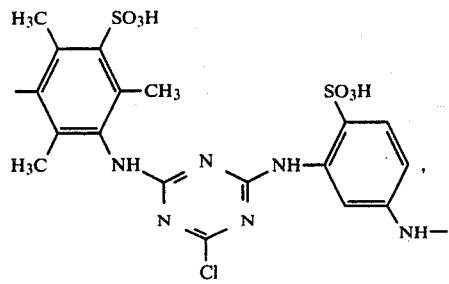
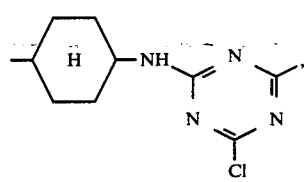
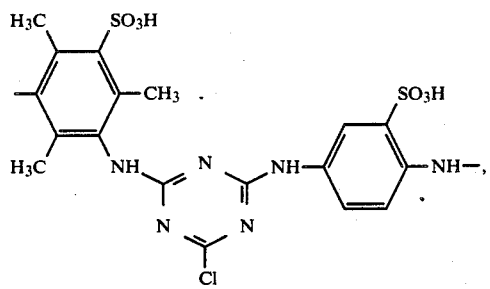
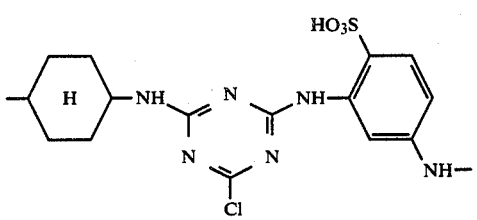
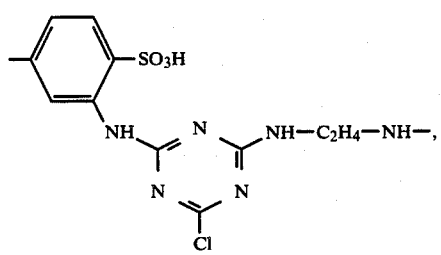
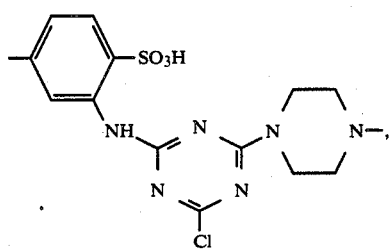

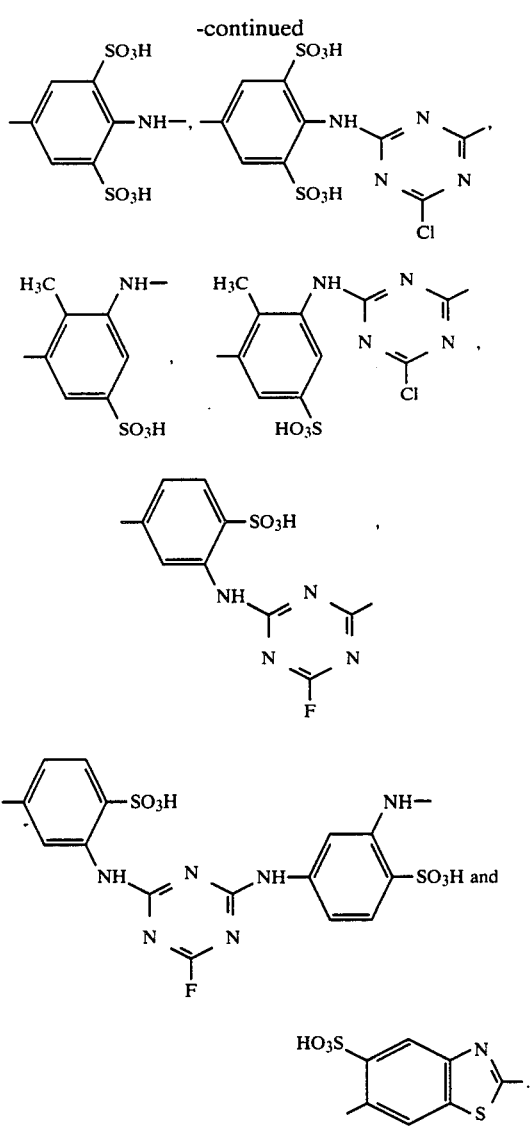
Examples of preferred bridge members L⁹ are:
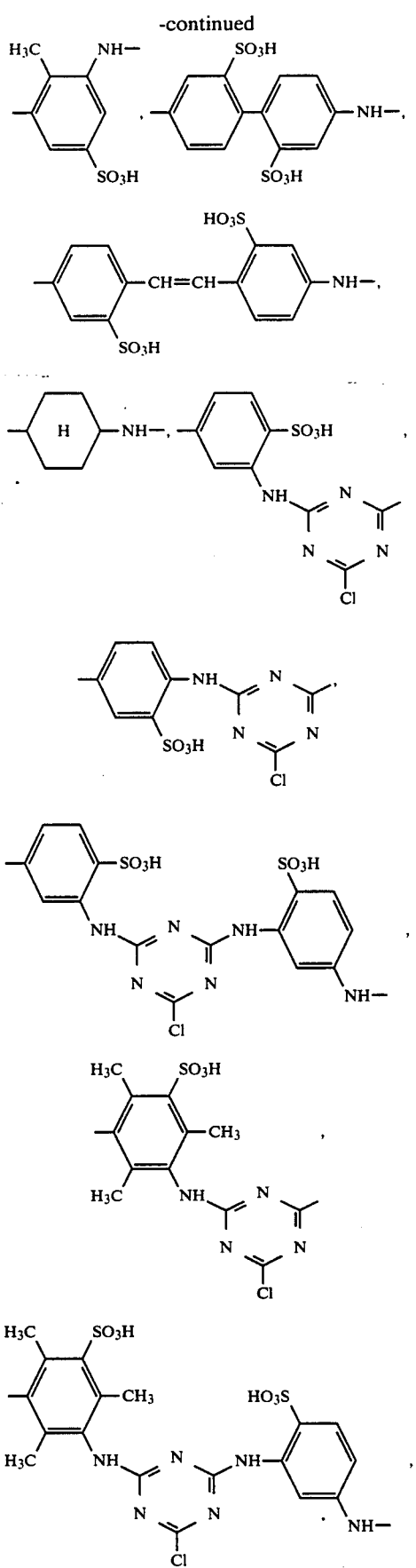

-continued

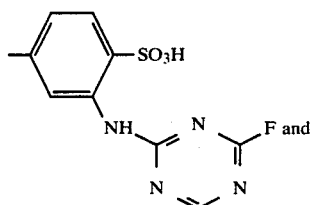

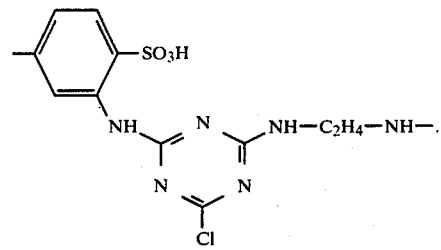

Phthalocyanine radicals X are of the formula

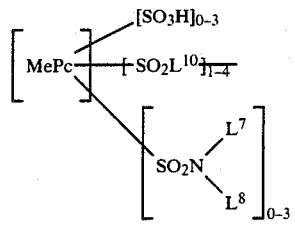

where Me is nickel or copper, $L^7$ and $L^8$ independently of one another are each hydrogen or unsubstituted or substituted alkyl, aralkyl or aryl, and $L^{10}$ is a bridge member or a direct bond.

Specific examples of radicals $L^7$ and $L^8$, in addition to hydrogen, are methyl, ethyl, propyl, butyl, hydroxyethyl and hydroxypropyl. Examples of bridge members $L^{10}$ are —HN—(alkylene)—NH—, —HN—(cycloalkylene)—NH—, —NH—aralkylene—NH—, —NH—(arylene)—NH—, —NH—(arylene)—N=N—(hetarylene)—NH, —NH—(hetarylene)—N=N—(arylene)—NH— and —NH—(arylene)—N=N—(arylene)—NH, and the hydrogen atoms of the NH groups can be replaced by unsubstituted or substituted alkyl, cycloalkyl or aryl groups, which may furthermore be bonded to one another and may hence form a heterocyclic ring.

Specific examples of bridge members $L^{10}$ are:

—HN—CH₂—CH₂—NH—, —HN—CH₂—CH₂—CH₂—NH—,

—HN—CH₂—CH—NH—, —NH—(CH₂)₄—NH—,
           |
          CH₃

—NH—CH₂—CH₂—N—, —NH—CH₂CH₂—N—,
              |                    |
              CH₃               CH₂CH₂OH

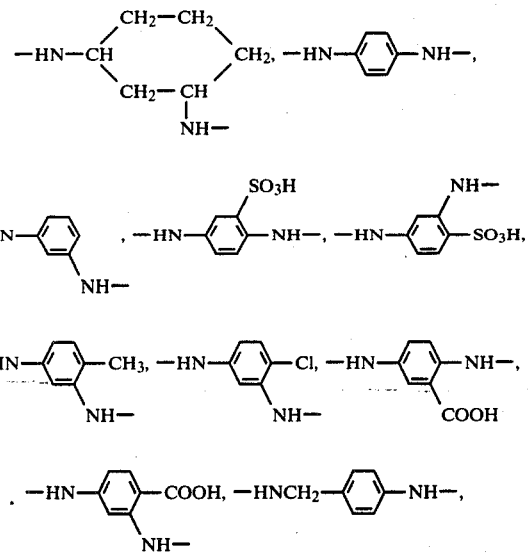

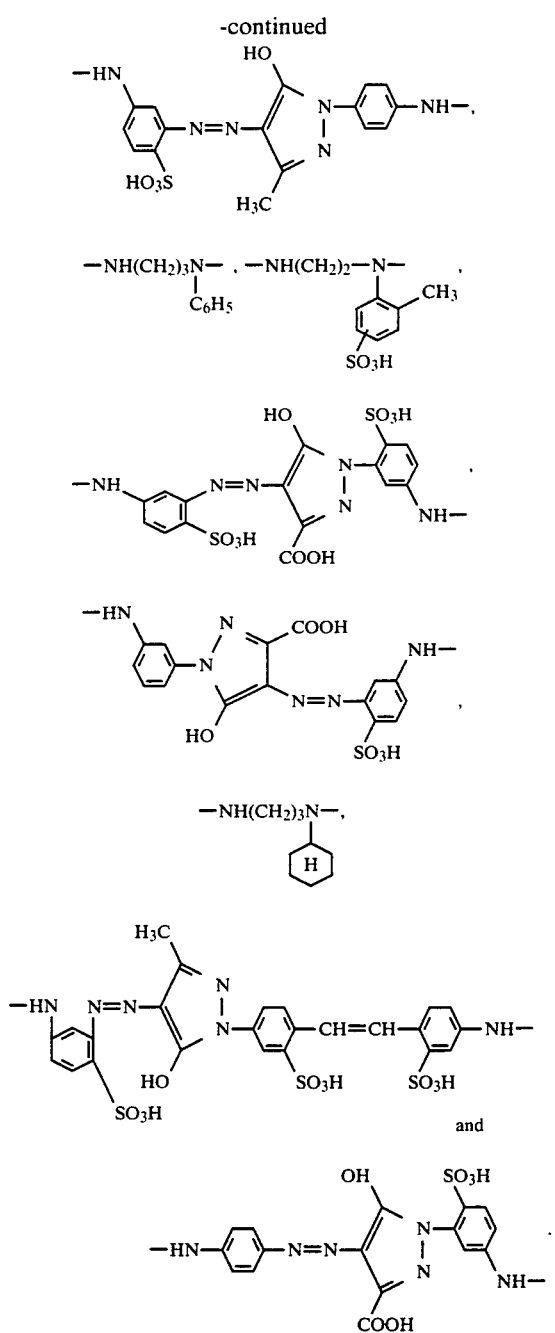

Examples of preferred bridge members $L^{10}$ are:

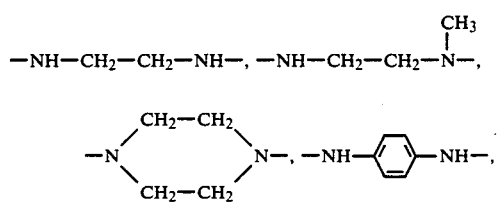

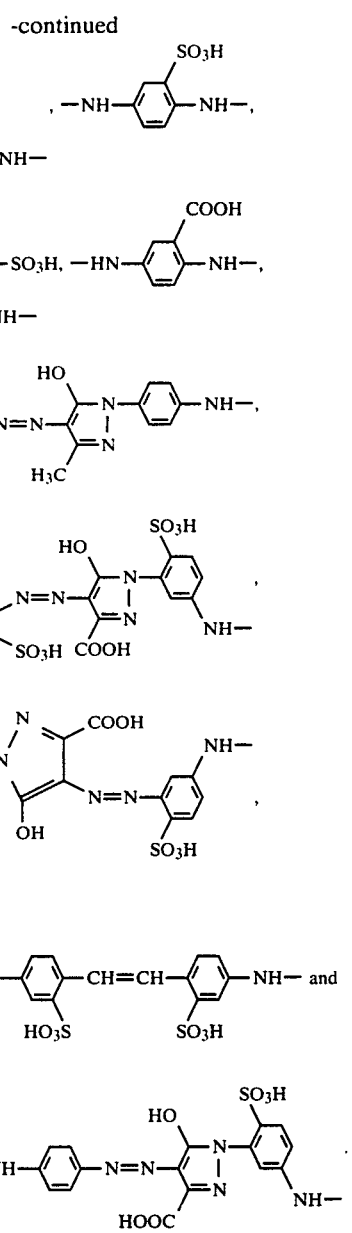

Instead of the azo dye radicals X, it is also possible for dyes of the formula I to contain the corresponding metal complex dye radicals; particularly suitable complex-forming metals are copper, cobalt, chromium, nickel and iron, the three first-mentioned metals being preferred.

As a rule, the metals are bonded to the dye molecules via —O— or —COO—.

The Co and Cr complexes are 1:2 complexes, whereas when Cu is used, 1:1 complexes are obtained exclusively.

Met is preferably copper, cobalt or chromium. The types of dyes mentioned below can furthermore be substituted by substituents conventionally found in reactive dyes, eg. Cl, Br, $OCH_3$, $NHCONH_2$, $NO_2$, $SO_3H$, $SO_2NH_2$, COOH or $CONH_2$. The dyes are synthesized by a conventional method.

Examples of preferred types of complexes are:

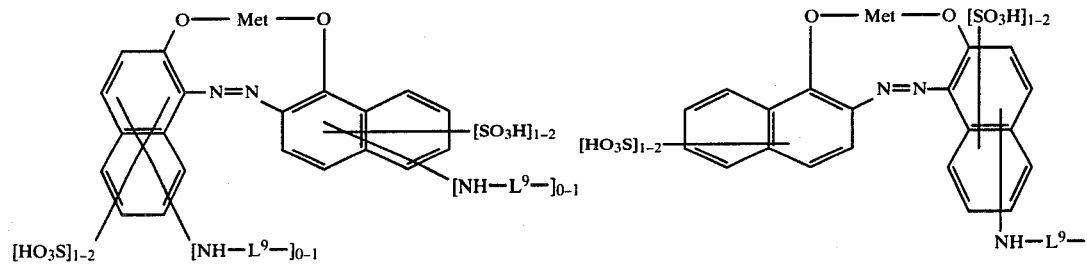
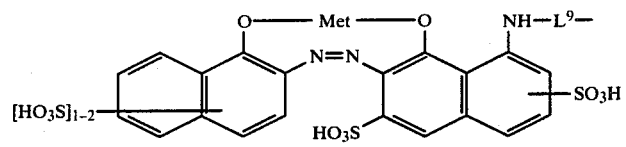
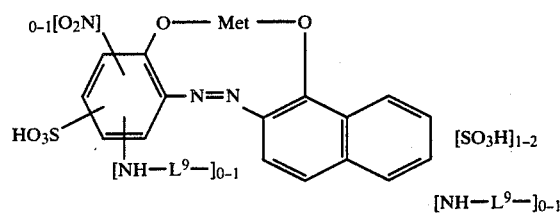
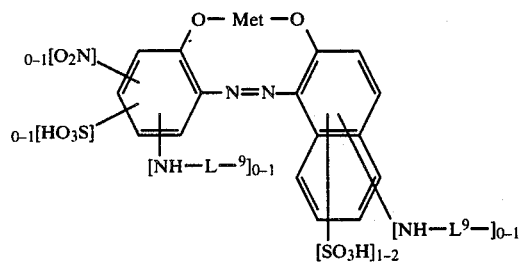
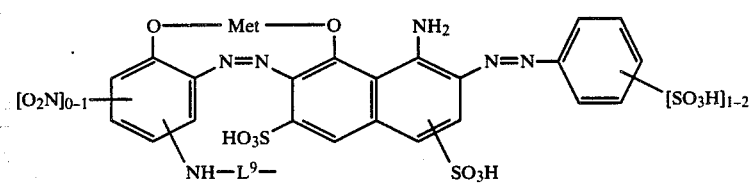
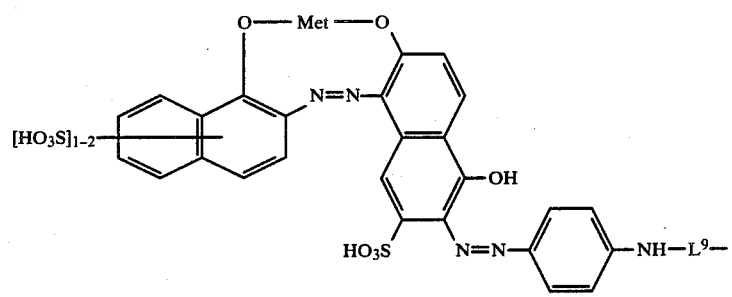
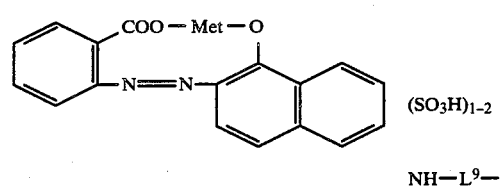
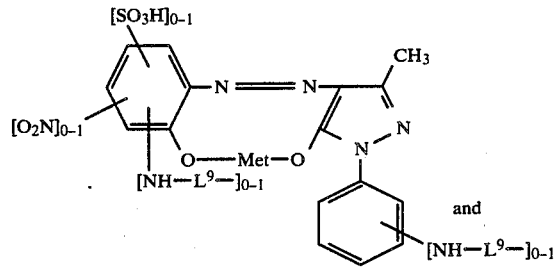

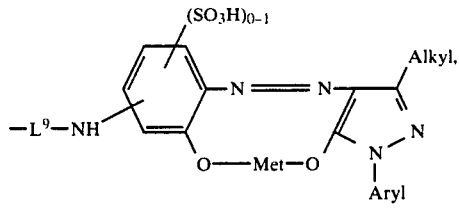

In the above formula, aryl is a phenyl or naphthyl radical which is substituted by any desired substituents, in particular by $SO_3H$, Cl or $OCH_3$, and $L^9$ has the above meanings.

It is also possible to prepare asymmetric 1:2 Co or Cr metal complexes, for example

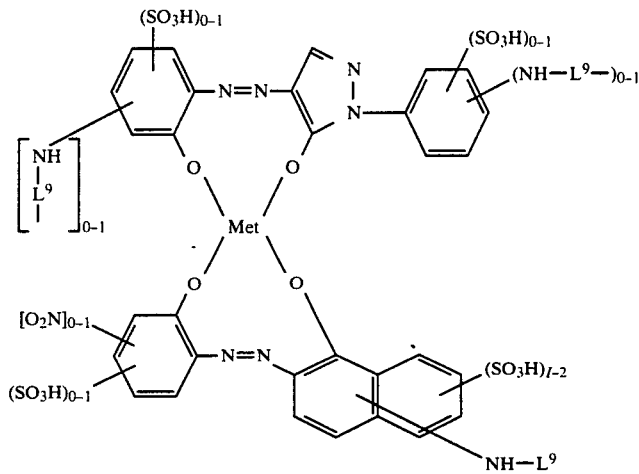

Particularly brilliant blue dyes are obtained in the series comprising the copper formazane complex dyes. Here, formazane radicals X are of the general formula

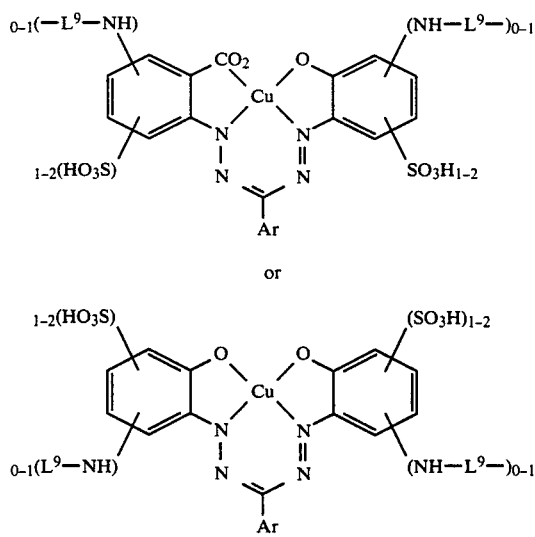

where Ar has the meanings stated on page 46.

The compounds of the formula I are useful for dyeing hydroxyl-containing substrates, wool and nylons, and, depending on their constitution, give yellow to blue dyeings which are generally distinguished by good yield and good fastness properties, such as wetfastness and lightfastness. Examples of substrates are, in particular, cotton and wool.

Any conventional dyeing method can be used, depending on the reactive radical.

The Examples in the Tables below describe novel dyes of the general formula I, the abbreviations $A^1$ to $A^6$ having the following meanings:

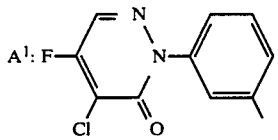

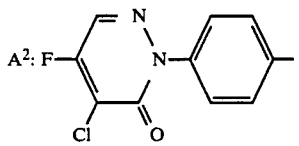

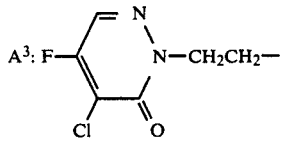

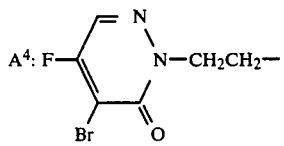

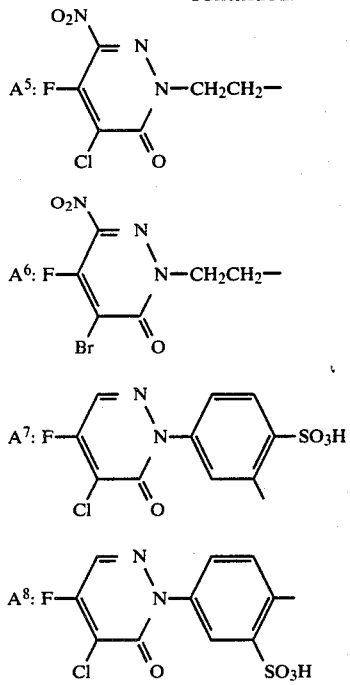

EXAMPLE 1

14.2 parts of 1-(4'-sulfophenyl)-3-carboxypyrazol-5-one are added to a suspension of 16 parts of the product obtained by diazotizing 1-(3'-amino-4'-sulfophenyl)-5-chloro-4-fluoropyridazin-6-one in an aqueous solution containing hydrochloric acid. The pH is brought to 6–7 by sprinkling in 25 parts of trisodium phosphate. When the coupling is complete, the dye formed is precipitated with 70 parts of sodium chloride, and is dried under mild conditions. It dyes cotton in greenish yellow lightfast hues.

The dye described in Example 1 is of the formula

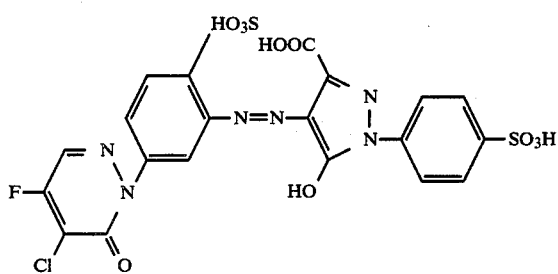

Other dyes according to the invention are listed in Table 1 where column I shows the radical of the diazo component used, which has one of the stated meanings $A^7$ or $A^8$, column II indicates the coupling component used instead of 1-(4'-sulfophenyl)-3-carboxypyrazol-5-one, and column III gives the hue obtained on dyeing cotton.

TABLE 1

| | I | II | III |
|---|---|---|---|
| 2 | $A^8$ | 1-(2'-Methyl-4'-sulfophenyl)-3-carboxypyrazol-5-one | greenish yellow |
| 3 | " | 1-(2',4'-Disulfophenyl)-3-methylpyrazol-5-one | greenish yellow |
| 4 | " | 1-(2'-Chloro-5'-sulfophenyl)-3-methylpyrazol-5-one | greenish yellow |
| 5 | " | 4,6-Dihydroxy-6-morpholinopyrimidine | greenish yellow |
| 6 | " | 4-Amino-6-hydroxy-2-morpholinopyrimidine | yellow |
| 7 | " | 1-Ethyl-2-hydroxy-4-methyl-5-sulfomethyl-pyrid-6-one | yellow |
| 8 | " | 5-Aminocarbonyl-1-ethyl-2-hydroxy-4-methylpyrid-6-one | yellow |
| 9 | $A^7$ | 1-Hydroxynaphthalene-3,6-disulfonic acid | yellowish red |
| 10 | " | 1-Hydroxynaphthalene-3,8-disulfonic acid | yellowish red |
| 11 | " | 1-Hydroxynaphthalene-4,8-disulfonic acid | yellowish red |
| 12 | " | 1-Hydroxynaphthalene-3,6,8-trisulfonic acid | yellowish red |
| 13 | $A^8$ | 1-(4'-sulfophenyl)-3-carboxypyrazol-5-one | yellow |
| 14 | " | 1-Hydroxynaphthalene-4-sulfonic acid | red |
| 15 | " | 1-Hydroxynaphthalene-3,6-disulfonic acid | red |
| 16 | " | 1-Hydroxynaphthalene-3,8-disulfonic acid | red |
| 17 | " | 1-Hydroxynaphthalene-4,8-disulfonic acid | red |
| 18 | " | 1-Hydroxynaphthalene-3,6,8-trisulfonic acid | red |

EXAMPLE 19

39 parts of 1-butyrylamino-8-hydroxynaphthalene-4,6-disulfonic acid are dissolved in 500 parts of water at 0° C. to give a neutral solution, and 32 parts of the product obtained by diazotizing 1-(4'-amino-3'-sulfophenyl)-5-chloro-4-fluoropyridazin-6-one in a solution containing hydrochloric acid are added. Coupling is carried out with the addition of 10.5 parts of sodium bicarbonate at pH 5–6, and the dye is precipitated with potassium chloride. The pressed material is freeze-dried. The resulting dark red powder dyes cotton in brilliant red lightfast hues.

The dye described in Example 19 is of the formula

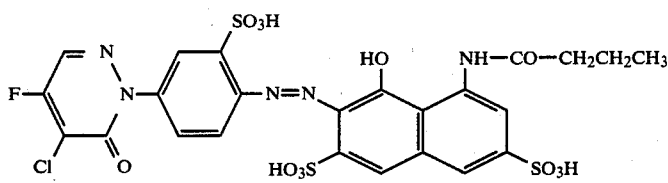

Other dyes according to the invention are summarized in Table 2, where column I shows the radical of the diazo component used, which corresponds to the abbreviation $A^7$ or $A^8$, column II indicates the coupling component used, and column III gives the hue obtained on cotton.

TABLE 2

| Example | I | II | III |
|---|---|---|---|
| 20 | $A^7$ | 1-Acetylamino-8-hydroxynaphthalene-3,6-disulfonic acid | red |
| 21 | " | 1-Benzoylamino-8-hydroxynaphthalene-4,6-disulfonic acid | yellowish red |
| 22 | " | 1-Butyrylamino-8-hydroxynaphthalene-3,6-disulfonic acid | red |
| 23 | " | 1-(3'-Sulfopropionylamino)-8-hydroxynaph- | yellowish |

TABLE 2-continued

| Example | I | II | III |
|---|---|---|---|
| | | thalene-3,6-disulfonic acid | red |
| 24 | " | 1-(2'-Sulfobenzoylamino)-8-hydroxynaphthalene-3,6-disulfonic acid | yellowish red |
| 25 | A⁸ | 1-(3'-Sulfopropionylamino)-8-hydroxynaphthalene-4,6-disulfonic acid | bluish red |
| 26 | " | 1-(2'-Carboxybenzoylamino)-8-hydroxynaphthalene-4,6-disulfonic acid | bluish red |
| 27 | " | 1-Benzoylamino-8-hydroxynaphthalene-3,6-disulfonic acid | bluish red |
| 28 | " | 1-(Cyclohexylaminocarbonylamino)-8-hydroxynaphthalene-3,6-disulfonic acid | bluish red |
| 29 | A⁷ | 2-(3'-Sulfopropionylamino)-5-hydroxynaphthalene-7-sulfonic acid | orange |
| 30 | " | 2-(3'-Sulfopropionylamino)-8-hydroxynaphthalene-6-sulfonic acid | yellowish red |
| 31 | " | 2-(2'-Sulfobenzoylamino)-8-hydroxynaphthalene-6-sulfonic acid | yellowish red |
| 32 | " | 2-(Sulfomethylamino)-8-hydroxynaphthalene-6-sulfonic acid | red |
| 33 | A⁸ | 2-(3'-Sulfophenylamino)-8-hydroxynaphthalene-6-sulfonic acid | brown |

EXAMPLE 34

25.3 parts of aniline-2,5-disulfonic acid are diazotized in a solution containing hydrochloric acid, after which a suspension of 31.6 parts of 1-amino-8-hydroxynaphthalene-3,6-disulfonic acid in 300 parts of water is added dropwise. Coupling is carried out overnight in a solution having a high concentration of hydrochloric acid. Thereafter, 32 parts of the product obtained by diazotizing 1-(4'-amino-3'-sulfophenyl)-5-chloro-4-fluoropyridazin-6-one in a solution containing hydrochloric acid are added at 5° C., and the mixture is stirred for 3 hours at pH 6.5–7, while adding 18.8 parts of sodium carbonate. The dye is precipitated from the neutral solution with sodium chloride, and is dried under mild conditions. The resulting black powder dyes cotton in greenish navy lightfast hues.

The dye described in Example 34 is of the formula

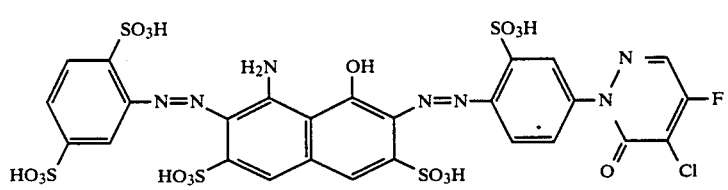

Other dyes according to the invention are summarized in Table 3, where column I shows the radical of the diazo component coupled in an acidic medium, column II indicates the radical of the diazo component coupled in a neutral or alkaline medium, and column III lists the hue obtained on cotton.

TABLE 3

| Example | I | II | III |
|---|---|---|---|
| 35 | 4-Sulfophenyl | A⁸ | greenish navy |
| 36 | 1,5-Disulfonaphth-2-yl | " | greenish navy |
| 37 | 3,6,8-Trisulfonaphth-2-yl | " | greenish navy |
| 38 | 2-Sulfo-5-(4',6'-dichlorotriazinyl)-aminophenyl | " | greenish navy |
| 39 | 4-(2'-Sulfatoethylsulfonyl)-phenyl | " | navy |
| 40 | A⁸ | 4-Sulfophenyl | navy |
| 41 | " | 1,5-Disulfonaphth-2-yl | navy |
| 42 | " | 2,5-Disulfophenyl | navy |
| 43 | " | 3,6,8-Trisulfonaphth-2-yl | navy |
| 44 | " | 2-Sulfo-5-(4',6'-dichlorotriazinyl)-aminophenyl | navy |
| 45 | " | 4-(2'-Sulfatoethylsulfonyl)-phenyl | navy |
| 46 | " | 4-(2'-Sulfatoethylaminosulfonyl)-phenyl | navy |
| 47 | " | A⁸ | navy |
| | A⁷ | A⁷ | reddish navy |
| 49 | " | A⁸ | navy |
| 50 | " | 4-Sulfophenyl | navy |
| 51 | " | 2,5-Disulfophenyl | navy |
| 52 | " | 1,5-Disulfonaphth-2-yl | navy |
| 53 | " | 4-Aminosulfophenyl | navy |
| 54 | " | 2-Sulfo-5-(4',6'-dichlorotriazinyl)-aminophenyl | reddish navy |
| 55 | " | 2-Sulfo-5-[4'-(4''-sulfophenylamino)-6'-chlorotriazinyl]-aminophenyl | reddish navy |
| 56 | " | 2-Sulfo-5-(4'-methoxy-6'-chlorotriazinyl)-aminophenyl | navy |
| 57 | " | 4-(2'-Sulfatoethylsulfonyl)-phenyl | navy |
| 58 | " | 4-(2'-Sulfatoethylaminosulfonyl)-phenyl | navy |
| 59 | 4-Allylsulfonyl-phenyl | A⁷ | navy |
| 60 | 4-Aminosulfonyl-phenyl | " | navy |
| 61 | 2-Sulfo-5-(4',6'-dichlorotriazinyl)-aminophenyl | " | navy |
| 62 | 2-Sulfo-5-(4'-methoxy-6'-chlorotriazinyl)-aminophenyl | " | navy |
| 63 | 2-Sulfo-5-[4'-(2''-methylphenylamino)-6'-fluorotriazinyl]-aminophenyl | " | navy |
| 64 | 4-Sulfophenyl | " | navy |
| 65 | 1,5-Disulfonaphth-2-yl | " | navy |
| 66 | 3,6,8-Trisulfonaphth-2-yl | " | navy |
| 67 | 4-(2'-Sulfatoethylaminosulfonyl)-phenyl | " | navy |
| 68 | 2-Chloro-4,6-disulfophenyl | A⁸ | navy |
| 69 | 2-Methyl-4,6-disulfophenyl | A⁷ | navy |
| 70 | A⁷ | 2-Sulfo-5-[4'-(2''-methylphenylamino)-6'-fluorotriazinyl]-aminophenyl | navy |

EXAMPLE 71

61 parts of the secondary condensate obtained from aniline-2,5-disulfonic acid, cyanuric chloride and 2-amino-5-hydroxynaphthalene-7-sulfonic acid are dissolved in 800 parts of water to give a neutral solution, and 32 parts of the product obtained by diazotizing 1-(3'-amino-4'-sulfophenyl)-5-chloro-4-fluoropyridazin-6-one in a solution containing hydrochloric acid are added at 0° C. Coupling is completed in a slightly acidic medium, with the addition of 14.6 parts of sodium bicarbonate, and the dye is prrecipitated by adding sodium chloride. The pressed material is dried under mild conditions. The resulting orange brown powder dyes cotton in brilliant orange hues. The dye is of the formula

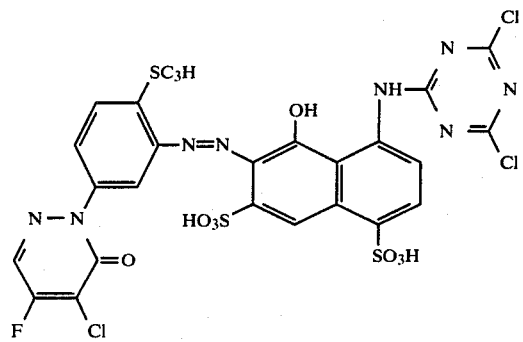

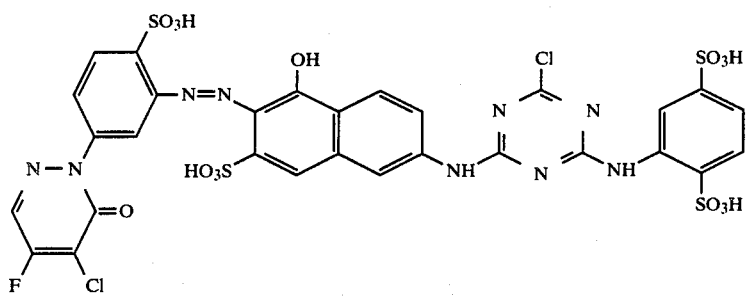

EXAMPLE 72

32 parts of the product obtained by diazotizing 1-(3'-amino-4'-sulfophenyl)-5-chloro-4-fluoropyridazin-6-one in a solution containing hydrochloric acid are introduced into a neutral solution, in 800 parts of water, of 46.7 parts of the primary condensate obtained from cyanuric chloride and 1-amino-8-hydroxynaphthalene-4,6-disulfonic acid. 23.5 parts of trisodium phosphate are added during the coupling, and the dye is isolated by adding sodium chloride. The pressed material is freeze-dried. An aqueous solution of the resulting red powder dyes cotton in brilliant yellowish red lightfast hues. The dye is of the formula

EXAMPLE 73

58.7 parts of the secondary condensate obtained from aniline-4-sulfonic acid, cyanuric fluoride and 1-amino-8-hydroxynaphthalene-3,6-disulfonic acid are dissolved in 800 parts of water at 0° C. to give a neutral solution, and 32 parts of the product obtained by diazotizing 1-(3'-amino-4'-sulfophenyl)-5-chloro-4-fluoropyridazin-6-one in a solution containing hydrochloric acid are added. Coupling is completed in a slightly acidic medium by adding 24.5 parts of trisodium phosphate, and the dye is precipitated with sodium chloride and then dried. An aqueous solution of the resulting red powder dyes cotton in brilliant red fast hues. The dye is of the formula

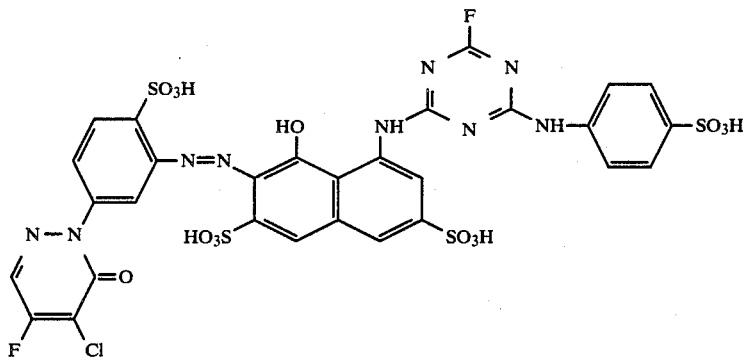

EXAMPLE 74

71.2 parts of the secondary condensate obtained from 4-(2'-sulfatoethylsulfonyl)-aniline, cyanuric chloride and 1-amino-8-hydroxynaphthalene-3,6-disulfonic acid are dissolved in 800 parts of water at 5° C. and 32 parts of the product obtained by diazotizing 1-(4'-amino-3'-sulfophenyl)-5-chloro-4-fluoropyridazin-6-one in a solution containing hydrochloric acid are added. The pH is kept slightly acidic during the coupling by adding 18.4 parts of sodium bicarbonate. The dye is precipitated by adding sodium chloride, and is freeze-dried. An aqueous solution of the resulting blackish red powder dyes cotton in dull bluish red hues. The dye is of the formula

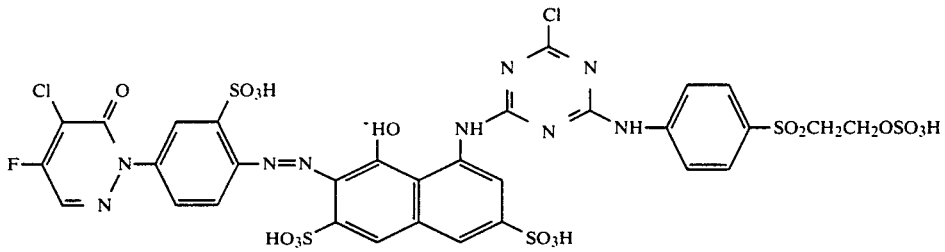

Further dyes according to the invention are listed in Table 4, where column I shows the radical of the diazo component used, column II indicates the coupling component used, column III gives the primary triazine condensate used, and column IV lists the hue obtained on cotton.

TABLE 4

| Example | I | II | III | IV |
|---|---|---|---|---|
| 75 | A⁷ | 1-Amino-8-hydroxy-naphthalene-3,6-disulfonic acid | 2-Methoxy-4,6-dichlorotriazine | red |
| 76 | A⁷ | 1-Amino-8-hydroxy-naphthalene-3,6-disulfonic acid | 2-(4'-Sulfophenyl-amino)-4,6-dichlorotriazine | red |
| 77 | A⁷ | 1-Amino-8-hydroxy-naphthalene-3,6-disulfonic acid | 2-(2',5'-Disulfo-phenylamino)-4,6-dichlorotriazine | red |
| 78 | A⁷ | 1-(2'-Sulfo-4'-aminophenyl)-3-carboxypyrazol-5-one | 2-(3'-Sulfophenyl-amino)-4,6-dichlorotriazine | yellow |
| 79 | A⁷ | 1-Aminoethyl-5-aminocarbonyl-4-methyl-6-hydroxy-pyrid-2-one | 2-(2',5'-Disulfo-phenylamino)-4,6-dichlorotriazine | greenish yellow |
| 80 | A⁸ | 1-(2'-Sulfo-4'-aminophenyl)-3-carboxypyrazol-5-one | 2-(4'-Sulfophenyl-amino)-4,6-trichlorotriazine | yellow |

TABLE 4-continued

| Example | I | II | III | IV |
|---|---|---|---|---|
|  |  | zol-5-one |  |  |

EXAMPLE 81

63 parts of the dye obtained by coupling diazotized 2-amino-4-(4',6'-dichloro-1',3',5'-triazinyl)-aminobenzenesulfonic acid to 1-(4'-sulfophenyl)-3-carboxypyrazol-5-one are dissolved in 950 parts of water, 24 parts of 1-(3'-aminophenyl)-5-chloro-4-fluoropyridazin-6-one are added, and the mixture is stirred for 4 hours at 35° C., the pH being maintained at 6.5 by the addition of 2N sodium carbonate solution. When the reaction is complete, the dye is precipitated with sodium chloride, and is dried under mild conditions. It dyes cotton in greenish yellow fast hues, and is of the formula

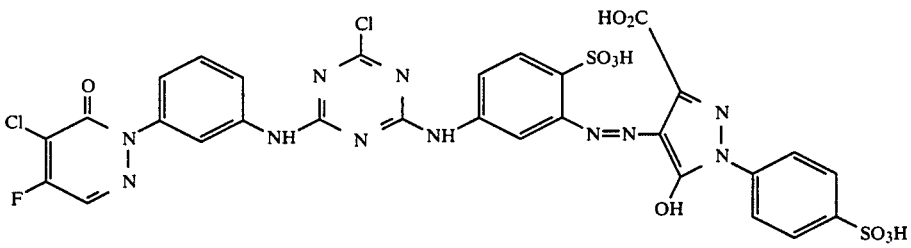

EXAMPLE 82

54.9 parts of the sodium salt of the dye, obtained by coupling 2-amino-5-acetylaminobenzenesulfonic acid to 1-(4'-sulfophenyl)-3-carboxypyrazol-5-one and then hydrolyzing the acetylamino group, are dissolved in 750 parts of ice water, and reacted with 18.5 parts of cyanuric chloride at pH 6. When diazotizable amino groups are no longer detectable, 24 parts of 1-(3'-aminophenyl)-5-chloro-4-fluoropyridazin-6-one are added, and the mixture is stirred for 4 hours at 30° C. and pH 6.5. The dye is precipitated with potassium chloride, and dried under mild conditions. It gives brilliant reddish yellow dyeings on cotton, and is of the formula

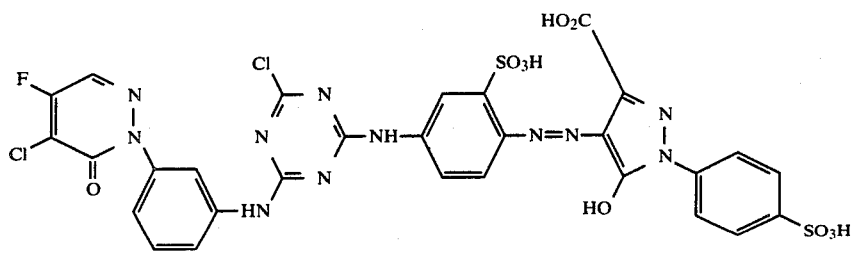

EXAMPLE 83

36.1 parts of 1-acetylamino-8-hydroxynaphthalene-4,6-disulfonic acid in 300 parts of water are added, at 5° C., to a suspension of 33.6 parts of the product obtained by diazotizing, in a solution containing hydrochloric acid, the primary condensate of cyanuric chloride and 1,3-phenylenediamine-4-sulfonic acid. Coupling is carried out at pH 5, with the addition of 17.9 parts of sodium bicarbonate. 23.9 parts of 1-(4'-aminophenyl)-5-chloro-4-fluoropyridazin-6-one in 100 parts of dimethylformamide are added, and condensation is carried out at 35°-40° C. and at pH 6, 14.9 parts of sodium bicarbonate being added. The precipitated dye is filtered off under suction and dried. The resulting red powder dyes cotton in brilliant yellowish red lightfast hues. It is of the formula

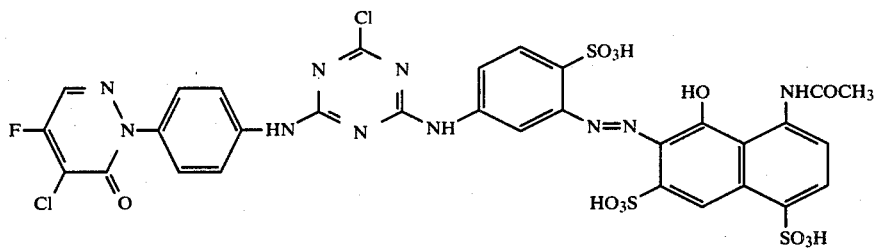

Further dyes according to the invention are listed in Table 5, where column I shows the type of the halogen atom which can be split off in the triazine radical, column II indicates the radical of the amine used instead of 1-(4'-aminophenyl)-5-chloro-4-fluoropyridazin-6-one, columns III and IV show the compounds used instead of 1,3-phenylenediamine-4-sulfonic acid and 1-acetylamino-8-hydroxynaphthalene-4,6-disulfonic acid respectively, and column V indicates the hue obtained on cotton.

TABLE 5

| Example | I | II | III | IV | V |
|---|---|---|---|---|---|
| 84 | Cl | $A^1$ | 1,3-Phenylenediamine-4,6-disulfonic acid | 1-Benzoylamino-8-hydroxynaphthalene-3,6-disulfonic acid | red |
| 85 | Cl | $A^2$ | 1,3-Phenylenediamine-4-sulfonic acid | 1-(2'-Sulfobenzoyl-amino)-8-hydroxy-naphthalene-3,6-disulfonic acid | red |
| 86 | Cl | $A^2$ | 1,3-Phenylenediamine-4-sulfonic acid | 1-(3'-Carboxypropionylamino)-8-hydroxynaphthalene-4,6-disulfonic acid | yellowish red |
| 87 | F | $A^2$ | 1,3-Phenylenediamine-4-sulfonic acid | 1-(3'-Sulfopropionylamino)-8-hydroxynaphthalene-3,6-disulfonic acid | red |
| 88 | F | $A^1$ | 1,3-Phenylenediamine-4-sulfonic acid | 1-Acetylamino-8-hydroxynaphthalene-4,6-disulfonic acid | yellowish red |
| 89 | Cl | $A^1$ | 1,3-Phenylenediamine-4-sulfonic acid | 2-(3'-Sulfopropionylamino)-5-hydroxynaphthalene-7-sulfonic acid | orange |
| 90 | Cl | $A^1$ | 1,3-Phenylenediamine-4-sulfonic acid | 2-(Sulfoacetylamino)-5-hydroxynaphthalene-7-sulfonic acid | orange |
| 91 | Cl | $A^2$ | 1,3-Phenylenediamine-4,6-disulfonic acid | 2-(2'-Sulfobenzoyl-amino)-5-hydroxynaphthalene-7-sulfonic acid | orange |
| 92 | F | $A^2$ | 1,3-Phenylenediamine-4-sulfonic acid | 2-(Sulfoacetylamino)-5-hydroxynaphthalene-7-sulfonic acid | orange |

TABLE 5-continued

| Example | I | II | III | IV | V |
|---|---|---|---|---|---|
| 93 | Cl | A² | 1,3-Phenylenediamine-4-sulfonic acid | 2-(3'-Sulfopropionylamino)-8-hydroxynaphthalene-6-sulfonic acid | yellowish red |
| 94 | Cl | A¹ | 1,3-Phenylenediamine-4,6-disulfonic acid | 2-(2'-Sulfobenzoylamino)-8-hydroxynaphthalene-6-sulfonic acid | yellowish red |
| 95 | Cl | A¹ | 1,3-Phenylenediamine-4-sulfonic acid | 2-(Sulfomethylamino)-8-hydroxynaphthalene-6-sulfonic acid | bluish red |
| 96 | Cl | A¹ | 1,3-Phenylenediamine-4,6-disulfonic acid | 2-[3'-(2''-carboxyethoxy)-propionylamino]-5-hydroxynaphthalene-7-sulfonic acid | orange |
| 97 | Cl | A² | 1,3-Phenylenediamine-4-sulfonic acid | 1-[4'-chloro-6'-(2'',5''-disulfo-1''-phenylamino)-triazinylamino]-8-hydroxynaphthalene-3,6-disulfonic acid | red |
| 98 | Cl | A² | 1,3-Phenylenediamine-4-sulfonic acid | 1-[4'-Chloro-6'-(4''-sulfo-1''-phenylamino)-triazinylamino]-8-hydroxynaphthalene-3,6-disulfonic acid | red |
| 99 | Cl | A² | 1,3-Phenylenediamine-4-sulfonic acid | 1-[4'-Chloro-6'-(3''-sulfo-1''-phenylamino)-triazinylamino]-8-hydroxynaphthalene-4,6-disulfonic acid | yellowish red |
| 100 | Cl | A¹ | 1,3-Phenylenediamine-4-sulfonic acid | 1-(2'-Methyl-4'-sulfophenyl)-3-carboxypyrazol-5-one | greenish yellow |
| 101 | F | A¹ | 1,3-Phenylenediamine-4-sulfonic acid | 1-(4'-sulfophenyl)-3-carboxypyrazol-5-one | greenish yellow |
| 102 | Cl | A¹ | 1,3-Phenylenediamine-4,6-disulfonic acid | 5-Aminocarbonyl-1-ethyl-2-hydroxy-4-methylpyrid-6-one | greenish yellow |
| 103 | Cl | A¹ | 1,4-Phenylenediamine-2,5-disulfonic acid | 4,6-Dihydroxy-2-isopropoxypyrimidine | reddish yellow |
| 104 | Cl | A¹ | 1,3-Phenylenediamine-4-sulfonic acid | 1-[3'-<3''-(5'''-chloro-4'''-fluoro-pyridazin-6'''on-1'''-yl)-propionyl>-aminophenyl]-3-carboxypyrazol-5-one | greenish yellow |
| 105 | Cl | A¹ | 1,3-Phenylenediamine-4,6-disulfonic acid | 1-[3'-<3''-(5'''-chloro-4'''-fluoro-pyridazin-6'''on-1'''-yl)-propionyl>-aminophenyl]-3-carboxypyrazol-5-one | greenish yellow |
| 106 | Cl | A¹ | 1,4-Phenylenediamine-2,5-disulfonic acid | 1-[3'-<3''-(5'''-chloro-4'''-fluoro-pyridazin-6'''on-1'''-yl)-propionyl>-aminophenyl]-3-carboxypyrazol-5-one | reddish yellow |
| 107 | Cl | A¹ | 1,3-Phenylenediamine-4,6-disulfonic acid | 1-Hydroxynaphthalene-4,8-disulfonic acid | yellowish red |
| 108 | Cl | A¹ | 1,3-Phenylenediamine-4,6-disulfonic acid | 1-Hydroxynaphthalene-4-sulfonic acid | yellowish red |
| 109 | Cl | A¹ | 1,3-Phenylenediamine-4,6-disulfonic acid | 2-(3'-Sulfophenyl-amino)-8-hydroxynaphthalene-6-sulfonic acid | brown |
| 110 | Cl | A¹ | 1,4-Phenylenediamine-2,5-disulfonic acid | 2-(3'-Sulfophenyl-amino)-8-hydroxynaphthalene-6-sulfonic acid | brown |
| 111 | F | A¹ | 1,4-Phenylenediamine-2,5-disulfonic acid | 2-(4'-Carboxyphenyl-amino)-8-hydroxynaphthalene-6-sul- | brown |

TABLE 5-continued

| Example | I | II | III | IV | V |
|---|---|---|---|---|---|
| 112 | Cl | A² | 1,3-Phenylenediamine-4-sulfonic acid | 1-(2'-Methyl-4'-sulfophenyl)-3-carboxypyrazol-5-one | yellow |
| 113 | Cl | A² | 1,3-Phenylenediamine-4,6-disulfonic acid | 5-Aminocarbonyl-1-ethyl-2-hydroxy-4-methylpyrid-6-one | greenish yellow |
| 114 | F | A² | 1,3-Phenylenediamine-4,6-disulfonic acid | 4-Amino-6-hydroxy-2-morpholinopyrimidine | yellow |
| 115 | Cl | A² | 1,3-Phenylenediamine-4,6-disulfonic acid | 2-(3'-Sulfophenylamino)-8-hydroxynaphthalene-6-sulfonic acid | brown |
| 116 | F | A² | 1,3-Phenylenediamine-4,6-disulfonic acid | 2-Phenylamino-8-hydroxynaphthalene-6-sulfonic acid | brown |
| 117 | Cl | A² | 1,4-Phenylenediamine-2,5-disulfonic acid | 1-Hydroxynaphthalene-4-sulfonic acid | red |
| 118 | Cl | A² | 1,3-Phenylenediamine-2-sulfonic acid | 1-Hydroxynaphthalene-3,6-disulfonic acid | red |
| 119 | Cl | A² | 1,3-Phenylenediamine-2-sulfonic acid | 1-Hydroxynaphthalene-3,8-disulfonic acid | red |
| 120 | Cl | A² | 1,3-Phenylenediamine-2-sulfonic acid | 1-Hydroxynaphthalene-4,8-disulfonic acid | red |

EXAMPLE 121

54.5 parts of the dye obtained by coupling diazotized 2-aminonaphthalene-3,6,8-trisulfonic acid to 3-aminophenylurea are dissolved in 500 parts of water to give a neutral solution, and are then reacted with 19 parts of cyanuric chloride at pH 6. Thereafter, 24 parts of 1-(3'-aminophenyl)-5-chloro-4-fluoropyridazin-6-one are added, and the mixture is stirred for 4 hours at 30°–35° C. The dye is precipitated with potassium chloride and dried under mild conditions. It dyes cotton in fast golden yellow hues, and is of the formula 35°–40° C., and the pH is kept at 6 by the addition of 13.8 parts of sodium bicarbonate. After 1–2 hours, the mixture is cooled to 5° C. with ice, and 25.3 parts of the product obtained by diazotizing aniline-2,5-disulfonic acid in a solution containing hydrochloric acid are added. The pH is kept at 5–6 during the coupling by adding 18.8 parts of sodium bicarbonate. The dye is isolated by adding potassium chloride, and is dried. An aqueous solution of the resulting dark red powder dyes cotton in brilliant bluish red hues.

The dye is of the formula

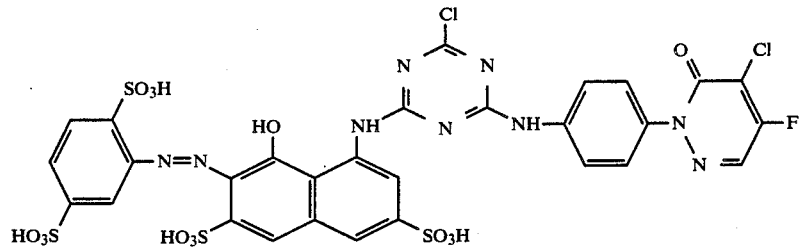

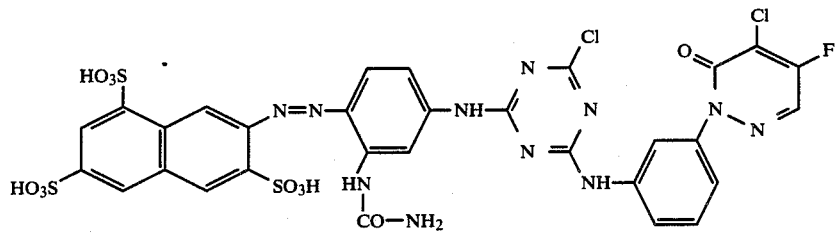

EXAMPLE 122

47 parts of the primary condensate obtained from cyanuric chloride and 1-amino-8-hydroxynaphthalene-3,6-disulfonic acid are dissolved, at 0° C. and pH 6, in 600 parts of water, and 23.9 parts of 1-(4'-aminophenyl)-5-chloro-4-fluoropyridazin-6-one in 80 parts of dimethylformamide are added. The mixture is heated to

EXAMPLE 123

25.3 parts of the product obtained by diazotizing aniline-2,5-disulfonic acid in a solution containing hydrochloric acid are added to a solution of 47 parts of the primary condensate, obtained from cyanuric chloride and 1-amino-8-hydroxynaphthalene-3,6-disulfonic acid, in 600 parts of water. Coupling is carried out at 5° C. and pH 5-6, by adding 18.5 parts of sodium bicarbonate. 23.9 parts of 1-(4'-aminophenyl)-5-chloro-4-fluoropyridazin-6-one in 100 parts of dimethylformamide are added to the reaction mixture, the temperature is increased to 35°-40° C., and the pH is kept slightly acidic during the condensation by adding 12.8 parts of sodium bicarbonate. The reaction mixture is cooled, and the dye is precipitated with potassium chloride and dried. Its constitution and properties correspond to those of the dye described in Example 122.

EXAMPLE 124

If the 1-(4'-aminophenyl)-5-chloro-4-fluoropyridazin-6-one used in Examples 122 and 123 is replaced with 23.9 parts of 1-(3'-aminophenyl)-5-chloro-4-fluoropyridazin-6-one, a dye having similar properties is obtained.

Further dyes according to the invention are listed in Table 6, where columns I and II show the diazo component and coupling component used, column III indicates the type of halogen atom present on the triazine radical and capable of being eliminated, column IV gives the radical of the amine bonded to the triazine ring, and column V states the hue obtained on cotton.

TABLE 6

| Example | I | II | III | IV | V |
|---|---|---|---|---|---|
| 125 | Aniline-2-sulfonic acid | 1-Amino-8-hydroxynaphthalene-3,6-disulfonic acid | Cl | $A^2$ | red |
| 126 | Aniline-4-sulfonic acid | 1-Amino-8-hydroxynaphthalene-4,6-disulfonic acid | Cl | $A^2$ | yellowish red |
| 127 | 4-Methoxy-3-sulfoaniline | 1-Amino-8-hydroxynaphthalene-3,6-disulfonic acid | Cl | $A^2$ | dull bluish red |
| 128 | 4-Methyl-2-sulfoaniline | 1-Amino-8-hydroxynaphthalene-3,6-disulfonic acid | F | $A^2$ | bluish red |
| 129 | 2-Naphthylamine-1,5-disulfonic acid | 1-Amino-8-hydroxynaphthalene-3,6-disulfonic acid | Cl | $A^1$ | bluish red |
| 130 | 4-Carboxyaniline | 1-Amino-8-hydroxynaphthalene-3,6-disulfonic acid | Cl | $A^1$ | bluish red |
| 131 | 2-Naphthylamine-3,6,8-trisulfonic acid | 1-Amino-8-hydroxynaphthalene-3,6-disulfonic acid | Cl | $A^2$ | dull bluish red |
| 132 | 4-(2'-Sulfatoethylsulfonyl)-aniline | 1-Amino-8-hydroxynaphthalene-3,6-disulfonic acid | Cl | $A^2$ | bluish red |
| 133 | 1-(4'-Aminophenyl)-5-chloro-4-fluoropyridazin-6-one | 1-Amino-8-hydroxynaphthalene-3,6-disulfonic acid | Cl | $A^2$ | dull bluish red |
| 134 | 4-(2'-Sulfatoethylaminosulfonyl)-aniline | 1-Amino-8-hydroxynaphthalene-4,6-disulfonic acid | Cl | $A^2$ | dull bluish red |
| 135 | 3-(4',6'-Dichlorotriazinylamino)-6-sulfoaniline | 1-Amino-8-hydroxynaphthalene-3,6-disulfonic acid | Cl | $A^2$ | bluish red |
| 136 | 3-[4'-Chloro-6'-(2'',5''-disulfo-1''-phenylamino)-triazinylamino]-6-sulfoaniline | 1-Amino-8-hydroxynaphthalene-3,6-disulfonic acid | Cl | $A^2$ | bluish red |
| 137 | 3-<4'-Chloro-6'-[4''-(2'''-sulfatoethylsulfonyl)-phenyl-1''-amino]-triazinylamino>-6-sulfoaniline | 1-Amino-8-hydroxynaphthalene-3,6-disulfonic acid | Cl | $A^2$ | bluish red |
| 138 | Aniline-2,5-disulfonic acid | 2-Amino-5-hydroxynaphthalene-7-sulfonic acid | Cl | $A^1$ | yellowish orange |
| 139 | 2-Methyl-4,6-disulfoaniline | 2-Amino-5-hydroxynapthalene-7-sulfonic acid | Cl | $A^2$ | orange |
| 140 | 2-Naphthylamine-1,5-disulfonic acid | 2-Amino-5-hydroxynaphthalene-7-sulfonic acid | Cl | $A^2$ | orange |
| 141 | 2-Naphthylamine-3,6,8-trisulfonic acid | 2-Amino-5-hydroxynaphthalene-7-sulfonic acid | F | $A^2$ | yellowish red |
| 142 | 3-[4'-Chloro-6'-(2'',5''-disulfo-1'''-phenylamino)-triazinylamino]-6-sulfoaniline | 2-Amino-5-hydroxynaphthalene-7-sulfonic acid | Cl | $A^2$ | orange |
| 143 | 2-Methyl-4,6-disulfoaniline | 2-Amino-8-hydroxynaphthalene-6-sulfonic acid | Cl | $A^1$ | yellowish red |
| 144 | 4-Methoxy-2,5-disulfoaniline | 2-Amino-8-hydroxynaphthalene-6-sulfonic acid | Cl | $A^2$ | yellowish red |
| 145 | 2-Naphthylamine-1,5-disulfonic | 2-Amino-8-hydroxynaphthalene-6-sulfonic acid | F | $A^2$ | yellowish red |

TABLE 6-continued

| Example | I | II | III | IV | V |
|---|---|---|---|---|---|
| | acid | | | | |
| 146 | 2-Naphthylamine-3,6,8-trisulfonic acid | 2-Amino-8-hydroxynaphthalene-6-sulfonic acid | F | A² | red |
| 147 | 3-[4'-Chloro-6'-(2",5"-disulfo-1"-phenylamino)-triazinylamino]-6-sulfoaniline | 2-Amino-8-hydroxynaphthalene-6-sulfonic acid | F | A² | yellowish red |
| 148 | 2-Aminonaphthalene-3,6,8-trisulfonic acid | 3-Aminophenylurea | Cl | A² | golden yellow |
| 149 | Aniline-2,5-disulfonic acid | 3-Aminophenylurea | Cl | A² | yellow |
| 150 | 2-Aminonaphthalene-4,6,8-trisulfonic acid | 3-Aminophenylurea | Cl | A² | golden yellow |
| 151 | 2-Aminonaphthalene-4,6,8-trisulfonic acid | 3-Propionylaminoaniline | Cl | A² | golden yellow |
| 152 | 2-Aminonaphthalene-4,6,8-trisulfonic acid | 2-Methoxy-5-methylaniline | Cl | A² | golden yellow |
| 153 | 2-Aminonaphthalene-6,8-disulfonic acid | 3-Aminophenylurea | Cl | A² | golden yellow |
| 154 | 2-Aminonaphthalene-3,6,8-trisulfonic acid | 3-Aminophenylurea | F | A² | golden yellow |
| 155 | 2-Aminonaphthalene-4,6,8-trisulfonic acid | 5-Chloro-2-methoxyaniline | Cl | A² | golden yellow |
| 156 | 2-Aminonaphthalene-4,8-disulfonic acid | 1-Aminonaphthalene-8-sulfonic acid | Cl | A² | golden yellow |
| 157 | 2-Aminonaphthalene-3,6,8-trisulfonic acid | 3-Aminophenylurea | ·F | A¹ | golden yellow |
| 158 | 2-Aminonaphthalene-4,6,8-trisulfonic acid | 3-Propionylaminoaniline | Cl | A¹ | golden yellow |
| 159 | 2-Aminonaphthalene-4,6,8-trisulfonic acid | 2-Methoxy-5-methylaniline | Cl | A¹ | golden yellow |

EXAMPLE 160

31.8 parts of a suspension of 1-amino-8-hydroxynaphthalene-3,6-disulfonic acid in 300 parts of water are added, at 5° C., to 17.3 parts of the product obtained by diazotizing aniline-4-sulfonic acid in a solution containing hydrochloric acid. Coupling is carried out overnight at pH 1-2, after which 38.6 parts of a suspension of the product obtained by diazotizing, in a solution containing hydrochloric acid, the primary condensate of cyanuric chloride and 1,3-phenylenediamine-4-sulfonic acid are added. Coupling is completed in a slightly acidic medium by adding 17.8 parts of sodium carbonate; thereafter, a solution of 23.9 parts of 1-(4'-aminophenyl)-5-chloro-4-fluoropyridazin-6-one in 100 parts of dimethylformamide is added. Condensation is carried out at 40° C. with the addition of 16.6 parts of sodium bicarbonate, and the dye is precipitated with sodium chloride and dried. The resulting black powder dyes cotton in fast navy hues. The dye is of the formula

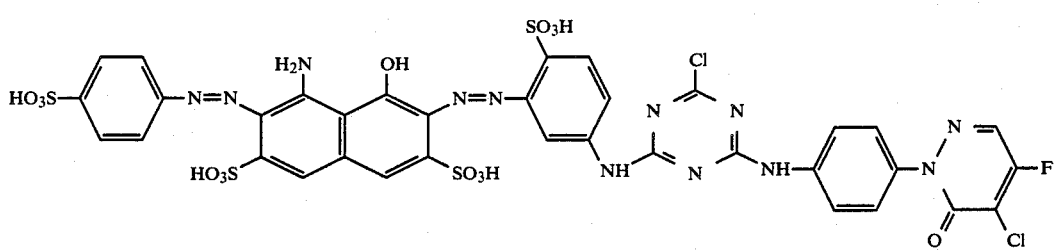

Further dyes according to the invention are summarized in Table 7, where column I shows the diazo component used for the acidic coupling, column II indicates the diazo component used for the coupling in neutral or alkaline solution, column III indicates the type of halogen atom present on the triazine radical and capable of being eliminated, column IV gives the radical of the amine bonded to the triazine, and column V states the hue obtained on cotton.

TABLE 7

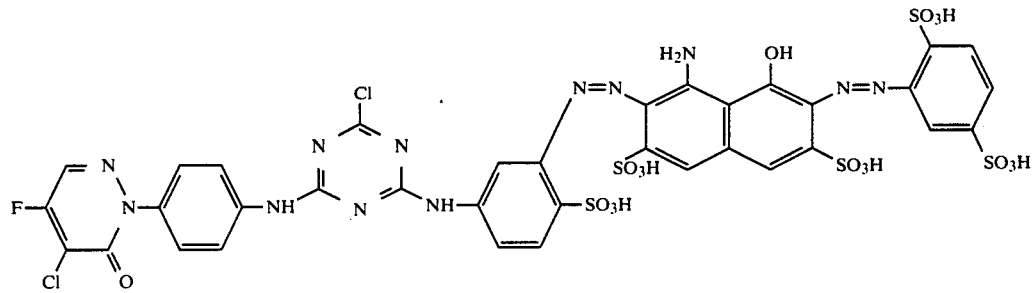

| Example | I | II | III | IV | V |
|---|---|---|---|---|---|
| 161 | Aniline-2,5-disulfonic acid | 1,3-Phenylenediamine-4-sulfonic acid | Cl | A² | navy |
| 162 | 2-Chloro-4,6-disulfoaniline | 1,3-Phenylenediamine-4-sulfonic acid | Cl | A² | reddish navy |
| 163 | 2-Methyl-4,6-disulfoaniline | 1,3-Phenylenediamine-4-sulfonic acid | Cl | A² | reddish navy |
| 164 | 2-Naphthylamine-1,5-disulfonic acid | 1,3-Phenylenediamine-4-sulfonic acid | Cl | A² | navy |
| 165 | 2-Naphthylamine-3,6,8-trisulfonic acid | 1,3-Phenylenediamine-4-sulfonic acid | Cl | A² | navy |
| 166 | 4-(2'-Sulfatoethylsulfonyl)-aniline | 1,3-Phenylenediamine-4-sulfonic acid | Cl | A² | navy |
| 167 | 4-(2'-Sulfatoethylaminosulfonyl)-aniline | 1,3-Phenylenediamine-4-sulfonic acid | Cl | A¹ | navy |
| 168 | 3-[4'-Chloro-6'-(4''-sulfo-1''-phenylamino)-triazinylamino]-6-sulfoaniline | 1,3-Phenylenediamine-4-sulfonic acid | F | A² | navy |
| 169 | 3-(4',6'-Dichlorotriazinylamino)-6-sulfoaniline | 1,3-Phenylenediamine-4-sulfonic acid | Cl | A² | navy |
| 170 | 3-[4'-Chloro-6'-(3''-sulfo-1''-phenylamino)-triazinylamino]-6-sulfoaniline | 1,3-Phenylenediamine-4-sulfonic acid | Cl | A¹ | navy |
| 171 | 3-[4'-Chloro-6'-(2'',5''-disulfo-1''-phenylamino)-triazinylamino]-6-sulfoaniline | 1,3-Phenylenediamine-4-sulfonic acid | Cl | A¹ | navy |

EXAMPLE 172

38.6 parts of the primary condensate obtained from cyanuric chloride and 1,3-phenylenediamine-4-sulfonic acid are diazotized in a solution containing hydrochloric acid, and a suspension of 31.8 parts of 1-amino-8-hydroxynaphthalene-3,6-disulfonic acid in 300 parts of water is added. Coupling is completed at pH 3-4, with the addition of 14.8 parts of sodium acetate. 25.4 parts of the product obtained by diazotizing aniline-2,5-disulfonic acid in a solution containing hydrochloric acid are added, and coupling is completed in a slightly acidic medium, with the addition of 16.4 parts of sodium carbonate. A solution of 23.9 parts of 1-(4'-aminophenyl)-5-chloro-4-fluoropyridazin-6-one in 100 parts of dimethylformamide is added to the reaction mixture, and the pH is kept at 6-7, at 40° C., with 16.5 parts of sodium bicarbonate. The dye is precipitated with potassium chloride, and is dried. The resulting black powder dyes cotton in fast navy hues. The dye described in Example 172 is of the formula Further dyes according to the invention are summarized in Table 8, where column I shows the diazo component used for the acidic coupling, column II indicates the diazo component used for the coupling in neutral or alkaline solution, column III gives the type of halogen atom present on the triazine radical and capable of being eliminated, column IV gives the radical of the amine bonded to the triazine, and column V states the hue obtained on cotton.

| Example | I | II | III | IV | V |
|---|---|---|---|---|---|
| 173 | 1,3-Phenylenediamine-4-sulfonic acid | 2-Naphthylamine-1,5-disulfonic acid | Cl | A² | navy |
| 174 | 1,3-Phenylenediamine-4-sulfonic acid | Aniline-4-sulfonic acid | Cl | A² | navy |
| 175 | 1,3-Phenylenediamine-4-sulfonic acid | 2-Naphthylamine-3,6,8-trisulfonic acid | F | A² | navy |
| 176 | 1,3-Phenylenediamine-4-sulfonic acid | 2-Chloro-4,6-disulfoaniline | Cl | A¹ | navy |
| 177 | 1,3-Phenylenediamine-4-sulfonic acid | 2-Methyl-4,6-disulfoaniline | Cl | A² | navy |
| 178 | 1,3-Phenylenediamine-4-sulfonic acid | 4-(2'-Sulfatoethylsulfonyl)-aniline | Cl | A² | navy |
| 179 | 1,3-Phenylenediamine-4-sulfonic acid | 4-(2'-Sulfatoethylaminosulfonyl)-aniline | Cl | A² | navy |
| 180 | 1,3-Phenylenediamine-4-sulfonic acid | 3-(4',6'-Dichlorotriazinylamino)-6-sulfoaniline | Cl | A² | navy |
| 181 | 1,3-Phenylenediamine-4-sulfonic acid | 3-[4'-Chloro-6'-(2'',5''-disulfo-1''-phenylamino)triazinylamino]-6-sulfoaniline | Cl | A¹ | navy |
| 182 | 1,3-Phenylenediamine-4-sulfonic acid | 3-[4'-Chloro-6'-(4''-sulfo-1''-phenylamino)-triazinylamino]-6-sulfoaniline | F | A¹ | navy |

EXAMPLE 183

53.7 parts of diazotized 1-amino-4-(4'',8''-disulfonaphth-2-yl)-azonaphthalene-6-sulfonic acid are coupled to 22.3 parts of 1-aminonaphthalene-6/7-sulfonic acid at a pH obtained with acetic acid. The mixture is then reacted with 19 parts of cyanuric chloride at pH 6-7 and 10°-20° C., and, using 24 parts of 1-(3'-aminophenyl)-5-chloro-4-fluoropyridazin-6-one, a chlorine atom on the triazine ring is exchanged. The dye is isolated by salting out with potassium chloride, and is dried under mild conditions. It dyes cotton in reddish brown hues, and is of the formula

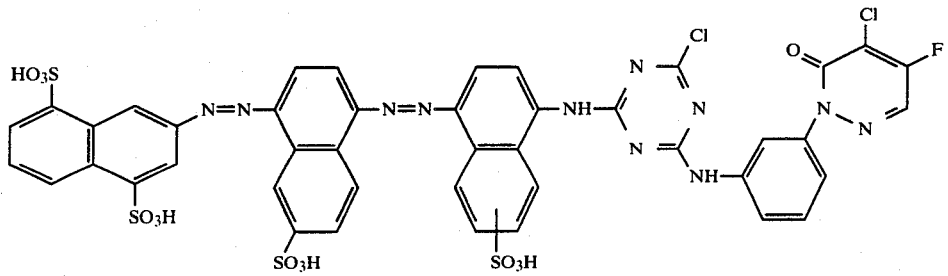

Further dyes according to the invention are listed in Table 9, where column I shows the diazo component used instead of 2-aminonaphthalene-4,8-dsulfonic acid, columns II and II indicate the coupling components used instead of 1-aminonaphthalene-6- and -6/7-sulfonice acid respectively, column IV gives the radical of the amine bonded to the triazine ring, column V indicates the type of halogen atom present on the triazine ring and capable of being exchanged, and column VI states the hue obtained on cotton.

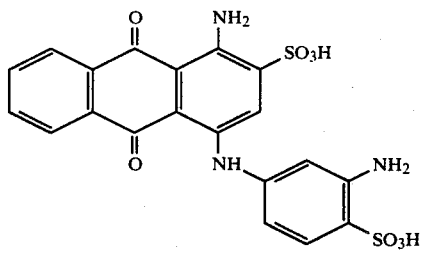

TABLE 9

| Example | I | II | III | IV | V | VI |
|---|---|---|---|---|---|---|
| 184 | 2-Aminonaphthalene-4,8-disulfonic acid | 1-Aminonaphthalene-6-sulfonic acid | 1-Aminonaphthalene-6-sulfonic acid | $A^1$ | Cl | reddish brown |
| 185 | 2-Aminonaphthalene-4,8-disulfonic acid | 1-Aminonaphthalene-6/7-sulfonic acid | 1-Aminonaphthalene-8-sulfonic acid | $A^1$ | Cl | reddish brown |
| 186 | Aniline-2,5-disulfonic acid | 1-Aminonaphthalene-6/7-sulfonic acid | 1-Aminonaphthalene-8-sulfonic acid | $A^1$ | Cl | reddish brown |
| 187 | Aniline-2,5-disulfonic acid | 2,5-Dimethylaniline | 1-Aminonaphthalene-8-sulfonic acid | $A^2$ | Cl | yellowish brown |
| 188 | 1-Aminonaphthalene-2,5,7-trisulfonic acid | 1-Aminonaphthalene | 1-Aminonaphthalene-6-sulfonic acid | $A^2$ | Cl | reddish brown |
| 189 | 1-Aminonaphthalene-2,5,7-trisulfonic acid | 2,5-Dimethylaniline | 1-Aminonaphthalene-6-sulfonic acid | $A^2$ | Cl | yellowish brown |
| 190 | 2-Aminonaphthalene-4,8-disulfonic acid | 1-Aminonaphthalene-6-sulfonic acid | 1-Aminonaphthalene-6,8-disulfonic acid | $A^2$ | Cl | reddish brown |
| 191 | 2-Aminonaphthalene-6,8-disulfonic acid | 1-Aminonaphthalene-6/7-sulfonic acid | 1-Aminonaphthalene-6-sulfonic acid | $A^1$ | Cl | reddish brown |
| 192 | 2-Aminonaphthalene-4,6,8-trisulfonic acid | 1-Aminonaphthalene | 1-Aminonaphthalene-6-sulfonic acid | $A^1$ | Cl | reddish brown |
| 193 | 2-Aminonaphthalene-4,8-disulfonic acid | 1-Aminonaphthalene-6/7-sulfonic acid | 1-Aminonaphthalene-6-sulfonic acid | $A^1$ | F | reddish brown |
| 194 | 2-Aminonaphthalene-6,8-disulfonic acid | 1-Aminonaphthalene-6/7-sulfonic acid | 1-Aminonaphthalene-6-sulfonic acid | $A^2$ | F | reddish brown |

EXAMPLE 195

6.1 parts of the dye of the formula are dissolved in 80 parts of N-methylpyrrolidone, and 3.6 parts of ClCO—$A^3$ are added at 30°–40° C. Stirring is continued for 1 hour, after which the dye of the formula

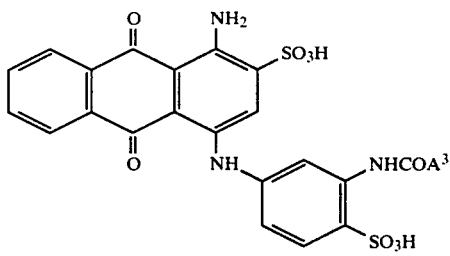

is obtained using 100 parts of saturated potassium chloride solution.

Yield: 20 parts (dye content: about 30%).

The dyes below, of the general formula

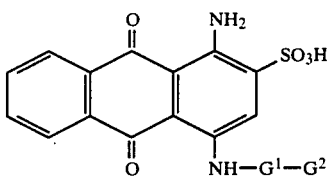

were obtained in a similar manner. The starting materials used are known.

TABLE 10

| Example | G¹ | G² | Hue |
|---|---|---|---|
| 196 | ―⟨benzene with NH-C(=O)- and SO₃H⟩ | A¹ | medium blue |
| 197 | " | A² | reddish blue |
| 198 | " | A³ | reddish blue |
| 199 | " | A⁵ | reddish blue |
| 200 | ―⟨benzene with SO₃H, NH-C(=O)-, SO₃H⟩ | A³ | reddish blue |
| 201 | " | A¹ | neutral blue |
| 202 | " | A² | neutral blue |
| 203 | ―⟨benzene with NHCO- and SO₃H⟩ | A¹ | neutral blue |
| 204 | " | A² | neutral blue |
| 205 | " | A³ | neutral blue |
| 206 | " | A⁴ | neutral blue |

TABLE 10-continued

| Example | G¹ | G² | Hue |
|---|---|---|---|
| 207 | ―⟨benzene with NHSO₂- and SO₃H⟩ | A¹ | blue |
| 208 | " | A² | " |
| 209 | ―⟨benzene with H₃C, NHCO-, CH₃, H₃C, SO₃H⟩ | A¹ | " |
| 210 | " | A² | " |
| 211 | " | A³ | " |
| 212 | " | A⁴ | " |
| 213 | ―⟨biphenyl with SO₃H, NHCO-, SO₃H⟩ | A¹ | " |
| 214 | " | A² | " |
| 215 | " | A³ | " |
| 216 | ―⟨cyclohexyl-NHCO-⟩ | A³ | " |
| 217 | ―⟨benzene-SO₃H⟩-CH=CH-⟨benzene-NH-, HO₃S⟩ | A² | medium blue |
| 218 | " | A³ | medium blue |
| 219 | ―⟨benzene with CH₃, NHCO-, SO₃H⟩ | A² | medium blue |
| 220 | " | A³ | medium blue |
| 221 | -CH₂-C(CH₃)(CH₃)-CH₂NHCO- | A² | medium blue |
| 222 | ―⟨benzothiazole with HO₃S, -NH-⟩ | A¹ | medium blue |
| 223 | " | A² | medium |

TABLE 10-continued

| Example | G¹ | G² | Hue |
|---|---|---|---|
|  |  |  | blue |

EXAMPLE 224

69 parts of the dye of the formula

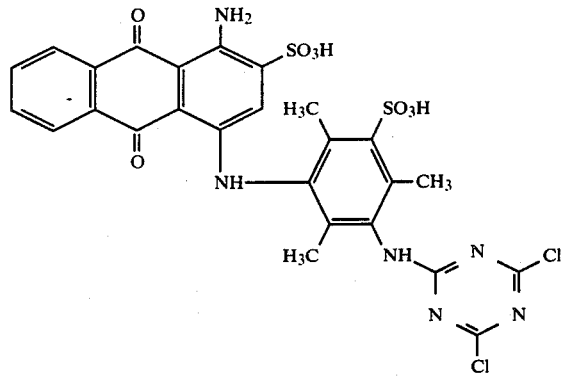

are prepared in a conventional manner. 23 parts of the amine $H_2N-A^2$ are added to the reaction solution at 20° C., and the pH is brought to 7 by slowly adding 10% strength sodium carbonate solution. Salting out with NaCl gives 74 parts of the blue dye of the formula

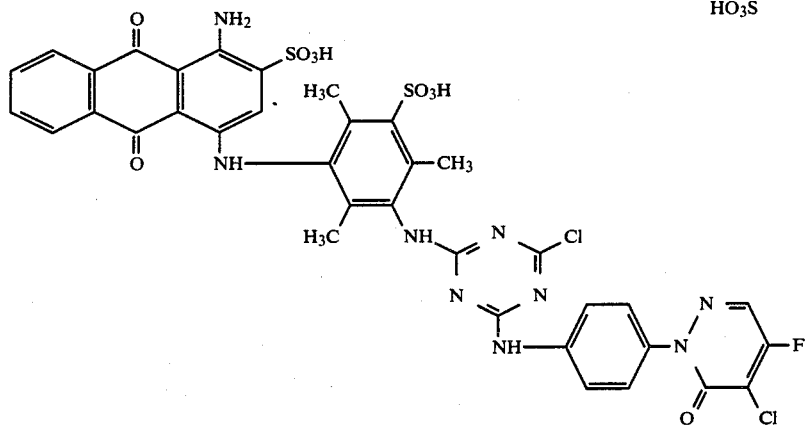

The dyes below were synthesized in a similar manner:

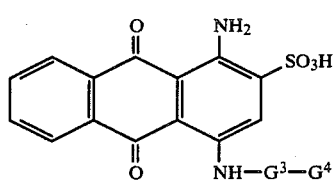

TABLE 11

| Example | G³ | G⁴ | Hue |
|---|---|---|---|
| 225 | (structure with H₃C, SO₃H, CH₃, H₃C, NH, triazine with Cl, NH—) | A¹ | blue |
| 226 | (phenyl-SO₃H, NH, triazine with Cl, NH—) | A¹ | " |
| 227 | " | A² | " |
| 228 | (biphenyl with SO₃H, HO₃S, NH, triazine with Cl, NH—) | A¹ | " |
| 229 | " | A² | " |
| 230 | (phenyl with SO₃H, NH, triazine with Cl) | A² | " |

EXAMPLE 231

The procedure described in Example 224 is followed, except that, instead of the amine $H_2N-A^2$, the amine reacted is one obtained by acylating metamic acid with the acid chloride $ClCO-A^3$. In this manner, 80 parts of the dye of the formula

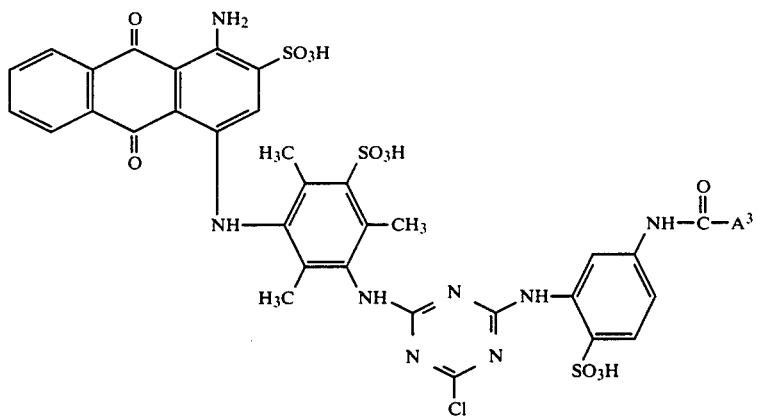

are obtained.

Dyes of the general formula

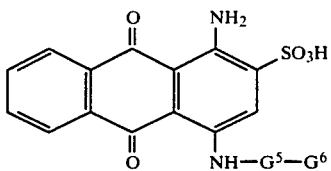

were synthesized in a similar manner.

TABLE 12

| Example | $G^5$ | $G^6$ | Hue |
|---|---|---|---|
| 232 | (H₂C, SO₃H, CH, H₂C substituted phenyl-NH-triazinyl(Cl)-NH-phenyl(SO₃H)-NHC(O)-) | $A^1$ | reddish blue |
| 233 | (H₂C, SO₃H, CH, H₂C substituted phenyl-NH-triazinyl(Cl)-NH-phenyl(SO₃H)-NHC(O)-) | $A^2$ | reddish blue |
| 234 | (phenyl(SO₃H)-NH-triazinyl(Cl)-NH-phenyl(SO₃H)-NHC(O)-) | $A^1$ | reddish blue |

TABLE 12-continued

| Example | G⁵ | G⁶ | Hue |
|---|---|---|---|
| 235 | (2-SO₃H-4-methylphenyl)-NH-C(=N-)-N=C(Cl)-N=C-NH-(2-SO₃H-5-NHCO—)phenyl triazine | A² | reddish blue |
| 236 | (2-SO₃H-4-methylphenyl)-NH-C(=N-)-N=C(Cl)-N=C-NH-(2-SO₃H-5-NHCO—)phenyl triazine | A³ | reddish blue |
| 237 | (2-SO₃H-4-methylphenyl)-NH- triazine(Cl)-NHC₂H₄NHCO— | A³ | blue |
| 238 | (2-SO₃H-4-methylphenyl)-NH- triazine(Cl)-NHC₂H₄NHCO— | A² | blue |
| 239 | (2-SO₃H-4-methylphenyl)-NH- triazine(Cl)-NH—C₂H₄NHCO— | A¹ | blue |
| 240 | (2-SO₃H-4-methylphenyl)-NH- triazine(Cl)-NH—C₂H₄NHCO— | A² | blue |

TABLE 12-continued

| Example | G⁵ | G⁶ | Hue |
|---|---|---|---|
| 241 | (4-methylphenyl, 2-SO₃H)-NH-C(=N-)-N=C(Cl)-N=C-NH-C₂H₄NHCO- triazine | A³ | blue |
| 242 | (4-methylphenyl, 2-SO₃H)-NH-triazine(Cl)-NH-(phenyl, SO₃H, NHC(O)-) | A¹ | blue |
| 243 | (4-methylphenyl, 2-SO₃H)-NH-triazine(Cl)-NH-(phenyl, SO₃H, NHC(O)-) | A² | blue |
| 244 | (4-methylphenyl, 2-SO₃H)-NH-triazine(Cl)-NH-(phenyl, SO₃H, NHC(O)-) | A³ | blue |
| 245 | (methylphenyl, SO₃H, SO₃H)-NH-triazine(Cl)-NH-(phenyl, Cl, NHC(O)-) | A¹ | blue |
| 246 | (methylphenyl, SO₃H, SO₃H)-NH-triazine(Cl)-NH-(phenyl, Cl, NHC(O)-) | A² | blue |

TABLE 12-continued

| Example | $G^5$ | $G^6$ | Hue |
|---|---|---|---|
| 247 | SO₃H (structure shown) | $A^3$ | blue |

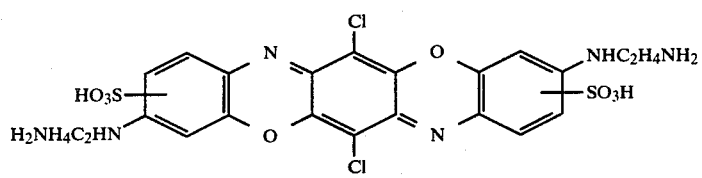

EXAMPLE 248

15.8 parts of the compound of the formula

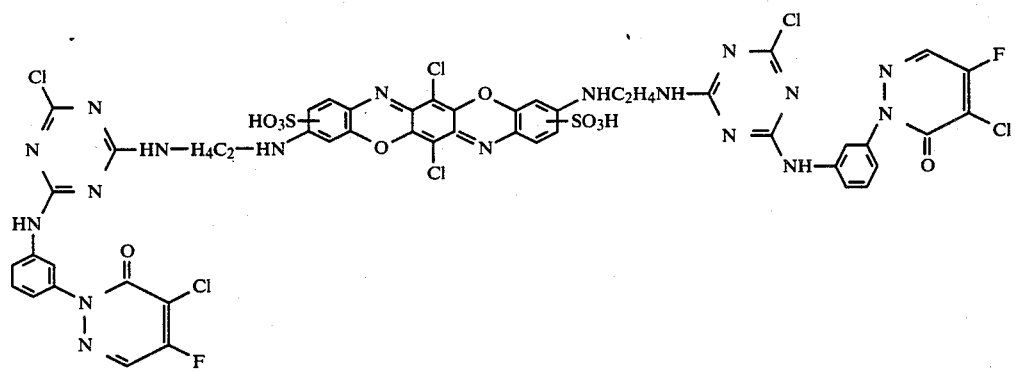

and 1,500 parts of water are heated to 45° C., the pH being brought to 9 with sodium hydroxide solution. The mixture is cooled to 0°–5° C., the pH is reduced to 7 with hydrochloric acid, and a fine suspension of 9.7 parts of cyanuric chloride in 100 parts of ice-water is then added. The mixture is stirred at 0°–5° C., and the pH is kept at from 6.5 to 7 with sodium carbonate until the reaction is complete, this requiring about 1½ hours. A solution of 12.7 parts of 1-(3'-aminophenyl)-5-chloro-4-fluoropyridazin-6-one in 50 parts of N-methylpyrrolidone is then added dropwise in the course of 10 minutes. The temperature is increased to 40° C., and the mixture is stirred, while maintaining the pH at 6.5, until the reaction is complete. The mixture is then cooled to 20° C., salting out is effected with 400 parts of sodium chloride, and the precipitated dye is filtered off under suction and dried. It dyes cellulose fibers in reddish blue hues which have good fastness properties, and is of the formula

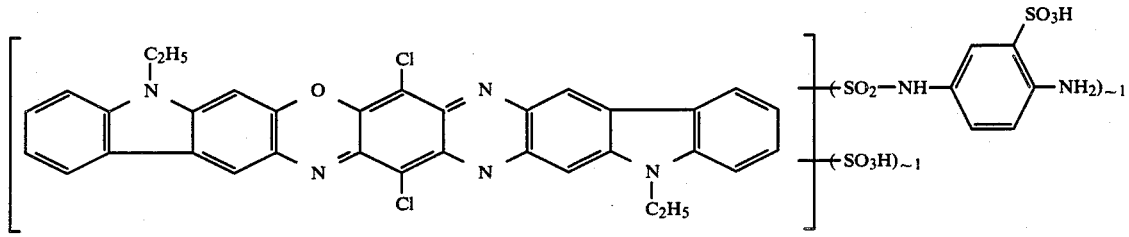

EXAMPLE 249

23 parts of the compound corresponding roughly to the formula are dissolved in 450 parts of water, and a solution of 6.1 parts of 1-(2'-chlorocarbonylethyl)-5-chloro-4-fluoropyridazin-6-one in 25 parts of ethyl acetate is added dropwise at 0°–5° C. The temperature is then allowed to increase to 25° C. in the course of 1½ hours, while stirring thoroughly, the pH being kept at 6–6.5 by the addition of sodium bicarbonate. The mixture is stirred at this temperature until the pH remains constant, after which salting out is effected with sodium chloride, and the dye is filtered off under suction and dried. It dyes cellulose fibers in reddish blue hues, and corresponds roughly to the formula

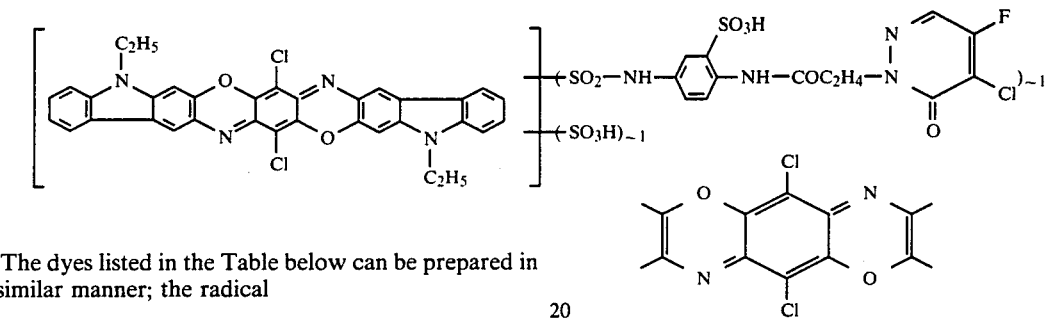

The dyes listed in the Table below can be prepared in a similar manner; the radical is abbreviated to

TABLE 13

| Example | X | Anchor | Hue |
|---|---|---|---|
| 250 | [structure with two N-C₂H₅ indole groups linked by A, with —SO₂NH—C₆H₃(SO₃H)—NH—  and —SO₃H] | —NH—A¹ (triazine with Cl) | reddish blue |
| 251 | " | —NH—A² (triazine with Cl) | reddish blue |
| 252 | " | —CO—A² | reddish blue |
| 253 | " | —CO—A⁴ | reddish blue |
| 254 | " | —CO—A⁵ | reddish blue |
| 255 | [structure with two benzofuran groups linked by A, with —SO₂—NH—C₆H₃(SO₃H)—NH—] | A¹ (triazine with Cl) | reddish violet |

TABLE 13-continued

| Example | X | Anchor | Hue |
|---|---|---|---|
| 256 | [indene-naphthalene A with (SO₂—NH—C₆H₃(SO₃H)—NH)~1 and (SO₃H)~1] | —CO—A³ | red |
| 257 | —HNH₂CH₂CHN— and HO₃S— on A; SO₃H and —NHCH₂CH₂NH— on A | triazine with NH—A¹, F | reddish blue |
| 258 | " | triazine with NH—A², Cl | reddish blue |
| 259 | " | —CO—A¹ | reddish blue |
| 260 | " | —CO—A² | reddish blue |
| 261 | " | —CO—A³ | reddish blue |
| 262 | —HN—C₆H₂(SO₃H)(SO₃H)—HN— A(HO₃S)(SO₃H)—NH—C₆H₂(SO₃H)(SO₃H)—NH— | triazine with NH—A¹, Cl | reddish blue |
| 263 | —HN—C₆H₄—HN—A(HO₃S)(SO₃H)—NH—C₆H₄—NH— | —CO—A³ | reddish blue |
| 264 | —HN—C₆H₃(SO₃H)—HN—A(HO₃S)(SO₃H)—NH—C₆H₃(SO₃H)—NH— | triazine with NH—A², Cl | reddish blue |

TABLE 13-continued

| Example | X | Anchor | Hue |
|---|---|---|---|
| 265 | (structure) | —CO—A² | reddish blue |
| 266 | (structure) | (monochlorotriazine with NHA¹) | reddish blue |
| 267 | (structure) | (monochlorotriazine with NHA²) | reddish blue |
| 268 | (structure) | —CO—A² | reddish blue |
| 269 | (structure) | —CO—A¹ | red |
| 270 | (structure) | (dichlorotriazine with NH—A¹) | red |
| 271 | (structure) | (dichlorotriazine with NHA²) | red |

TABLE 13-continued
| Example | X | Anchor | Hue |
|---|---|---|---|
| 272 | 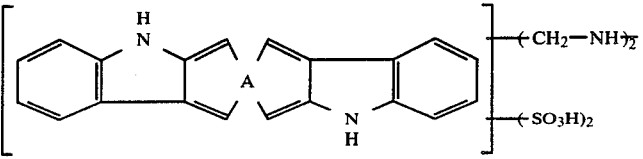 | 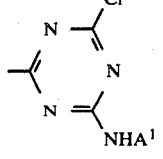 | blue |
| 273 | 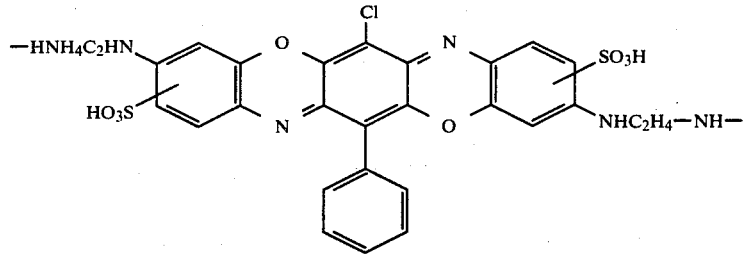 | 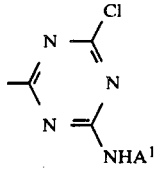 | reddish blue |
| 274 | 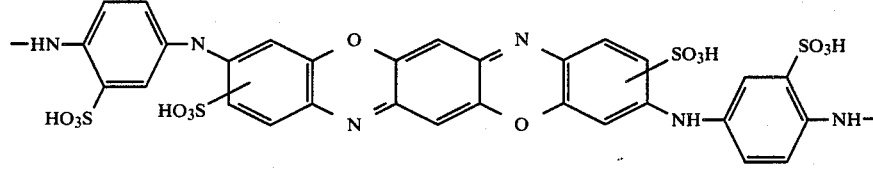 | —CO—A³ | reddish blue |
| 275 | 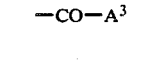 | 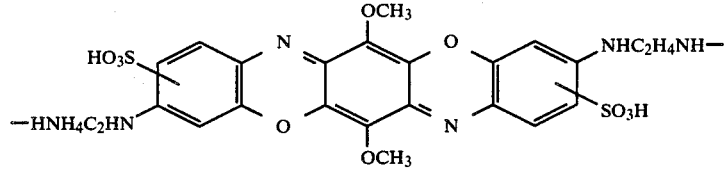 | reddish blue |
| 276 | 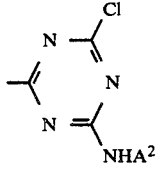 | 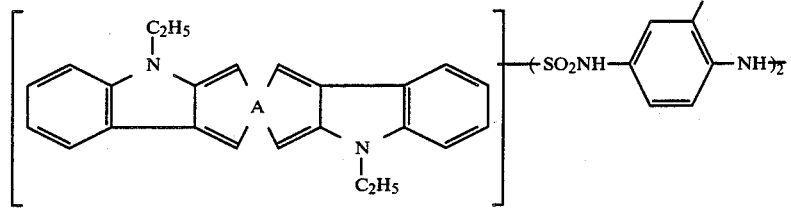 | reddish blue |
| 276a | 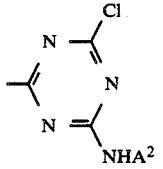 | 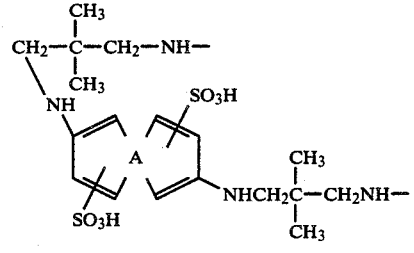 | reddish blue |
| 276b | 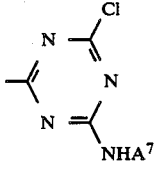 | 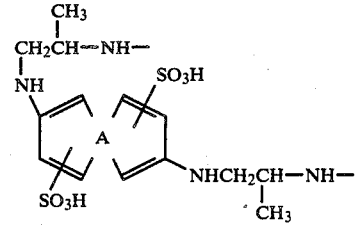 | reddish blue |

EXAMPLE 277

48.5 parts of copper phthalocyanine tetrasulfonyl chloride are stirred with a mixture of 125 parts of ice and 125 parts of water, and a solution of 14.4 parts of 1-(4′-aminophenyl)-5-chloro-4-fluoropyridazin-6-one in 50 parts of dimethylformamide is added dropwise at 0°–5° C. Thereafter, the pH is brought to 6 with sodium bicarbonate, and the mixture is heated to 30° C. in the course of 1 hour and to 40° C. in the course of a further hour, and is kept at this temperature for 3 hours, the pH being kept constantly at 6–6.5. Salting out is then effected with sodium chloride, and the dye is filtered off under suction and dried. It corresponds roughly to the formula

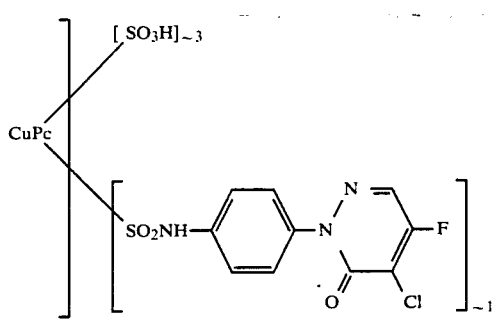

and dyes cellulose material in greenish blue hues.

EXAMPLE 278

19.7 parts of the compound of the formula

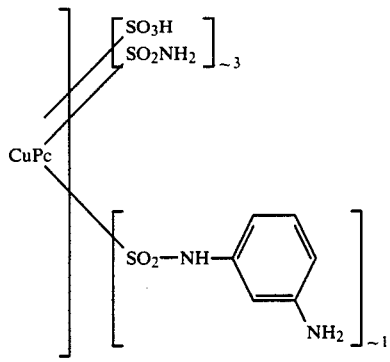

are stirred with 125 parts of ice and 125 parts of water to give a homogeneous mixture, and the pH is brought to 7–7.5 with sodium hydroxide solution. A solution of 5.7 parts of 1-(2′-chlorocarbonylethyl)-5-chloro-4-fluoropyridazin-6-one in 45 parts of chloroform is added dropwise at 10° C. in the course of 10 minutes. The mixture is then stirred at 10°–15° C., and the pH is kept at 6.5–7 by the addition of sodium carbonate. After about 1 hour, the pH remains constant; the dye, the preparation of which is complete, is then melted out with sodium chloride, filtered off under suction and dried. It corresponds roughly to the formula

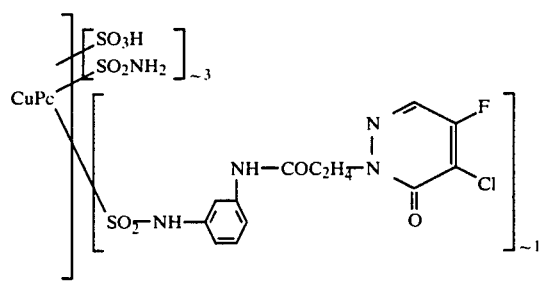

and dyes cellulose material in fast greenish blue hues.

EXAMPLE 279

58 parts of the compound corresponding roughly to the formula

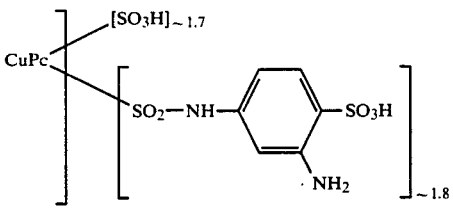

are stirred with 300 parts of water and 125 parts of ice to give a homogeneous mixture, and the pH is brought to 7 with sodium hydroxide solution. A fine suspension of 16.6 parts of cyanuric chloride in 170 parts of ice water is then added at 0°–5° C., the pH being kept at 5.3–5.5 with 10% strength sodium hydroxide solution. When the reaction is complete, a solution of 21.6 parts of 1-(4′-aminophenyl)-5-chloro-4-fluoropyridazin-6-one in 60 parts of dimethylformamide is added dropwise. The mixture is then heated to 35°–40° C. and kept at this temperature for 4 hours, the pH being maintained at 6 with sodium bicarbonate. The mixture is then cooled, salting out is effected with sodium chloride, and the dye is filtered off under suction and dried. It corresponds roughly to the formula

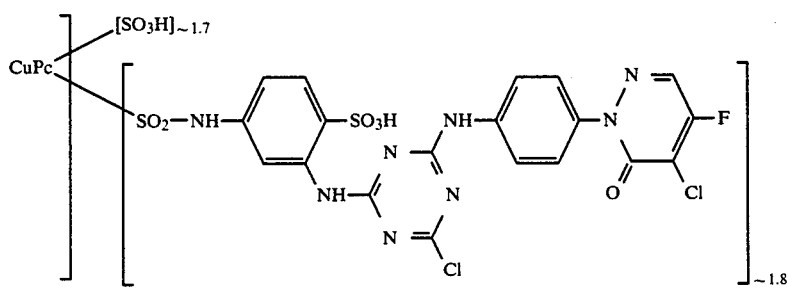

The dyes listed in the Table below can be prepared in a similar manner. They are of the general formula

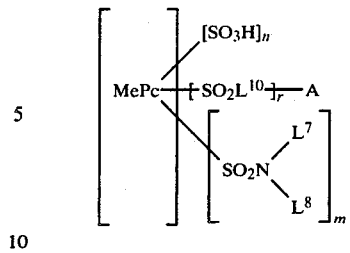

where n and m are each 0, 1, 2 or 3 and r is 1, 2, 3 or 4.

TABLE 14

| Example | Me | L⁷ | L⁸ | L¹⁰ | A | n (approx.) | m (approx.) | r (approx.) | Hue |
|---|---|---|---|---|---|---|---|---|---|
| 280 | Cu | H | H | —NH—(1,3-C₆H₄)—NH— | chloro-triazine with NH—A¹ | 2 | 1 | 1 | greenish blue |
| 281 | Cu | — | — | —HN—CH₂—CH₂—NH— | chloro-triazine with NH—A² | 3 | 0 | 1 | greenish blue |
| 282 | Cu | — | — | —NH—(C₆H₃)(SO₃H)(NH—) | —CO—A² | 1,7 | 0 | 1,8 | greenish blue |
| 283 | Cu | — | — | —NH—(C₆H₃)(SO₃H)(NH—) | chloro-triazine with NH—A¹ | 3 | 0 | 1 | greenish blue |
| 284 | Cu | H | H | —HN—(C₆H₃)(COOH)—NH— | chloro-triazine with NH—A¹ | 2 | 1 | 1 | greenish blue |
| 284a | Ni | H | H | —NH—(1,3-C₆H₄)—NH— | chloro-triazine with NHA⁸ | 2 | 1 | 1 | turquoise green |
| 285 | Cu | — | — | —NH—CH₂—CH₂—N(CH₃)— | —CO—A³ | 1 | 0 | 3 | greenish blue |
| 286 | Cu | H | H | —NH—(C₆H₂)(SO₃H)(CH₃)(NH—) | —CO—A² | 1,6 | 1 | 1 | greenish blue |
| 287 | Cu | — | — | direct bond | —NH—A² | 3 | 0 | 1 | greenish blue |

TABLE 14-continued

| Example | Me | L⁷ | L⁸ | L¹⁰ | A | n | m | r | Hue |
|---|---|---|---|---|---|---|---|---|---|
| 288 | Cu | H | H | 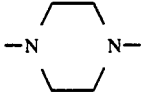 —N(piperazine)N— | —CO—A³ | 2 | 1 | 1 | greenish blue |
| 289 | Ni | — | — | 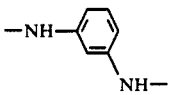 —NH—C₆H₄—NH— | 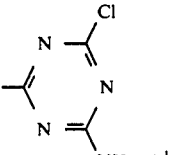 triazine with Cl and NH—A¹ | 3 | 0 | 1 | bluish green |
| 289a | Ni | — | — | 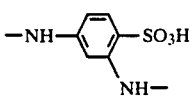 —NH—C₆H₃(SO₃H)—NH— | 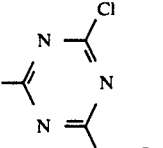 triazine with Cl and NHA⁷ | 1.7 | 0 | 1.8 | bluish green |
| 290 | Ni | — | — | 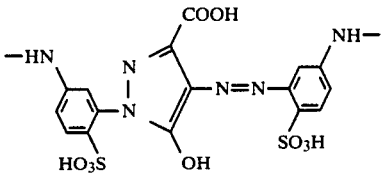 pyrazolone bis-azo linker | 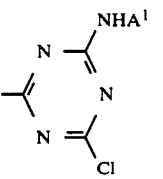 triazine NHA¹/Cl | 3 | 0 | 1 | green |
| 291 | Ni | — | — | 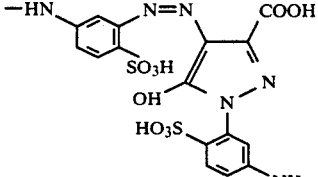 pyrazole azo linker | 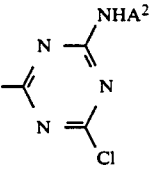 triazine NHA²/Cl | 2 | 0 | 1,5 | green |
| 292 | Cu [⟨⟩]₄Pc | — | — | —NH—CH₂—CH₂—NH— |  triazine NHA¹/Cl | 3-4 | 0 | 2-3 | green |
| 293 | Ni | — | — | 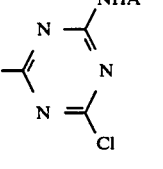 pyrazolone stilbene linker | —CO—A² | 3 | 0 | 1 | green |

EXAMPLE 294

64.8 parts of the known dye of the formula

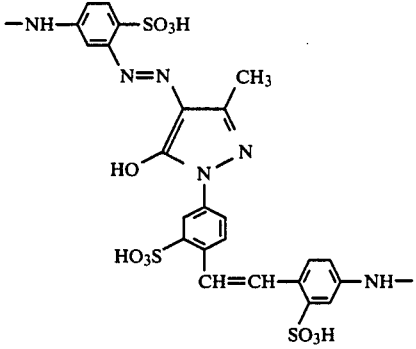

99

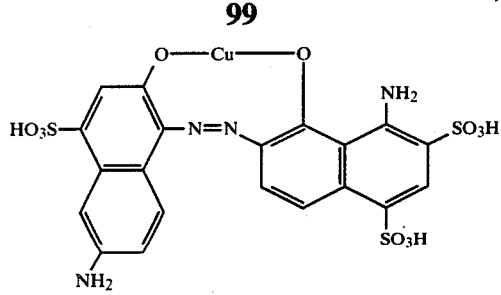

are stirred with 700 parts of water, and 1 part of wetting agent and 24 parts of the compound ClCO-A³, dissolved in 100 parts of chloroform, are added. The pH is increased to 7 in the course of 2 hours by sprinkling in solid sodium bicarbonate.

The dye is obtained from the solution by spray-drying, the yield being 73 parts of the dye of the formula

100

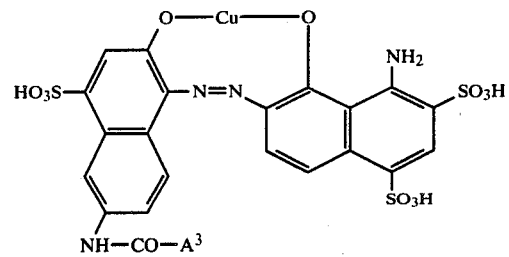

The dyes of the general formula chromophore-$G^7$-$G^8$ were synthesized in a similar manner and by conventional methods, and are summarized in Table 15.

The chromophores either are known or were prepared similarly to known compounds, using standard methods.

TABLE 15

| Example | Chromophore | $G^7$ | $G^8$ | Color |
|---|---|---|---|---|
| 295 | ![structure with Cu, HO₃S, NH₂, SO₃H, N=N, NH—] | −C(=O)− | $A^1$ | blue |
| 296 | " | " | $A^2$ | blue |
| 297 | " | ![chlorotriazine with NH—] | $A^1$ | blue |
| 298 | " | " | $A^2$ | blue |
| 299 | " | −C(=O)− | $A^5$ | blue |
| 300 | " | ![chlorotriazine with NH—phenyl(SO₃H)—NHCO—] | $A^3$ | blue |
| 301 | ![disazo Cu complex structure with HO₃S groups, N=N, NH—] | −C(=O)− | $A^3$ | blue |
| 302 | " | " | $A^2$ | blue |

TABLE 15-continued
| Example | Chromophore | G⁷ | G⁸ | Color |
|---|---|---|---|---|
| 303 | " | 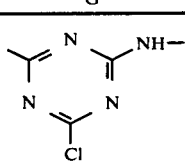 | A¹ | blue |
| 304 | " | " | A² | blue |
| 305 | 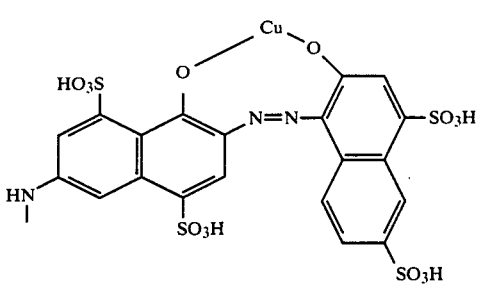 | $-\overset{O}{\underset{\|}{C}}-$ | A³ | blue |
| 306 | " | " | A² | blue |
| 307 | " |  | A² | blue |
| 308 | " | " | A¹ | blue |
| 309 | 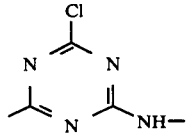 | $-\overset{O}{\underset{\|}{C}}-$ | A³ | navy |
| 310 | 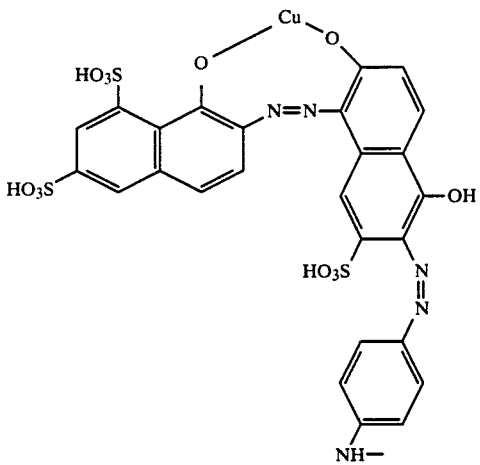 | " | A³ | blue |
| 311 | " | " | A² | blue |

TABLE 15-continued
| Example | Chromophore | G⁷ | G⁸ | Color |
|---|---|---|---|---|
| 312 | " | 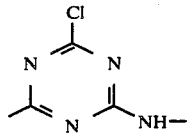 | $A^1$ | blue |
| 313 | " | " | $A^2$ | blue |
| 314 | " | 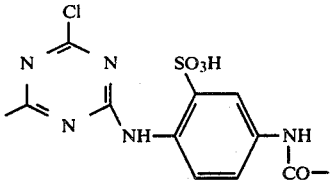 | $A^3$ | blue |
| 315 | " | " | $A^2$ | blue |
| 316 | 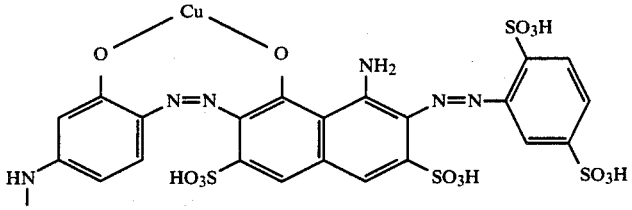 | $-\overset{O}{\underset{\|}{C}}-$ | $A^3$ | navy |
| 317 |  | " | $A^3$ | navy |
| 318 | " | " | $A^1$ | navy |
| 319 | " | " | $A^2$ | navy |
| 320 | 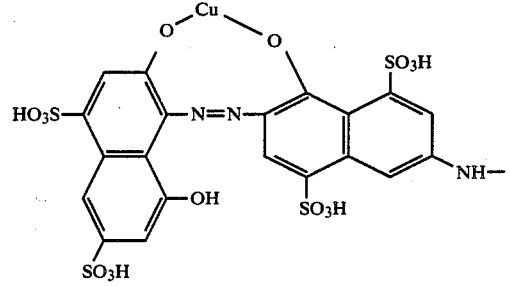 | " | $A^3$ | blue |
| 321 | 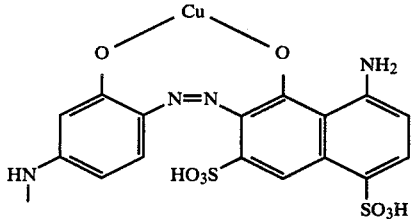 | " | $A^3$ | navy |

TABLE 15-continued

| Example | Chromophore | G⁷ | G⁸ | Color |
|---|---|---|---|---|
| 322 | " | (methyl-triazine with NH— and Cl substituents) | A² | navy |
| 323 | Cu 1:2-complex of chloro-hydroxyphenyl-azo-amino-naphthalene disulfonic acid with HO₃S substituent | $-\overset{O}{\underset{\|}{C}}-$ | A³ | voilet |
| 324 | " | " | A² | violet |
| 325 | " | (methyl-triazine with NH— and Cl substituents) | A² | violet |
| 326 | Cr 1:2-complex of chloro-hydroxyphenyl-azo-amino-naphthalene disulfonic acid | $-\overset{O}{\underset{\|}{C}}-$ | A³ | navy |
| 327 | " | " | A² | navy |
| 328 | " | (methyl-triazine with NH— and Cl substituents) | A¹ | navy |
| 329 | " | " | A² | navy |
| 330 | Co 1:2-complex of sulfamoyl-hydroxyphenyl-azo-amino-naphthalene disulfonic acid | $-\overset{O}{\underset{\|}{C}}-$ | A³ | navy |

TABLE 15-continued

| Example | Chromophore | G⁷ | G⁸ | Color |
|---|---|---|---|---|
| 331 | [1:2-complex of chromium with 2-carboxyphenyl azo coupled to 1-hydroxy-6-(methylamino)-3-sulfonaphthalene] | " | | A³ brown |
| 332 | " | " | | A² brown |
| 333 | " | " | | A¹ brown |
| 334 | " | | [6-methyl-2-chloro-4-(methylamino)-1,3,5-triazine] | A² brown |
| 335 | [1:2-Cr complex of 4-nitro-2-carboxyphenyl azo 3-methyl-1-(4-aminophenyl)-5-hydroxypyrazole] | | $-\overset{O}{\underset{}{C}}-$ | A³ brown |
| 336 | [1:2-Co complex of 2-hydroxy-5-(N,N-dimethylsulfamoyl)phenyl azo 3-methyl-1-(4-aminophenyl)-5-hydroxypyrazole] | " | | A³ brown |
| 337 | [Cu complex of 3-(methylamino)-5-sulfo-2-hydroxyphenyl azo 3-methyl-1-(2-chloro-5-sulfophenyl)-5-hydroxypyrazole] | " | | A³ brown |
| 338 | " | " | | A² brown |

TABLE 15-continued
| Example | Chromophore | G⁷ | G⁸ | Color |
|---|---|---|---|---|
| 339 | " | 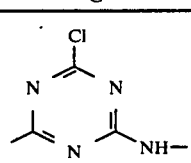 | A¹ | brown |
| 340 | 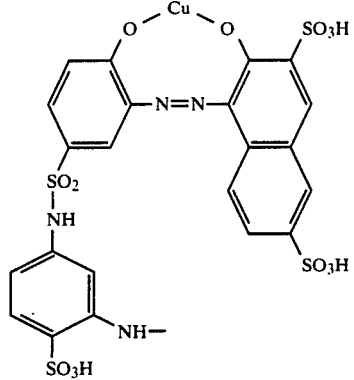 | $-\overset{O}{\underset{}{C}}-$ | A³ | red |
| 341 |  | " | A³ | bluish red |
| 342 | " | " | A² | bluish red |
| 343 | " | 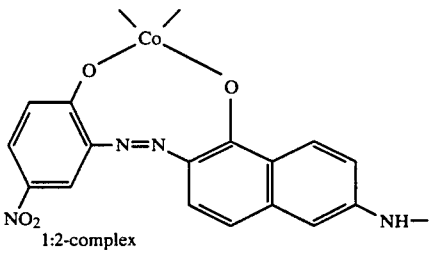 | A² | bluish red |
| 344 | 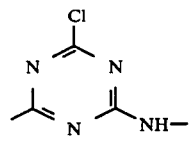 | $-\overset{O}{\underset{}{C}}-$ | A³ | red |
| 345 | " | " | A² | red |
| 346 | " | 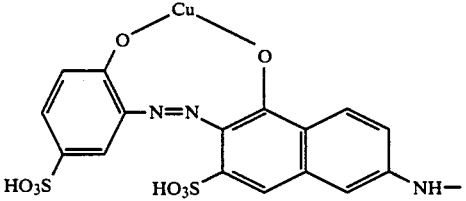 | A² | red |

TABLE 15-continued

| Example | Chromophore | G⁷ | G⁸ | Color |
|---|---|---|---|---|
| 347 | Cu complex of 2-hydroxy-5-sulfophenylazo chromophore with naphthalene bearing OH, SO₃H, NH–, SO₃H | –C(=O)– | A³ | violet |
| 348 | " | chloro-methyl-triazinyl-NH– | A² | violet |
| 349 | Cu complex of aminophenyl-azo-naphthalene with OH, SO₃H, SO₃H, HN– substituents | –C(=O)– | A³ | violet |
| 350 | 2-hydroxy-5-nitrophenylazo / hydroxy-amino-disulfo-naphthalene; Mixture of the 1:2 Co and Cr complexes | " | A³ | black |
| 351 | " | " | A¹ | black |
| 352 | " | " | A² | black |
| 353 | " | chloro-methyl-triazinyl-NH– | A | black |
| 354 | " | " | A¹ | black |
| 355 | Cr 1:2-complex of 2-hydroxy-4-nitrophenylazo-naphthalene (OH, SO₃H, SO₃H, NH–) | –C(=O)– | A³ | gray |
| 356 | Cr 1:2-complex of 4-nitro-2-hydroxy-5-sulfophenylazo-naphthalene (OH, SO₃H, NH–) | " | A³ | blackish gray |

TABLE 15-continued

| Example | Chromophore | G⁷ | G⁸ | Color |
|---|---|---|---|---|
| 357 | [Co complex azo dye chromophore with HO₃S, H₃C, NH, Co, O, SO₃H, NH— groups] | " | A³ | brown |
| 358 | " | " | A¹ | brown |
| 359 | " | " | A² | brown |
| 360 | " | [chloro-methyl-triazinyl-NH— group] | A¹ | brown |
| 361 | " | " | A² | brown |
| 362 | [Cu complex azo dye chromophore with HO₃S, COO, Cu, O, NH—, SO₃H, phenyl groups] | $-\overset{O}{\underset{\|}{C}}-$ | A³ | blue |
| 363 | " | " | A² | blue |
| 364 | " | [chloro-methyl-triazinyl-NH— group] | A² | blue |
| 365 | " | " | A¹ | blue |
| 366 | " | [fluoro-methyl-triazinyl-NH— group] | A¹ | blue |

TABLE 15-continued

| Example | Chromophore | G⁷ | G⁸ | Color |
|---|---|---|---|---|
| 367 | [Cu complex azo structure with HO₃S, COO, NH-, O, SO₃H, Cl, HO₃S substituents] | $-\overset{O}{\underset{\|}{C}}-$ | A³ | blue |
| 368 | " | " | A² | blue |
| 369 | [Cu complex azo structure with HO₃S, O, NH-, SO₃H, phenyl substituents] | $-\overset{O}{\underset{\|}{C}}-$ | A³ | blue |
| 370 | [Cu complex azo structure with HO₃S, HO₃S, O, NH-, SO₃H substituents] | $-\overset{O}{\underset{\|}{C}}-$ | A³ | blue |
| 371 | " | " | A¹ | blue |
| 372 | " | " | A² | blue |
| 373 | " | [triazine with Cl and NH- substituents] | | A² | blue |

EXAMPLE 374

18.8 parts of 1,3-Phenylenediamine-4-sulfonic acid are dissolved in 200 parts of water to give a neutral solution, and a solution of 32 parts of 3-(5'-chloro-4'-fluoropyridazin-6'-on-1'-yl)-propionyl chloride in 80 parts of chloroform is added dropwise at 10° C., the pH being kept at 7 by the addition of 80 parts of 1 molar sodium carbonate solution. After 4 hours, the reaction mixture is diazotized in a solution containing hydrochloric acid, and a solution of 39 parts of 1-isobutyrylamino-8-hydroxynaphthalene-4,6-disulfonic acid in 300 parts of water is added at 5° C. Coupling is completed in a slightly acidic medium by adding 15.8 parts of sodium carbonate, and the dye is precipitated from neutral solution with potassium chloride. The pressed material is freeze-dried. The resulting red powder dyes cotton in brilliant yellowish red fast hues. The dye is of the formula

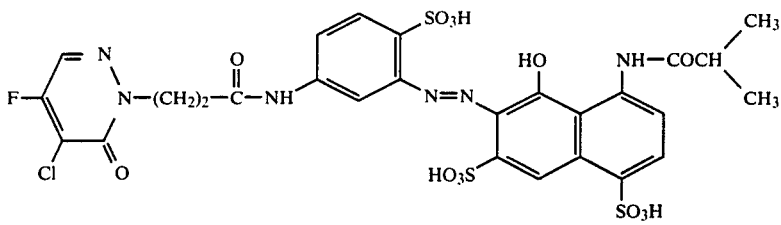

Further dyes according to the invention are listed in Table 16, where column I shows the radical of the carboxylic acid chloride used, columns II and III indicate the compounds used instead of 1,3-Phenylenediamine-4-sulfonic acid and 1-isobutyrylamino-8-hydroxynaphthalene-4,6-disulfonic acid, and column IV states the hue obtained on cotton.

TABLE 16

| Exple | I | II | III | IV |
|---|---|---|---|---|
| 375 | $A^3$ | 1,3-Phenylenediamine-4-sulfonic acid | 1-Benzoylamino-8-hydroxynaphthalene-4,6-disulfonic acid | yellowish red |
| 376 | $A^3$ | 1,3-Phenylenediamine-4-sulfonic acid | 1-Benzoylamino-8-hydroxynaphthalene-3,6-disulfonic acid | red |
| 377 | $A^4$ | 1,3-Phenylenediamine-4-sulfonic acid | 1-(3'-Carboxypropionyl-amino)-8-hydroxynaphthalene-4,6-disulfonic acid | yellowish red |
| 378 | $A^3$ | 1,4-Phenylenediamine-2-sulfonic acid | 1-Butyrylamino-8-hydroxynaphthalene-4,6-disulfonic acid | bluish |
| 379 | $A^3$ | 1,3-Phenylenediamine-4-sulfonic acid | 1-(2'-Carboxy-6'-chlorobenzoylamino)-8-hydroxynaphthalene-3,6-disulfonic acid | red |
| 380 | $A^2$ | 1,3-Phenylenediamine-4-sulfonic acid | 1-(3'-Sulfopropionyl-amino)-8-hydroxynaphthalene-3,6-disulfonic acid | red |
| 381 | $A^3$ | 1,3-Phenylenediamine-4-sulfonic acid | 1-(3'-Sulfopropionyl-amino)-8-hydroxynaphthalene-3,6-disulfonic acid | red |
| 382 | $A^1$ | 1,3-Phenylenediamine-4-sulfonic acid | 1-(Sulfoacetylamino)-8-hydroxynaphthalene-3,6-disulfonic acid | red |
| 383 | $A^4$ | 1,3-Phenylenediamine-4-sulfonic acid | 1-(Sulfoacetylamino)-8-hydroxynaphthalene-4,6-disulfonic acid | yellowish red |
| 384 | $A^1$ | 1,3-Phenylenediamine-4-sulfonic acid | 1-(3'-Sulfopropionyl-amino)-8-hydroxynaphthalene-4,6-disulfonic acid | yellowish red |
| 385 | $A^3$ | 1,3-Phenylenediamine-4-sulfonic acid | 1-(3'-Sulfopropionyl-amino)-8-hydroxynaphthalene-4,6-disulfonic acid | yellowish red |
| 386 | $A^3$ | 1,3-Phenylenediamine-4-sulfonic acid | 1-Succinylamino-8-hydroxynaphthalene-3,6-disulfonic acid | red |
| 387 | $A^2$ | 1,3-Phenylenediamine-4-sulfonic acid | 1-(2'-Sulfobenzoyl-amino)-8-hydroxynaphthalene-3,6-disulfonic acid | red |
| 388 | $A^3$ | 1,3-Phenylenediamine-4-sulfonic acid | 1-(2'-Sulfobenzoyl-amino)-8-hydroxynaphthalene-3,6-disulfonic acid | red |
| 389 | $A^4$ | 1,3-Phenylenediamine-4-sulfonic acid | 1-(2'-Sulfobenzoylamino-8-hydroxynaphthalene-4,6-disulfonic acid | yellowish red |
| 390 | $A^2$ | 1,3-Phenylenediamine-4-sulfonic acid | 1-(2'-Sulfobenzoylamino-8-hydroxynaphthalene-4,6-disulfonic acid | yellowish red |
| 391 | $A^3$ | 1,3-Phenylenediamine-4-sulfonic acid | 1-(Cyclohexylaminocarbonylamino)-8-hydroxynaphthalene-3,6-disulfonic acid | yellowish red |
| 392 | $A^3$ | 1,3-Phenylenediamine-4-sulfonic acid | 2-(3'-Sulfopropionyl-amino)-5-hydroxynaphthalene-7-sulfonic acid | orange |
| 393 | $A^1$ | 1,3-Phenylenediamine-4-sulfonic acid | 2-(3'-Sulfopropionyl-amino)-5-hydroxynaphthalene-7-sulfonic acid | orange |
| 394 | $A^4$ | 1,3-Phenylenediamine-4-sulfonic acid | 2-(Sulfoacetylamino)-5-hydroxynaphthalene-7-sulfonic acid | orange |

TABLE 16-continued

| Exple | I | II | III | IV |
|---|---|---|---|---|
| 395 | A³ | 1,3-Phenylenediamine-4-sulfonic acid | 2-(Sulfoacetylamino)-5-hydroxynaphthalene-7-sulfonic acid | orange |
| 396 | A¹ | 1,3-Phenylenediamine-4-sulfonic acid | 2-(2'-Sulfobenzoylamino)-5-hydroxynaphthalene-7-sulfonic acid | orange |
| 397 | A³ | 1,3-Phenylenediamine-4-sulfonic acid | 2-(2'-Sulfobenzoylamino)-5-hydroxynaphthalene-7-sulfonic acid | orange |
| 398 | A³ | 1,3-Phenylenediamine-4-sulfonic acid | 2-(3'-Sulfopropionyl-amino)-8-hydroxynaphthalene-6-sulfonic acid | yellowish red |
| 399 | A¹ | 1,3-Phenylenediamine-4-sulfonic acid | 2-(3'-Sulfopropionyl-amino)-8-hydroxynaphthalene-6-sulfonic acid | yellowish red |
| 400 | A² | 1,3-Phenylenediamine-4-sulfonic acid | 2-(Sulfoacetylamino)-8-hydroxynaphthalene-6-sulfonic acid | yellowish red |
| 401 | A³ | 1,3-Phenylenediamine-4-sulfonic acid | 2-(Sulfoacetylamino)-8-hydroxynaphthalene-6-sulfonic acid | yellowish red |
| 402 | A¹ | 1,3-Phenylenediamine-4-sulfonic acid | 2-(2'-Sulfobenzoylamino)-8-hydroxynaphthalene-6-sulfonic acid | yellowish red |
| 403 | A³ | 1,3-Phenylenediamine-4-sulfonic acid | 2-(2'-Sulfobenzoylamino)-8-hydroxynaphthalene-6-sulfonic acid | yellowish red |
| 404 | A³ | 1,3-Phenylenediamine-4-sulfonic acid | 2-(Sulfomethylamino)-8-hydroxynaphthalene-6-sulfonic acid | red |
| 405 | A² | 1,3-Phenylenediamine-4-sulfonic acid | 2-(Sulfomethylamino)-8-hydroxynaphthalene-6-sulfonic acid | red |
| 406 | A³ | 1,4-Phenylenediamine-2-sulfonic acid | 2-(Sulfomethylamino)-8-hydroxynaphthalene-6-sulfonic acid | bluish red |
| 407 | A³ | 1,3-Phenylenediamine-4-sulfonic acid | 2-(N—Acetyl-N—methyl-amino)-8-hydroxynaphthalene-6-sulfonic acid | yellowish red |
| 408 | A³ | 1,3-Phenylenediamine- | 2-(N—Acetyl-N—methyl-amino)-5-hydroxynaphthalene-7-sulfonic acid | orange |
| 409 | A³ | 1,3-Phenylenediamine-4-sulfonic acid | 1-(4'-Sulfophenyl)-3-carboxypyrazolone | greenish yellow |
| 410 | A³ | 1,4-Phenylenediamine-2-sulfonic acid | 1-(4'-Sulfophenyl)-3-carboxypyrazolone | reddish yellow |
| 411 | A³ | 1,4-Phenylenediamine-2-sulfonic acid | 1-[5'-(2''-Amino-4''-chlorotriazinylamino)-2'-sulfophenyl]-3-carboxypyrazol-5-one | reddish yellow |
| 412 | A² | 1,3-Phenylenediamine-4-sulfonic acid | 1-(2'-Methyl-4'-sulfo-phenyl)-3-carboxypyrazol-5-one | yellow |
| 413 | A¹ | 1,3-Phenylenediamine-4-sulfonic acid | 1-(4'-Sulfophenyl)-3-carboxypyrazol-5-one | yellow |
| 414 | A¹ | 1,3-Phenylenediamine-4-sulfonic acid | 1-(2',4'-Disulfophenyl)-3-methylpyrazol-5-one | yellow |
| 415 | A³ | 1,3-Phenylenediamine-4-sulfonic acid | 5-Aminocarbonyl-1-ethyl-2-hydroxy-4-methylpyrid-6-one | yellow |
| 416 | A³ | 1,3-Phenylenediamine-4-sulfonic acid | 1-Ethyl-2-hydroxy-4-methyl-5-sulfomethylpyrid-6-one | yellow |
| 417 | A³ | 1,3-Phenylenediamine-4-sulfonic acid | 4-Amino-6-hydroxy-2-morpholinopyrimidine | yellow |
| 418 | A³ | 1,3-Phenylenediamine-4-sulfonic acid | 1-Hydroxynaphthalene-4,8-disulfonic acid | red |
| 419 | A³ | 1,3-Phenylenediamine-4-sulfonic acid | 1-Hydroxynaphthalene-3,8-disulfonic acid | red |
| 420 | A³ | 1,3-Phenylenediamine-4-sulfonic acid | 1-Hydroxynaphthalene-3,6-disulfonic acid | orange |
| 421 | A³ | 1,3-Phenylenediamine-4-sulfonic acid | 2-(3'-Sulfophenylamino)-8-hydroxynaphthalene-6-sulfonic acid | brown |
| 422 | A¹ | 1,3-Phenylenediamine-4-sulfonic acid | 1-Hydroxynaphthalene-3,6,8-trisulfonic acid | red |
| 423 | A³ | 1,4-Phenylenediamine-2-sulfonic acid | 1-Hydroxynaphthalene-3,6,8-trisulfonic acid | red |
| 424 | A³ | 1,3-Phenylenediamine-4-sulfonic acid | 1-[4'-<3''-(5'''-Chloro-4'''-fluoropyridazin-6'''-on-1'''-yl)-propionyl- | yellow |

TABLE 16-continued

| Example | I | II | III | IV |
|---|---|---|---|---|
| 425 | A⁴ | 1,3-Phenylenediamine-4-sulfonic acid | amino>-phenyl]-3-carboxypyrazol-5-one 1-(4'-Sulfophenyl)-3-carboxypyrazol-5-one | yellow |
| 426 | A⁵ | 1,3-Phenylenediamine-4-sulfonic acid | 1-(4'-Sulfophenyl)-3-carboxypyrazol-5-one | yellow |
| 427 | A⁶ | 1,3-Phenylenediamine-4-sulfonic acid | 1-(4'-Sulfophenyl)-3-carboxypyrazol-5-one | yellow |
| 428 | A⁵ | 1,4-Phenylenediamine-2-sulfonic acid | 1-(4'-Sulfophenyl)-3-carboxypyrazol-5-one | yellow |

EXAMPLE 429

A solution of 32 parts of 3-(5'-chloro-4'-fluoropyridazin-6'-on-1'-yl)-propionyl chloride in 60 parts of ethyl acetate is added dropwise to a solution of 18.8 parts of 1,3-phenylenediamine-4-sulfonic acid in 200 parts of water at 10° C., and the pH is kept at 7 by the addition of 80 parts of 1 molar sodium carbonate solution. After 4 hours, the reaction mixture is diazotized in a solution containing hydrochloric acid, and a suspension of 31.8 parts of 1-amino-8-hydroxynaphthalene-3,6-disulfonic acid is added at 5° C. The pH during the acidic coupling is kept at 3.5 with sodium acetate. 17.3 parts of the product obtained by diazotizing aniline-4-sulfonic acid in a solution containing hydrochloric acid are then added, and coupling is carried out by adding 17.6 parts of sodium carbonate. The dye is precipitated from the neutral position mixture by adding sodium chloride, and is then dried. It dyes cotton in fast reddish navy hues, and is of the formula

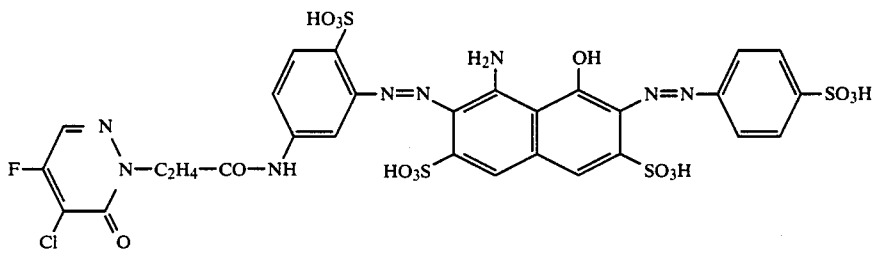

Further dyes according to the invention are summarized in Table 17, where column I shows the radical of the carboxylic acid chloride used, columns II and III indicate the diazo components used instead of 1,3-phenylenediamine-4-sulfonic acid and aniline-4-sulfonic acid, and column IV states the hue obtained on cotton.

TABLE 17

| Example | I | II | III | IV |
|---|---|---|---|---|
| 430 | A³ | 1,3-Phenylenediamine-4-sulfonic acid | Aniline-2,5-disulfonic acid | navy |
| 431 | A⁴ | 1,3-Phenylenediamine-4-sulfonic acid | 2-Naphthylamine-1,5-disulfonic acid | navy |
| 432 | A⁵ | 1,3-Phenylenediamine-4-sulfonic acid | 2-Naphthylamine-3,6,8-trisulfonic acid | navy |
| 433 | A⁵ | 1,3-Phenylenediamine-4-sulfonic acid | 4-Allylsulfoaniline | reddish navy |
| 434 | A⁵ | 1,3-Phenylenediamine-4-sulfonic acid | 4-(2'-Sulfatoethylsulfonyl)-aniline | reddish navy |
| 435 | A⁵ | 1,3-Phenylenediamine-4-sulfonic acid | 4-(2'-Sulfatoethylaminosulfonyl)-aniline | reddish navy |
| 436 | A⁵ | 1,3-Phenylenediamine-4-sulfonic acid | 1-(3'-Aminophenyl)-5-chloro-4-fluoropyridazin-6-one | navy |
| 437 | A⁵ | 1,3-Phenylenediamine-4-sulfonic acid | 2-Sulfo-5-(4',6'-dichlorotriazinylamino)-aniline | reddish navy |
| 438 | A² | 1,3-Phenylenediamine-4-sulfonic acid | Aniline-2,5-disulfonic acid | reddish navy |
| 439 | A¹ | 1,4-Phenylenediamine-2-sulfonic acid | 2-Sulfo-4-(4',6'-dichlorotriazinylamino)-aniline | dark green |
| 440 | A² | 1,4-Phenylenediamine-2-sulfonic acid | 2-Sulfo-3-acetylaminoaniline | greenish navy |
| 441 | A³ | 1,3-Phenylenediamine-4-sulfonic acid | 2-Sulfo-5-[4'-chloro-6'-(4''-sulfophenylamino)-triazinyl]-aminoaniline | reddish navy |
| 442 | A³ | 1,3-Phenylenediamine-4-sulfonic acid | 2-Sulfo-5-[4'-fluoro-6'-(4''-sulfophenylamino)-triazinyl]-aminoaniline | reddish navy |

EXAMPLE 443

25.4 parts of aniline-2,5-disulfonic acid are diazotized in a solution containing hydrochloric acid, and a suspension of 31.8 parts of 1-amino-8-hydroxynaphthalene-3,6-disulfonic acid is added. Coupling is carried out overnight in a solution containing hydrochloric acid, after which 31.9 parts of the product obtained by diazotizing, in a solution containing hydrochloric acid, the primary condensate of 1,3-phenylenediamine-4-sulfonic acid and 3-(5'-chloro-4'-fluoropyridazin-6'-on-1'-yl)propionyl chloride are added. Thereafter, the mixture is neutralized by adding 17.5 parts of sodium carbonate, and coupling is carried out. The dye is precipitated by adding potassium chloride, and is dried under mild conditions. It dyes cotton in fast greenish navy hues, and is of the formula

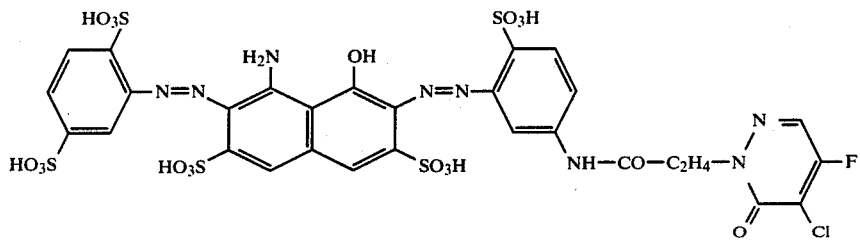

Further dyes according to the invention are summarized in Table 18, where columns I and II indicate the diazo components used instead of aniline-2,5-disulfonic acid and 1,3-phenylenediamine-4-sulfonic acid, column III shows the radical of the carboxylic acid chloride used, and column IV states the hue obtained on cotton.

1'-yl)-propionyl chloride, dissolved in 50 parts of ethyl acetate. When diazotizable amino groups are no longer detectable, 30 parts of diazotized 2-aminonaphthalene-1,5-disulfonic acid are coupled to the product at pH 5–7. The dye is precipitated with potassium chloride and dried under mild conditions. It dyes cotton in fast yellow hues, and is of the formula

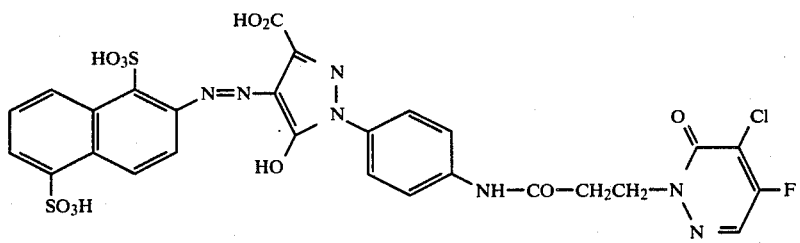

Further dyes according to the invention are listed in Table 19, where column I and II indicate the com-

TABLE 18

| Example | I | II | III | IV |
|---|---|---|---|---|
| 444 | Aniline-4-sulfonic acid | 1,3-Phenylenediamine-4-sulfonic acid | $A^4$ | greenish navy |
| 445 | 2-Naphthylamine-1,5-disulfonic acid | 1,3-Phenylenediamine-4-sulfonic acid | $A^3$ | greenish navy |
| 446 | 2-Naphthylamine-3,6,8-trisulfonic acid | 1,3-Phenylenediamine-4-sulfonic acid | $A^5$ | greenish navy |
| 447 | 3-(2'-Sulfatoethyl-sulfonyl)-aniline | 1,3-Phenylenediamine-4-sulfonic acid | $A^2$ | navy |
| 448 | 4-Allylsulfonylaniline | 1,3-Phenylenediamine-4-sulfonic acid | $A^3$ | reddish navy |
| 449 | 4-Aminosulfonylaniline | 1,3-Phenylenediamine-4-sulfonic acid | $A^3$ | reddish navy |
| 450 | 2-Chloro-4,6-disulfo-aniline | 1,3-Phenylenediamine-4-sulfonic acid | $A^3$ | reddish navy |
| 451 | 1-(3'-Aminophenyl)-5-chloro-4-fluoropyridazin-6-one | 1,3-Phenylenediamine-4-sulfonic acid | $A^3$ | reddish navy |
| 452 | 2-Sulfo-5-(4',6'-dichlorotriazinylamino)-aniline | 1,3-Phenylenediamine-4-sulfonic acid | $A^3$ | reddish navy |
| 453 | 2-Sulfo-4'-(4',6'-dichlorotriazinylamino)-aniline | 1,4-Phenylenediamine-2-sulfonic acid | $A^4$ | dark green |
| 454 | 2-Sulfo-5-[4'-chloro-6'-(4"-sulfophenylamino)-triazinylamino]-aniline | 1,3-Phenylenediamine-4-sulfonic acid | $A^3$ | reddish navy |
| 455 | 2-Sulfo-5-[4'-fluoro-6'-(4"-sulfophenylamino)-triazinylamino]-aniline | 1,3-Phenylenediamine-4-sulfonic acid | $A^3$ | reddish navy |

EXAMPLE 456

21.9 parts of 1-(4'-aminophenyl)-3-carboxypyrazol-5-one are dissolved in 250 parts of water to give a neutral solution, and are then reacted, at 10°–15° C. and pH 6, with 29 parts of 2-(5'-chloro-4'-fluoropyridazin-6'-on- pounds used instead of 2-aminonaphthalene-1,5-disulfonic acid and 1-(4'-aminophenyl)-3-carboxypyrazol-5-one respectively, column III shows the radical of the carboxylic acid chloride used, and column IV states the hue obtained on cotton.

TABLE 19

| Example | I | II | III | IV |
|---|---|---|---|---|
| 457 | Aniline-2,5-disulfonic acid | 1-(4'-Aminophenyl)-3-carboxypyrazol-5-one | $A^3$ | yellow |
| 458 | Aniline-2-sulfonic acid | 1-(5'-Amino-2'-sulfophenyl)-3-carboxypyrazol-5-one | $A^3$ | greenish yellow |
| 459 | 1-Acetylamino-3-aminobenzene-4,6-disulfonic acid | 1-(2'-Aminoethyl)-5-aminocarbonyl-2-hydroxy-4-methylpyrid-6-one | $A^3$ | greenish yellow |
| 460 | 1-(4',6'-Dichlorotriazinylamino)-3-aminobenzene-4,6-disulfonic acid | 1-(2'-Aminoethyl)-5-aminocarbonyl-2-hydroxy-4-methylpyrid-6-one | $A^5$ | greenish yellow |
| 461 | 4-Aminoazobenzene-2,4'-disulfonic acid | 1-(2'-Sulfophenyl-5'-amino)-3-carboxypyrazol-5-one | $A^3$ | reddish yellow |
| 462 | Aniline-2-sulfonic acid | 1-Amino-8-hydroxynaphthalene-3,6-disulfonic acid | $A^3$ | red |
| 463 | Aniline-4-sulfonic acid | 1-Amino-8-hydroxynaphthalene-3,6-disulfonic acid | $A^1$ | red |
| 464 | 2-Naphthylamine-1-sulfonic acid | 1-Amino-8-hydroxynaphthalene-3,6-disulfonic acid | $A^3$ | dull bluish red |
| 465 | 2-Naphthylamine-1,5-disulfonic acid | 1-Amino-8-hydroxynaphthalene-3,6-disulfonic acid | $A^2$ | bluish red |
| 466 | 4-Methyl-2-sulfoaniline | 1-Amino-8-hydroxynaphthalene-4,6-disulfonic acid | $A^3$ | bluish red |
| 467 | 2-Aminonaphthalene-3,6,8-trisulfonic acid | 1-Amino-8-hydroxynaphthalene-4,6-disulfonic acid | $A^5$ | bluish red |
| 468 | 4-Aminobenzoic acid | 1-Amino-8-hydroxynaphthalene-3,6-disulfonic acid | $A^3$ | dull bluish red |
| 469 | 4-Methoxy-5-sulfoaniline | 1-Amino-8-hydroxynaphthalene-3,6-disulfonic acid | $A^4$ | dull bluish red |
| 470 | Aniline-2,5-disulfonic acid | 2-Amino-5-hydroxynaphthalene-7-sulfonic acid | $A^3$ | orange |
| 471 | 2-Naphthylamine-1,5-disulfonic acid | 2-Amino-5-hydroxynaphthalene-7-sulfonic acid | $A^3$ | orange |
| 472 | 2-Methyl-4,6-disulfoaniline | 2-Amino-5-hydroxynaphthalene-7-sulfonic acid | $A^3$ | orange |
| 473 | 2-Naphthylamine-3,6,8-trisulfonic acid | 2-Amino-5-hydroxynaphthalene-7-sulfonic acid | $A^3$ | yellowish red |
| 474 | Aniline-4-sulfonic acid | 2-Amino-5-hydroxynaphthalene-7-sulfonic acid | $A^3$ | orange |
| 475 | 2-Naphthylamine-1,5-disulfonic acid | 2-N—Methylamino-5-hydroxynaphthalene-7-sulfonic acid | $A^4$ | reddish orange |
| 476 | 2-Naphthylamine-3,6,8-trisulfonic acid | 2-N—Methylamino-5-hydroxynaphthalene-7-sulfonic acid | $A^5$ | reddish orange |
| 477 | Aniline-2,5-disulfonic acid | 2-Amino-5-hydroxynaphthalene-7-sulfonic acid | $A^1$ | orange |
| 478 | 2-Naphthylamine-3,6,8-trisulfonic acid | 2-Amino-5-hydroxynaphthalene-7-sulfonic acid | $A^3$ | red |
| 479 | 4-Methoxy-2,5-disulfoaniline | 2-Amino-5-hydroxynaphthalene-7-sulfonic acid | $A^3$ | red |
| 480 | Aniline-2,4-disulfonic acid | 2-N—Methylamino-8-hydroxynaphthalene-6-sulfonic acid | $A^3$ | yellowish red |

EXAMPLE 481

The condensate obtained, in accordance with Example 374, from 18.8 parts of 1,3-phenylenediamine-4-sulfonic acid and 32 parts of 3-(5'-chloro-4'-fluoropyridazin-6'-on-1'-yl)-propionyl chloride is diazotized in aqueous solution, and the product is coupled to 38 parts of 1-[4'-(2''-sulfatoethylsulfonyl)-phenyl]-3-methylpyrazol-5-one at pH 5–6. The dye, which is isolated by spray-drying, dyes cotton in fast yellow hues and is of the formula

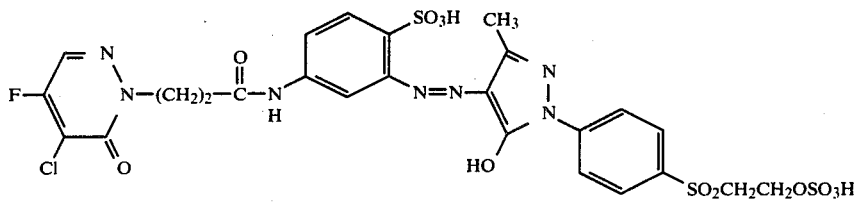

is precipitated from neutral solution by adding sodium chloride, and is dried under mild conditions. It dyes cotton in fast brilliant red hues, and is of the formula

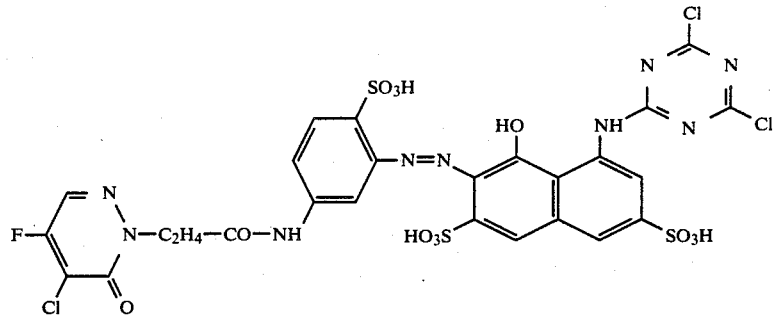

EXAMPLE 482

31.9 parts of the primary condensate obtained from 1,3-phenylenediamine-4-sulfonic acid and 3-(5'-chloro-4'-fluoropyridazin-6'-on-1'-yl)-propionyl chloride are diazotized in a solution containing hydrochloric acid, and then added to a solution of 46.7 parts of the primary condensate obtained from 1-amino-8-hydroxynaphthalene-3,6-disulfonic acid and cyanuric chloride. Coupling is carried out at a pH obtained with acetic acid, 16.2 parts of sodium bicarbonate being added. The dye Further dyes according to the invention are summarized in Table 20, where column I shows the carboxylic acid chloride used, column II indicates the diazo component used instead of 1,3-phenylenediamine-4-sulfonic acid, column III indicates the coupling component used instead of 1-amino-8-hydroxynaphthalene-3,6-disulfonic acid, column IV gives the triazine used instead of cyanuric chloride, and column V states the hue obtained on cotton.

TABLE 20

| Example | I | II | III | IV | V |
|---|---|---|---|---|---|
| 483 | $A^3$ | 1,3-Phenylenediamine-4-sulfonic acid | 1-Amino-8-hydroxy-naphthalene-3,6-disulfonic acid | 2,4-Dichloro-6-(3'-sulfo-phenylamino)-triazine | red |
| 484 | $A^2$ | 1,3-Phenylenediamine-4-sulfonic acid | 1-Amino-8-hydroxy-naphthalene-3,6-disulfonic acid | 2,4-Dichloro-6-(2',5'-disulfophenylamino)-triazine | red |
| 485 | $A^4$ | 1,3-Phenylenediamine-4-sulfonic acid | 1-Amino-8-hydroxy-naphthalene-3,6-disulfonic acid | 2,4-Difluoro-6-(4'-sulfo-phenylamino)-triazine | red |
| 486 | $A^5$ | 1,3-Phenylenediamine-4-sulfonic acid | 1-Amino-8-hydroxy-naphthalene-3,6-disulfonic acid | 2,4-Dichloro-6-(4'-sulfo-phenylamino)-triazine | red |
| 487 | $A^6$ | 1,3-Phenylenediamine-4-sulfonic acid | 1-Amino-8-hydroxy-naphthalene-4,6-disulfonic acid | 2,4-Dichloro-6-(4'-carboxy-phenylamino)-triazine | yellowish red |
| 488 | $A^3$ | 1,3-Phenylenediamine-4-sulfonic acid | 1-Amino-8-hydroxy-naphthalene-4,6-disulfonic acid | 2,4-dichloro-6-aminotri-azine | yellowish red |
| 489 | $A^3$ | 1,4-Phenylenediamine-2-sulfonic acid | 1-Amino-8-hydroxy-naphthalene-4,6-disulfonic acid | 2,4-Dichloro-6-(4'-sulfo-phenylamino)-triazine | bluish red |
| 490 | $A^3$ | 1,3-Phenylenediamine-4-sulfonic acid | 1-Amino-8-hydroxy-naphthalene-3,6-disulfonic acid | 2,4-Dichloro-6-(2'-sulfo-ethyl-methylamino)-triazine | red |
| 491 | $A^3$ | 2,6-Toluylenediamine-4-sulfonic acid | 1-Amino-8-hydroxy-naphthalene-3,6-disulfonic acid | 2,4-Dichloro-6-(4'-sulfo-phenylamino)-triazine | red |
| 492 | $A^3$ | 1,3-Phenylenediamine-4-sulfonic acid | 2-Amino-5-hydroxy-naphthalene-7-sulfonic acid | 2,4-Dichloro-6-(3'-sulfo-phenylamino)-triazine | orange |
| 493 | $A^3$ | 1,3-Phenylenediamine-4-sulfonic acid | 2-Amino-5-hydroxy-naphthalene-7-sulfonic acid | 2,4-Dichloro-6-(2',5'-disulfophenylamino)-triazine | orange |
| 494 | $A^4$ | 1,3-Phenylenediamine- | 2-Amino-5-hydroxy- | 2,4-Difluoro-6-(4'-sulfo- | orange |

TABLE 20-continued

| Example | I | II | III | IV | V |
|---|---|---|---|---|---|
| | | 4-sulfonic acid | naphthalene-7-sulfonic acid | phenylamino)-triazine | |
| 495 | $A^1$ | 1,3-Phenylenediamine-4-sulfonic acid | 2-Amino-5-hydroxy-naphthalene-7-sulfonic acid | 2,4-Dichloro-6-(2',4'-disulfo-phenylamino)-triazine | orange |
| 496 | $A^3$ | 2,6-Toluylenediamine-4-sulfonic acid | 2-N—Methylamino-5-hydroxynaphthalene-7-sulfonic acid | 2,4-Dichloro-6-(4'-sulfo-phenylamino)-triazine | reddish orange |
| 497 | $A^3$ | 1,3-Phenylenediamine-4-sulfonic acid | 2-Amino-8-hydroxynaphthalene-6-sulfonic acid | 2,4-Dichloro-6-(4'-sulfo-phenylamino)-triazine | yellowish red |
| 498 | $A^3$ | 1,3-Phenylenediamine-4-sulfonic acid | 2-Amino-8-hydroxynaphthalene-6-sulfonic acid | 2,4-Dichloro-6-(2',5'-disulfo-phenylamino)-triazine | yellowish red |
| 499 | $A^4$ | 1,3-Phenylenediamine-4-sulfonic acid | 2-N—Methylamino-8-hydroxynaphthalene-6-sulfonic acid | 2,4-Difluoro-6-(3'-sulfo-phenylamino)-triazine | yellowish red |
| 500 | $A^1$ | 1,3-Phenylenediamine-4-sulfonic acid | 2-N—Methylamino-8-hydroxynaphthalene-6-sulfonic acid | 2,6-Dichloro-6-(2',4'-di-sulfophenylamino)-triazine | yellowish red |
| 501 | $A^5$ | 1,3-Phenylenediamine-4-sulfonic acid | 2-N—Methylamino-8-hydroxynaphthalene-6-sulfonic acid | 2,6-Dichloro-6-(2'-sulfo-ethyl-methylamino)-triazine | yellowish red |

EXAMPLE 502

52.1 parts of the condensate obtained from 1-amino-8-hydroxynaphthalene-3,6-disulfonic acid and 3-(5'-chloro-4'-fluoropyridazin-6'-on-1'-yl)-propionyl chloride are added to a suspension of 33.6 parts of the product obtained by diazotizing, in a solution containing hydrochloric acid, the primary condensate of 1,3-phenylenediamine-4-sulfonic acid and cyanuric chloride. Coupling is completed at the pH obtained with acetic acid, 17.2 parts of sodium bicarbonate being added, and the dye is then precipitated from neutral solution with potassium chloride. The pressed material is spray-dried. The resulting dark red powder dyes cotton in fast brilliant red hues. The dye is of the formula

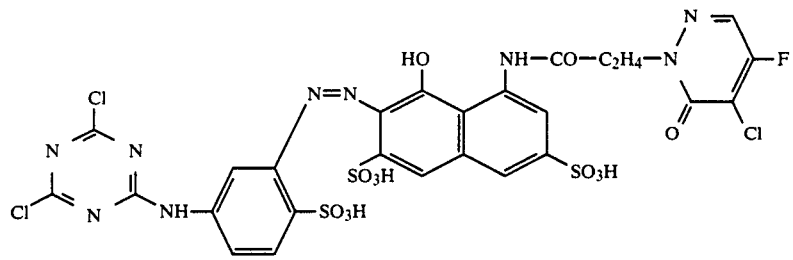

Further dyes according to the invention are summarized in Table 21, where column I gives the triazine used instead of cyanuric chloride, column II indicates the coupling component used instead of 1-amino-8-hydroxynaphthalene-3,6-disulfonic acid, column III gives the carboxylic acid chloride used, and column IV states the hue obtained on cotton.

TABLE 21

| Example | I | II | III | IV |
|---|---|---|---|---|
| 503 | 2,4-Dichloro-6-(4'-sulfophenylamino)-triazine | 1-Amino-8-hydroxynaphthalene-3,6-disulfonic acid | $A^3$ | red |
| 504 | 2,4-Dichloro-6-(2',-5'-disulfophenyl-amino)-triazine | 1-Amino-8-hydroxynaphthalene-3,6-disulfonic acid | $A^1$ | red |
| 505 | 2,4-Dichloro-6-aminotriazine | 1-Amino-8-hydroxynaphthalene-3,6-disulfonic acid | $A^4$ | red |
| 506 | 2,4-Difluoro-6-(3'-sulfophenylamino)-triazine | 1-Amino-8-hydroxynaphthalene-3,6-disulfonic acid | $A^3$ | red |
| 507 | 2,4-Dichloro-6-(4'-carboxyphenylamino)-triazine | 1-Amino-8-hydroxynaphthalene-3,6-disulfonic acid | $A^3$ | red |
| 508 | 2,4-Dichloro-6-(3'-sulfophenylamino)-triazine | 1-Amino-8-hydroxynaphthalene-3,6-disulfonic acid | $A^6$ | red |
| 509 | 2,4-Dichloro-6-methoxytriazine | 1-Amino-8-hydroxynaphthalene-3,6-disulfonic acid | $A^3$ | red |
| 510 | 2,4-Dichloro-6-(4'-sulfophenylamino)-triazine | 1-Amino-8-hydroxynaphthalene-4,6-disulfonic acid | $A^3$ | yellowish red |
| 511 | 2,4-Dichloro-6-(2',-5'-disulfophenyl-amino)-triazine | 1-Amino-8-hydroxynaphthalene-4,6-disulfonic acid | $A^5$ | yellowish red |

TABLE 21-continued

| Example | I | II | III | IV |
|---|---|---|---|---|
| 512 | 2,4-Dichloro-6-(4'-sulfophenylamino)-triazine | 2-Amino-5-hydroxynaphthalene-7-sulfonic acid | $A^3$ | orange |
| 513 | 2,4-Dichloro-6-(4'-sulfophenylamino)-triazine | 2-N—Methylamino-5-hydroxynaphthalene-7-sulfonic acid | $A^3$ | orange |
| 514 | 2,4-Difluoro-6-(4'-sulfophenylamino)-triazine | 2-N—Methylamino-5-hydroxynaphthalene-7-sulfonic acid | $A^4$ | orange |
| 515 | 2,4-Dichloro-6-(2',5'-disulfophenylamino)-triazine | 2-Amino-5-hydroxynaphthalene-7-sulfonic acid | $A^2$ | orange |
| 516 | 2,4-Dichloro-6-(3'-sulfophenylamino)-triazine | 2-Amino-8-hydroxynaphthalene-6-sulfonic acid | $A^3$ | yellowish red |
| 517 | 2,4-Dichloro-6-(3'-sulfophenylamino)-triazine | 2-N—Methylamino-8-hydroxynaphthalene-6-sulfonic acid | $A^3$ | yellowish red |
| 518 | 2,4-Difluoro-6-(4'-sulfophenylamino)-triazine | 2-N—Methylamino-8-hydroxynaphthalene-6-sulfonic acid | $A^4$ | yellowish red |
| 519 | 2,4-Dichloro-6-(2',5'-disulfophenylamino)-triazine | 2-Amino-8-hydroxynaphthalene-6-sulfonic acid | $A^1$ | yellowish red |

EXAMPLE 520

A suspension of 31.6 parts of 1-amino-8-hydroxynaphthalene-3,6-disulfonic acid in 400 parts of water is added to 64 parts of the product obtained by diazotizing, in a solution containing hydrochloric acid, the primary condensate of 1,3-phenylenediamine-4-sulfonic acid and 3-(5'-chloro-4'-fluoropyridazin-6'-on-1'-yl)propionyl chloride. Coupling is carried out overnight, the solution being buffered with acetate. The pH is then brought to 6.5–7 for 3 hours, 18.8 parts of sodium carbonate being added, and coupling is completed. The primary condensate of 1,3-phenylenediamine-4-sulfonic acid and 3-(5'-fluoropyridazin-6'-on-1'-yl)propionyl chloride. Coupling is carried out overnight, the solution being buffered with acetate, after which 33.7 parts of the product obtained by diazotizing, in a solution containing hydrochloric acid, the primary condensate of 1,3-phenylenediamine-4-sulfonic acid and 5-chloro-2,4,6-trifluoropyrimidine are added. Coupling is carried out in neutral solution by adding 17.9 parts of sodium carbonate, and the dye is precipitated with sodium chloride. It dyes cotton in fast reddish navy hues, and is of the formula

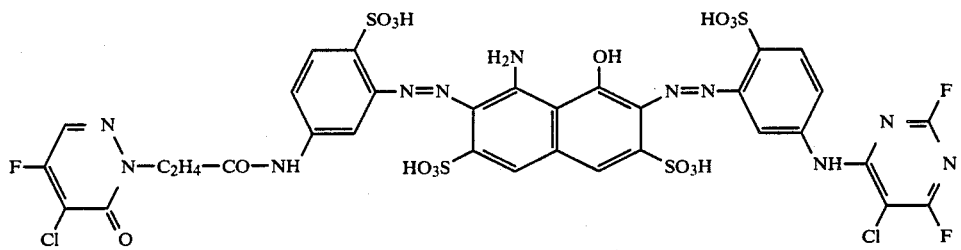

dye is precipitated from neutral solution by adding sodium chloride, and is dried. It dyes cotton in fast reddish navy hues, and is of the formula

EXAMPLE 522

A suspension of 31.5 parts of 1-amino-8-hydrox-

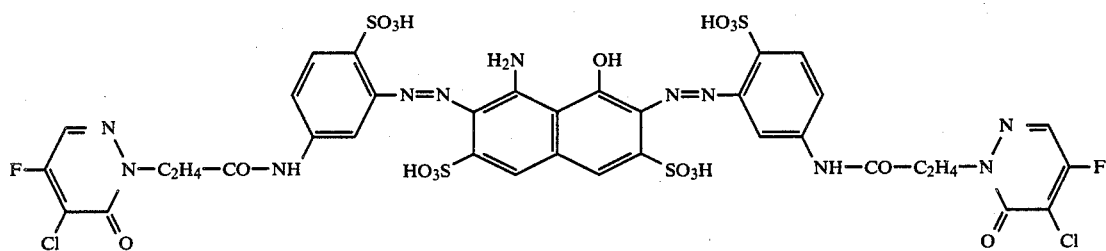

EXAMPLE 521

A suspension of 31.6 parts of 1-amino-8-hydroxynaphthalene-3,6-disulfonic acid in 400 parts of water is added to 31.9 parts of the product obtained by diazotizing, in a solution containing hydrochloric acid, the ynaphthalene-3,6-disulfonic acid in 400 parts of water is added to 33.7 parts of the product obtained by diazotizing, in a solution containing hydrochloric acid, the primary condensate of 1,3-phenylenediamine-4-sulfonic acid and 5-chloro-2,4,6-trifluoropyrimidine. Coupling is carried out overnight, the solution being buffered with acetate, after which 32 parts of the product obtained by diazotizing, in a solution containing hydrochloric acid, the primary condensate of 1,3-phenylenediamine-4-sulfonic acid and 3-(5'-chloro-4'-fluoropyridazin-6'-on-1'-yl)propionyl chloride are added. Coupling is carried out in neutral solution by adding 18 parts of sodium carbonate, and the dye is precipitated with sodium chloride. It dyes cotton in fast reddish navy hues, and is of the formula the condensate obtained from 1-amino-8-hydroxynaphthalene-3,6-disulfonic acid and 3-(5'-chloro-4'-fluoropyridazin-6'-on-1'-yl)-propionyl chloride. Coupling is completed with the addition of 18.2 parts of sodium bicarbonate, and the dye is precipitated from neutral solution by adding potassium chloride. The pressed material is freeze-dried. The dye dyes cotton in fast brilliant red hues, and is of the formula

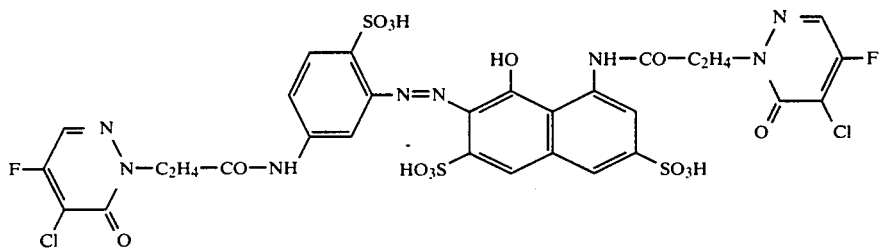

Further dyes according to the invention are summarized in Table 22, where column I gives the carboxylic acid chloride used for the acylation of the diazo component, column II indicates the diazo component used instead of 1,3-phenylenediamine-4-sulfonic acid, column III indicates the coupling component used instead of 1-amino-8-hydroxynaphthalene-3,6-disulfonic acid, column IV shows the carboxylic acid chloride used for the acylation of the coupling component, and column V states the hue obtained on cotton.

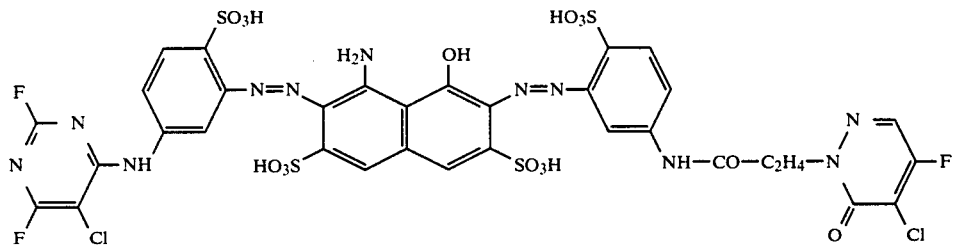

EXAMPLE 523

31.9 parts of the primary condensate obtained from 1,3-phenylenediamine-4-sulfonic acid and 3-(5'-chloro-4'-fluoropyridazin-6'-on-1'-yl)-propionyl chloride are diazotized in a solution containing hydrochloric acid, and the product is added to a suspension of 52.1 parts of

TABLE 22

| Example | I | II | III | IV | V |
|---|---|---|---|---|---|
| 524 | $A^3$ | 1,3-Phenylenediamine-4-sulfonic acid | 1-Amino-8-hydroxynaphthalene-3,6-disulfonic acid | $A^5$ | red |
| 525 | $A^5$ | 1,3-Phenylenediamine-4-sulfonic acid | 1-Amino-8-hydroxynaphthalene-3,6-disulfonic acid | $A^3$ | red |
| 526 | $A^1$ | 1,3-Phenylenediamine-4-sulfonic acid | 1-Amino-8-hydroxynaphthalene-3,6-disulfonic acid | $A^3$ | red |
| 527 | $A^3$ | 1,3-Phenylenediamine-4-sulfonic acid | 1-Amino-8-hydroxynaphthalene-4,6-disulfonic acid | $A^3$ | yellowish red |
| 528 | $A^3$ | 1,3-Phenylenediamine-4-sulfonic acid | 1-Amino-8-hydroxynaphthalene-4,6-disulfonic acid | $A^4$ | yellowish red |
| 529 | $A^3$ | 1,4-Phenylenediamine-2-sulfonic acid | 1-Amino-8-hydroxynaphthalene-4,6-disulfonic acid | $A^3$ | bluish red |
| 530 | $A^3$ | 2,6-Toluylenediamine-4-sulfonic acid | 1-Amino-8-hydroxynaphthalene-4,6-disulfonic acid | $A^3$ | yellowish red |
| 531 | $A^3$ | 1,3-Phenylenediamine-4-sulfonic acid | 2-Amino-5-hydroxynaphthalene-7-sulfonic acid | $A^3$ | orange |
| 532 | $A^5$ | 1,3-Phenylenediamine-4-sulfonic acid | 2-Amino-5-hydroxynaphthalene-7-sulfonic acid | $A^3$ | orange |
| 533 | $A^3$ | 2,6-Toluylenediamine-4-sulfonic acid | 2-Amino-5-hydroxynaphthalene-7-sulfonic | $A^3$ | orange |

TABLE 22-continued

| Example | I | II | III | IV | V |
|---|---|---|---|---|---|
| 534 | $A^3$ | 1,3-Phenylenediamine-4-sulfonic acid | 2-Amino-8-hydroxynaphthalene-6-sulfonic acid | $A^5$ | yellowish red |
| 535 | $A^3$ | 1,3-Phenylenediamine-4-sulfonic acid | 2-Amino-8-hydroxynaphthalene-6-sulfonic acid | $A^3$ | yellowish red |
| 536 | $A^3$ | 1,3-Phenylenediamine-4-sulfonic acid | 2-Amino-8-hydroxynaphthalene-6-sulfonic acid | $A^6$ | yellowish red |
| 537 | $A^3$ | 2,6-Toluylenediamine-4-sulfonic acid | 2-N—Methylamino-8-hydroxynaphthalene-6-sulfonic acid | $A^3$ | yellowish red |

EXAMPLE 538

33.7 parts of the product obtained by diazotizing, in a solution containing hydrochloric acid, the primary condensate of 1,3-phenylenediamine-4-sulfonic acid and 5-chloro-2,4,6-trifluoropyrimidine are added to a suspension of 52.1 parts of the condensate obtained from 1-amino-8-hydroxynaphthalene-3,6-disulfonic acid and 3-(5'-chloro-4'-fluoropyridazin-6'-on-1'-yl)-propionyl chloride in 500 parts of water. Coupling is carried out at the pH obtained with acetic acid. The dye is precipitated from neutral solution by adding sodium chloride, and is dried. It dyes cotton in fast brilliant red hues, and is of the formula

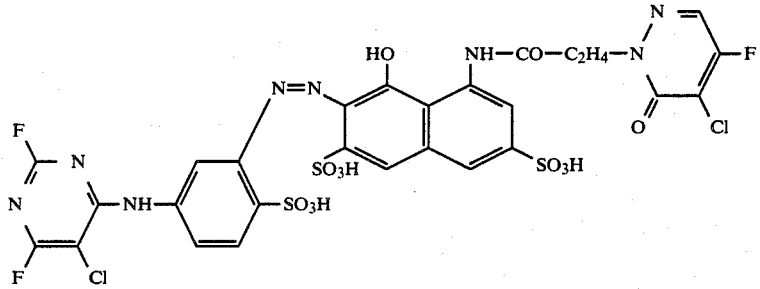

Further dyes according to the invention are summarized in Table 23, where column I shows the diazo component containing reactive groups, column II indicates the coupling component used instead of 1-amino-8-hydroxynaphthalene-3,6-disulfonic acid, column III gives the carboxylic acid chloride used for the acylation of the coupling component, and column IV states the hue obtained on cotton.

TABLE 23

| Example | I | II | III | IV |
|---|---|---|---|---|
| 539 | 2-Sulfo-5-(5'-chloro-2',6'-difluoropyrimidin-4'-ylamino)-aniline | 1-Amino-8-hydroxynaphthalene-4,6-disulfonic acid | $A^3$ | yellowish red |
| 540 | 3-(Sulfatoethylsulfonyl)-aniline | 1-Amino-8-hydroxynaphthalene-3,6-disulfonic acid | $A^3$ | red |
| 541 | 4-Allylsulfonylaniline | 1-Amino-8-hydroxynaphthalene-3,6-disulfonic acid | $A^4$ | red |
| 542 | 4-(Sulfatoethylsulfonyl)-aniline | 1-Amino-8-hydroxynaphthalene-3,6-disulfonic acid | $A^1$ | red |
| 543 | 4-(Sulfatoethylsulfonyl)-aniline | 1-Amino-8-hydroxynaphthalene-3,6-disulfonic acid | $A^5$ | red |
| 544 | 4-(Sulfatoethylsulfonyl)-aniline | 2-Amino-8-hydroxynaphthalene-6-sulfonic acid | $A^3$ | yellowish red |
| 545 | 2-Sulfo-5-(5'-chloro-2',6'-difluoropyrimidin-4'-ylamino)-aniline | 2-Amino-8-hydroxynaphthalene-6-sulfonic acid | $A^3$ | yellowish red |
| 546 | 2-Sulfo-5-(5'-chloro-2',6'-difluoropyrimidin-4'-ylamino)-aniline | 2-Amino-5-hydroxynaphthalene-7-sulfonic acid | $A^3$ | orange |
| 547 | 3-(Sulfatoethylsulfonyl)-aniline | 2-Amino-5-hydroxynaphthalene-7-sulfonic acid | $A^3$ | orange |
| 548 | 4-(Sulfatoethylaminosulfonyl)-aniline | 2-N—Methylamino-5-hydroxynaphthalene-7-sulfonic acid | $A^3$ | orange |

EXAMPLE 549

19 parts of cyanuric chloride in 100 parts of acetone are added to 31.9 parts of the primary condensate obtained from 1,3-phenylenediamine-4-sulfonic acid and 3-(5'-chloro-4'-fluoropyridazin-6'-on-1'-yl)-propionyl chloride. The mixture is stirred at 5°–10° C. and pH 6, with the addition of 14.3 parts of sodium bicarbonate, until diazotizable amino groups are no longer detectable. A neutral solution of 31.6 parts of 1-amino-8-hydroxynaphthalene-3,6-disulfonic acid is added to the reaction mixture, and stirring is carried out at 35° C. and pH 6–7, with the addition of 14.8 parts of sodium bicarbonate, until the condensation is complete. 17 parts of the product obtained by diazotizing aniline-2-sulfonic acid in a solution containing hydrochloric acid are added to the ice-cold reaction mixture, and coupling is carried out in a slightly acidic medium. The dye is precipitated from neutral solution by adding potassium chloride, and is dried. It dyes cotton in fast brilliant red hues, and is of the formula

EXAMPLE 550

28.1 parts of diazotized 4-(2'-sulfatoethylsulfonyl)-aniline are coupled, at pH 5–7, to the condensate obtained, in accordance with Example 456, from 21.9 parts of 1-(4'-aminophenyl)-3-carboxypyrazol-5-one and 29 parts of 3-(5'-chloro-4'-fluoropyridazin-6'-on-1'-yl)-propionyl chloride. The dye is precipitated with potassium chloride and is dried under mild conditions. It dyes cotton in fast yellow hues, and is of the formula

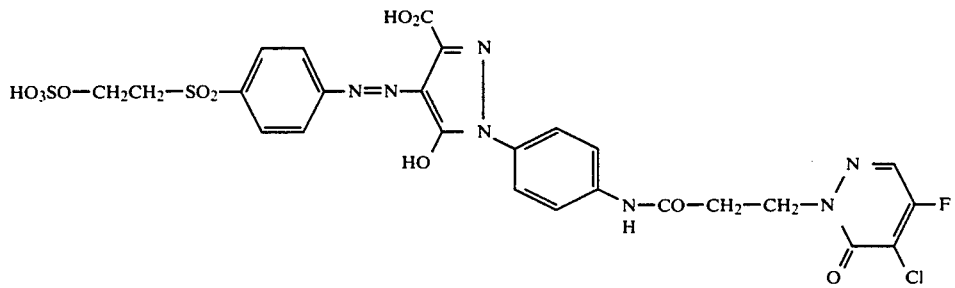

EXAMPLE 551

33.7 parts of the product obtained by diazotizing the condensate of 5-chloro-2,4,6-trifluoropyrimidine and 1,3-phenylenediamine-4-sulfonic acid are coupled, at pH 6, to the condensate obtained, in accordance with Example 456, from 21.9 parts of 1-(4'-aminophenyl)-3-carboxypyrazol-5-one and 29 parts of 3-(5'-chloro-4'-fluoropyridazin-6'-on-1'-yl)-propionyl chloride. The dye is isolated, and dried under mild conditions. It dyes cotton in fast yellow hues, and is of the formula

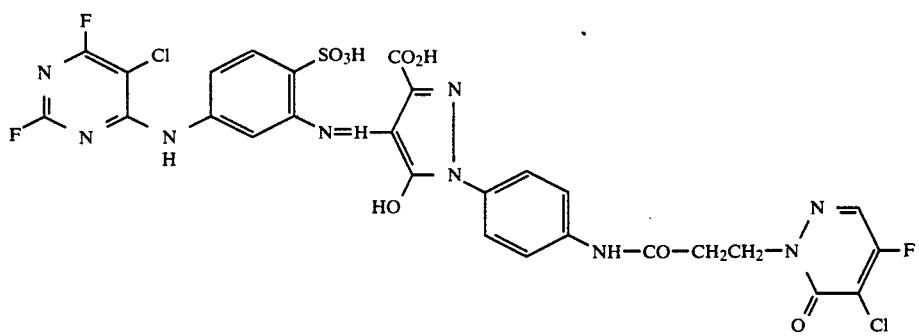

EXAMPLE 552

69 parts of 2-[4'-(3'',6'',8''-trisulfonaphth-2''-ylazo)-3'-ureidophenylamino]-4,6-dichlorotriazine are dissolved in 800 parts of water, and are reacted with 40 parts of 4-[3'-(5''-chloro-4''-fluoropyridazin-6''-on-1''-yl)propionylamino]-2-aminobenzenesulfonic acid at 30°–40° C. at pH 6.5. The dye is precipitated with potassium chloride, and is dried under mild conditions. It has good fastness properties, dyes cotton in brilliant golden yellow hues, and is of the formula

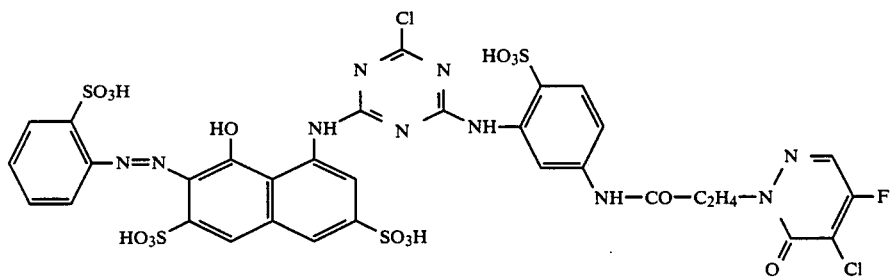

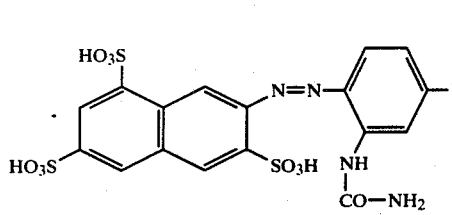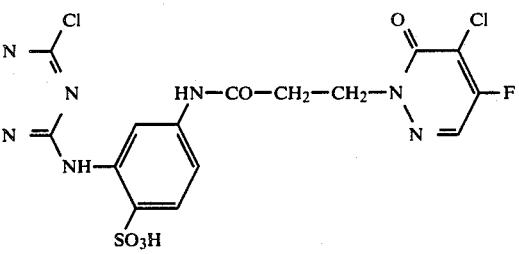

The same dye is also obtained if 54.5 parts of 4-(3',6',8'-trisulfonaphth-2'-ylazo)-3-ureidoaniline are reacted with 56 parts of 4-[3'-(5''-chloro-4''-fluoropyridazin-6''-on-1''-yl)-propionylamino]-2-(4',6'-dichloro-1',3',5'-triazin-2'-ylamino)-benzenesulfonic acid at 30°-35° C. and pH 6-7.

EXAMPLE 553

32 parts of the product obtained by diazotizing 1-(3'-amino-4'-sulfophenyl)-5-chloro-4-fluoropyridazin-6-one in a solution containing hydrochloric acid are added to a solution of 52 parts of the condensate obtained from 1-amino-8-hydroxynaphthalene-3,6-disulfonic acid and 3-(5'-chloro-4'-fluoropyridazin-6'-on-1'-yl)-propionyl chloride. Coupling is completed at the pH obtained with acetic acid, 18 parts of sodium bicarbonate being added. The dye is then precipitated from neutral solution with potassium chloride, and the pressed material is spray-dried. The resulting red powder dyes cotton in fast brilliant red hues. The dye is of the formula

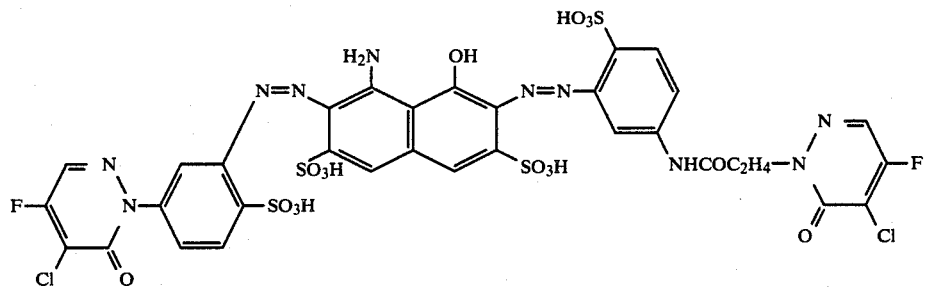

EXAMPLE 554

If 1-(4'-amino-3'-sulfophenyl)-5-chloro-4-fluoropyridazin-6-one is used instead of 1-(3'-amino-4'-sulfophenyl)-5-chloro-4-fluoropyridazin-6-one, a similar dye is obtained, which dyes cotton in bluish red hues.

EXAMPLE 555

64.5 parts of the red monoazo dye obtained by coupling 31.9 parts of 1-(3'-amino-4'-sulfophenyl)-5-chloro-4-fluoropyridazin-6-one to 31.9 parts of 1-amino-8-hydroxynaphthalene-3,6-disulfonic acid in acidic solution are initially taken as an aqueous solution having a pH of 6.5. 40 parts of the product obtained by diazotizing, in a solution containing hydrochloric acid, the primary condensate of 1,3-phenylenediamine-4-sulfonic acid and 3-(5'-chloro-4'-fluoropyridazin-6'-on-1'-yl)-propionyl chloride are added, and coupling is completed in a slightly acidic medium, with the addition of 1 molar sodium carbonate solution. The dye is precipitated with sodium chloride, and the pressed material is freeze-dried. The resulting black powder dyes cotton in fast reddish navy hues. The dye is of the formula

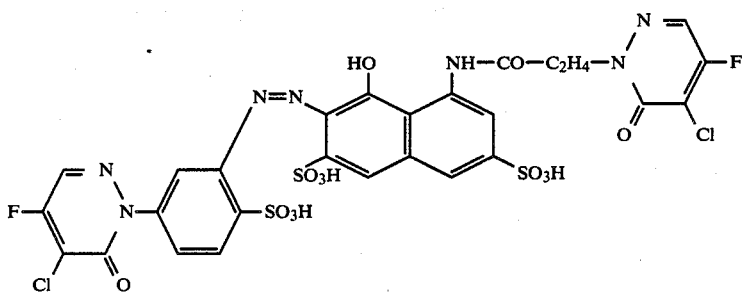

EXAMPLE 556

If 1-(4'-amino-3'-sulfophenyl)-5-chloro-4-fluoropyridazin-6-one is used instead of 1-(3'-amino-4'-sulfophenyl)-5-chloro-4-fluoropyridazin-6-one, a dye having similar properties is obtained. It dyes cotton in greenish navy hues.

EXAMPLE 557

32 parts of the product obtained by diazotizing 1-(4'-amino-3'-sulfophenyl)-5-chloro-4-fluoropyridazin-6-one in a solution containing hydrochloric acid are added to the red monoazo dye obtained when 39 parts of the primary condensate of 1,3-phenylenediamine-4-sulfonic acid and 3-(5'-chloro-4'-fluoropyridazin-6'-on-1'-yl)propionyl chloride are coupled, in acidic solution, to 31.9 parts of 1-amino-8-hydroxynaphthalene-3,6-disulfonic acid. Coupling is completed at neutral pH, with continuous addition of 1 molar sodium carbonate solution. The dye is then isolated by adding potassium chloride, and the pressed material is freeze-dried. The resulting black powder dyes cotton in fast greenish navy hues. The dye is of the formula

EXAMPLE 560

51.4 parts of the monoazo dye obtained by coupling 28.7 parts of diazotized 4-chloroaniline-2,5-disulfonic acid to 22 parts of 1-aminonaphthalene-7-sulfonic acid are diazotized at 10°–15° C. in a solution containing hydrochloric acid. 52 parts of the condensate obtained from 1-amino-8-hydroxynaphthalene-3,6-disulfonic acid and 3-(5'-chloro-4'-fluoropyridazin-6'-on-1'-yl)-propionyl chloride are introduced into the reaction mixture, and coupling is completed in a slightly acidic

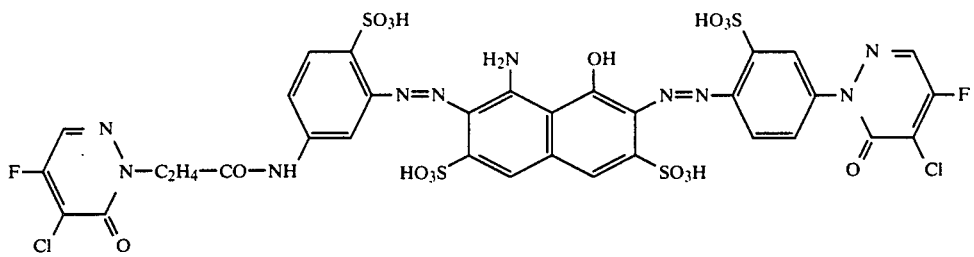

EXAMPLE 558

If 1-(3'-amino-4'-sulfophenyl)-5-chloro-4-fluoropyridazin-6-one is used instead of 1-(4'-amino-3'-sulfophenyl)-5-chloro-4-fluoropyridazin-6-one, a dye having similar properties is obtained. It dyes cotton in medium, with continuous addition of 1 molar sodium carbonate solution. The dye is precipitated from neutral solution with potassium chloride, and the pressed material is dried under mild conditions. The resulting dark blue powder dyes cotton in fast navy hues. The dye is of the formula

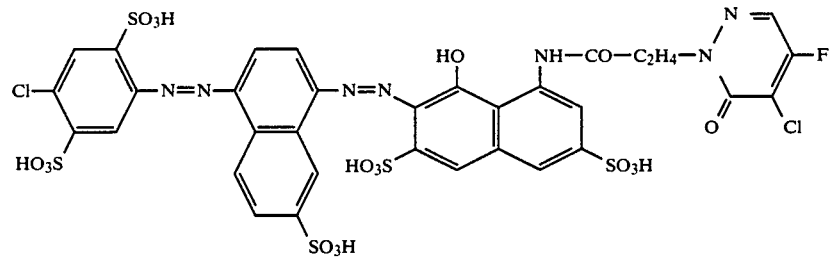

reddish navy hues.

EXAMPLE 559

27.9 parts of the product obtained by diazotizing, in a solution containing hydrochloric acid, the primary condensate of 1,3-phenylenediamine-4-sulfonic acid and β-chloropropionyl chloride are coupled, in a solution containing acetic acid, to 52 parts of the condensate obtained from 1-amino-8-hydroxynaphthalene-3,6-disulfonic acid and 3-(5'-chloro-4'-fluoropyridazin-6'-on-1'-yl)propionyl chloride. The dye is then precipitated from neutral solution with sodium chloride, and the pressed material is spray-dried. The resulting red powder dyes cotton in fast brilliant red hues. The dye is of the formula

EXAMPLE 561

If the 4-chloroaniline-2,5-disulfonic acid used in Example 560 is replaced with 32 parts of 1-(3'-amino-4'-sulfophenyl)-5-chloro-4-fluoropyridazin-6-one, a dye having similar properties is obtained.

EXAMPLE 562

62 parts of the monoazo dye obtained when 39.1 parts of the condensate of 1,3-phenylenediamine-4-sulfonic acid and 3-(5'-chloro-4'-fluoropyridazin-6'-on-1'-yl)-propionyl chloride are diazotized and then coupled to 22 parts of 1-aminonaphthalene-7-sulfonic acid are diazotized at 10°–15° C. in a solution containing hydrochloric acid. 52 parts of the condensate obtained from 1-amino-8-hydroxynaphthalene-3,6-disulfonic acid and 3-(5'-chloro-4'-fluoropyridazin-6'-on-1'-yl)-propionyl

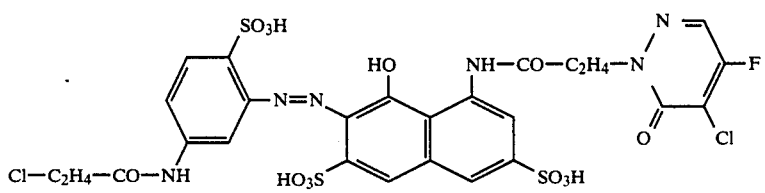

chloride are added to the reaction mixture, and coupling is carried out in a slightly acidic medium, with constant addition of 1 molar sodium carbonate solution. The dye is precipitated from neutral solution with sodium chloride, and the pressed material is freeze-dried. The resulting bluish black powder dyes cotton in fact reddish navy hues.

EXAMPLE 563

If 46.7 parts of the primary condensate obtained from 1-amino-8-hydroxynaphthalene-3,6-disulfonic acid and cyanuric chloride are used instead of the condensate stated in Example 562 and obtained from 1-amino-8-hydroxynaphthalene-3,6-disulfonic acid and 3-(5'-chloro-4'-fluoropyridazin-6'-on-1'-yl)-proponyl chloride, a dye having similar properties is obtaned.

EXAMPLE 564

If the condensate obtained from 1-amino-8-hydroxynaphthalene-3,6-disulfonic acid and 2-phenyl-4,6-dichloro-s-triazine is used instead of the condensate stated in Example 563 and obtained from 1-amino-8-hydroxynaphthalene-3,6-disulfonic acid and cyanuric chloride, a dye having similar properties is obtained.

EXAMPLE 565

If, instead of the condensate stated in Example 562 and obtained from 1,3-phenylenediamine-4-sulfonic acid and 3-(5'-chloro-4'-fluoropyridazin-6'-on-1'-yl)propionyl chloride, 32 parts of 1-(4'-amino-3'-sulfophenyl)-5-chloro-4-fluoropyridazin-6-one are used as the diazo component, a dye having similar properties is obtained.

EXAMPLE 566

32 parts of the product obtained by diazotizing, in a solution containing hydrochloric acid, 1-(3'-amino-4'-sulfophenyl)-5-chloro-4-fluoropyridazin-6-one are added to a neutral solution of 22 parts of 1,4-dimethyl-6-hydroxypyrid-2-one-5-sulfonic acid in 200 parts of water. Coupling is completed at pH 5-7, and the dye is salted out with potassium chloride at pH 6.5, and is freeze-dried. It dyes cotton in fast brilliant yellow hues, and is of the formula

EXAMPLE 567

If the 1-(3'-amino-4'-sulfophenyl)-5-chloro-4-fluoropyridazin-6-one stated in Example 566 is replaced with 1-(4'-amino-3'-sulfophenyl)-5-chloro-4-fluoropyridazin-6-one, a dye having similar properties is obtained.

We claim:

1. A reactive dye compound of the formula

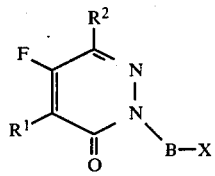

wherein $R^1$ is chlorine, $R^2$ is hydrogen, B is a direct bond, aliphatic or a sulfo-substituted phenylene radical, and X is an azo dye radical or an anthraquinone radical.

2. The reactive dye according to claim 1, wherein X is an azo dye radical.

3. The reactive dye according to claim 1, wherein B is a direct bond or is an ethylene carbonyl bond.

* * * * *